US010832429B2

(12) United States Patent
Blasco Claret et al.

(10) Patent No.: US 10,832,429 B2
(45) Date of Patent: Nov. 10, 2020

(54) DEVICE AND METHOD FOR OBTAINING DISTANCE INFORMATION FROM VIEWS

(71) Applicant: PHOTONIC SENSORS & ALGORITHMS, S.L., Valencia (ES)

(72) Inventors: Jorge Vicente Blasco Claret, Valencia (ES); Carles Montoliu Alvaro, Valencia (ES); Arnau Calatayud Calatayud, Valencia (ES); Leticia Carrion, Valencia (ES); Adolfo Martinez Uso, Valencia (ES)

(73) Assignee: PHOTONIC SENSORS & ALGORITHMS, S.L., Valencia (ES)

( * ) Notice: Subject to any disclaimer, the term of this patent is extended or adjusted under 35 U.S.C. 154(b) by 30 days.

(21) Appl. No.: 16/342,739

(22) PCT Filed: Dec. 20, 2016

(86) PCT No.: PCT/EP2016/081966
§ 371 (c)(1),
(2) Date: Apr. 17, 2019

(87) PCT Pub. No.: WO2018/072858
PCT Pub. Date: Apr. 26, 2018

(65) Prior Publication Data
US 2019/0236796 A1 Aug. 1, 2019

(30) Foreign Application Priority Data
Oct. 18, 2016 (EP) .................. PCT/EP2016/074992

(51) Int. Cl.
*G06K 9/00* (2006.01)
*G06T 7/557* (2017.01)
(Continued)

(52) U.S. Cl.
CPC .............. *G06T 7/557* (2017.01); *G06T 5/002* (2013.01); *G06T 7/13* (2017.01); *G06T 7/155* (2017.01);
(Continued)

(58) Field of Classification Search
CPC . G06T 2207/10052; G06T 7/13; G06T 7/557; G06T 2207/10012; G06T 5/002;
(Continued)

(56) References Cited

U.S. PATENT DOCUMENTS 5,748,371 A * 5/1998 Cathey, Jr. ............ G01S 3/7835
359/558
6,023,523 A * 2/2000 Cohen ..................... G06T 15/06
345/419

(Continued)

FOREIGN PATENT DOCUMENTS

JP 2015211372 A 11/2015

OTHER PUBLICATIONS

Bolles et al., "Epipolar-Plane Image Analysis: An Approach to Determining Structure from Motion", International Journal of Computer Vision, Jan. 1987, vol. 1, pp. 7-55, Kluwer Academic Publishers, Boston, MA, US.

(Continued)

*Primary Examiner* — Tom Y Lu
(74) *Attorney, Agent, or Firm* — Lucas & Mercanti, LLP

(57) ABSTRACT

A device and method for obtaining depth information from a light field is provided. The method generating a plurality of epipolar images from a light field captured by a light field acquisition device; an edge detection step for detecting, in the epipolar images, edges of objects in the scene captured by the light field acquisition device; for each epipolar image, detecting valid epipolar lines formed by a set of edges; and determining the slopes of the valid epipolar lines. In a (Continued)

preferred embodiment, the method extend the epipolar images with additional information of images captured by additional image acquisition devices and obtain extended epipolar lines. The edge detection step calculates a second spatial derivative for each pixel of the epipolar images and detects the zero-crossings of the second spatial derivatives.

15 Claims, 33 Drawing Sheets

(51) Int. Cl.
*G06T 7/155* (2017.01)
*G06T 7/13* (2017.01)
*G06T 7/593* (2017.01)
*G06T 5/00* (2006.01)

(52) U.S. Cl.
CPC .......... *G06T 7/593* (2017.01); *G06T 2200/28* (2013.01); *G06T 2207/10012* (2013.01); *G06T 2207/10016* (2013.01); *G06T 2207/10052* (2013.01)

(58) Field of Classification Search
CPC ................ G06T 7/593; G06T 2200/28; G06T 2207/10016; G06T 2207/10028; G06T 7/155
See application file for complete search history.

(56) References Cited

U.S. PATENT DOCUMENTS

| | | | | |
|---|---|---|---|---|
| 6,201,899 B1* | 3/2001 | Bergen | ............... | G06K 9/00134 382/106 |
| 7,949,252 B1* | 5/2011 | Georgiev | ............. | H04N 13/229 396/334 |
| 8,290,358 B1* | 10/2012 | Georgiev | ............. | H04N 13/218 396/326 |
| 8,988,317 B1 | 3/2015 | Liang et al. | | |
| 2007/0230944 A1* | 10/2007 | Georgiev | ........... | H04N 5/23212 396/322 |
| 2013/0342526 A1* | 12/2013 | Ng | .......................... | G06T 19/00 345/419 |
| 2014/0327674 A1 | 11/2014 | Sorkine-Hornung et al. | | |

OTHER PUBLICATIONS

Alam et al., "Isik Alani Kamerasi ve Normal Kamera Iceren Hibrid Stereo Goruntuleme/Hybrid stereo imaging including a light field and a regular camera", 24th Signal Processing and Communication Application Conference (SIU), May 2016, pp. 1293-1296, Dept. of Electrical and Electronics Engineering, Istanbul Medipol University, Istanbul, Turkey.
Boominathan et al., "Improving resolution and depth-of-field of light field cameras using a hybrid imaging system", IEEE International Conference on Computational Photography (ICCP), May 2014, pp. 1-10, Rice University, Houston, TX, US.
Mukati et al., "Light Field Stitching for Extended Synthetic Aperture", Nov. 2016, pp. 1-9, Dept. of Electrical and Electronics Engineering, Istanbul Medipol University, Istanbul, Turkey.
Perez et al., "A fast and memory-efficient Discrete Focal Stack Transform for plenoptic sensors", Digital Signal Processing, Mar. 2015, vol. 38, pp. 95-105.
Luke et al., "Depth From Light Fields Analyzing 4D Local Structure", Journal of Display Technology., Nov. 2015, vol. 11, No. 11, pp. 900-907, Service Center, New York, NY, US.
International Search Report and Written Opinion for Corresponding International Application No. PCT/EP/2016/081966, dated Aug. 17, 2017, pp. 1-22.

* cited by examiner

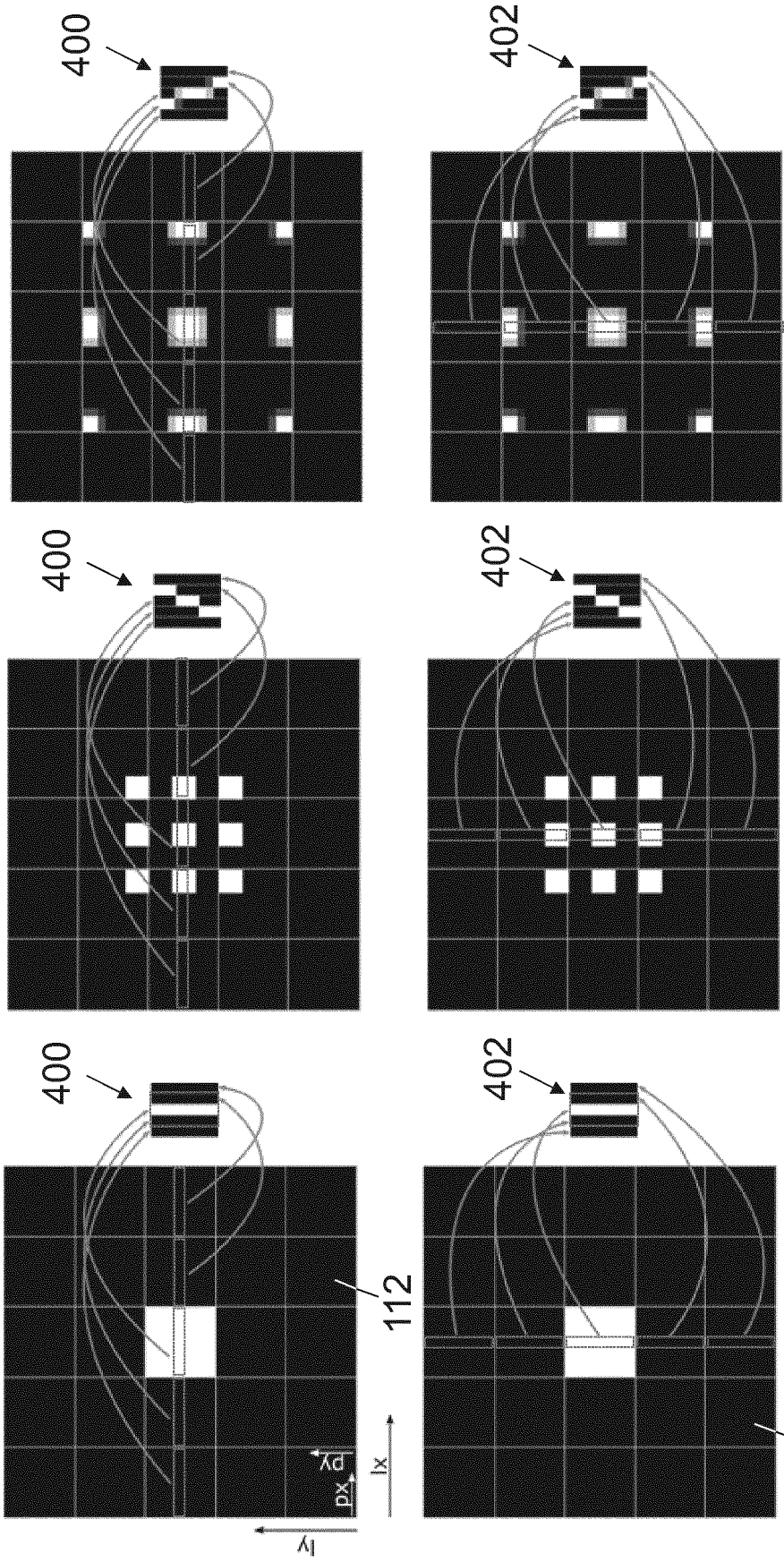

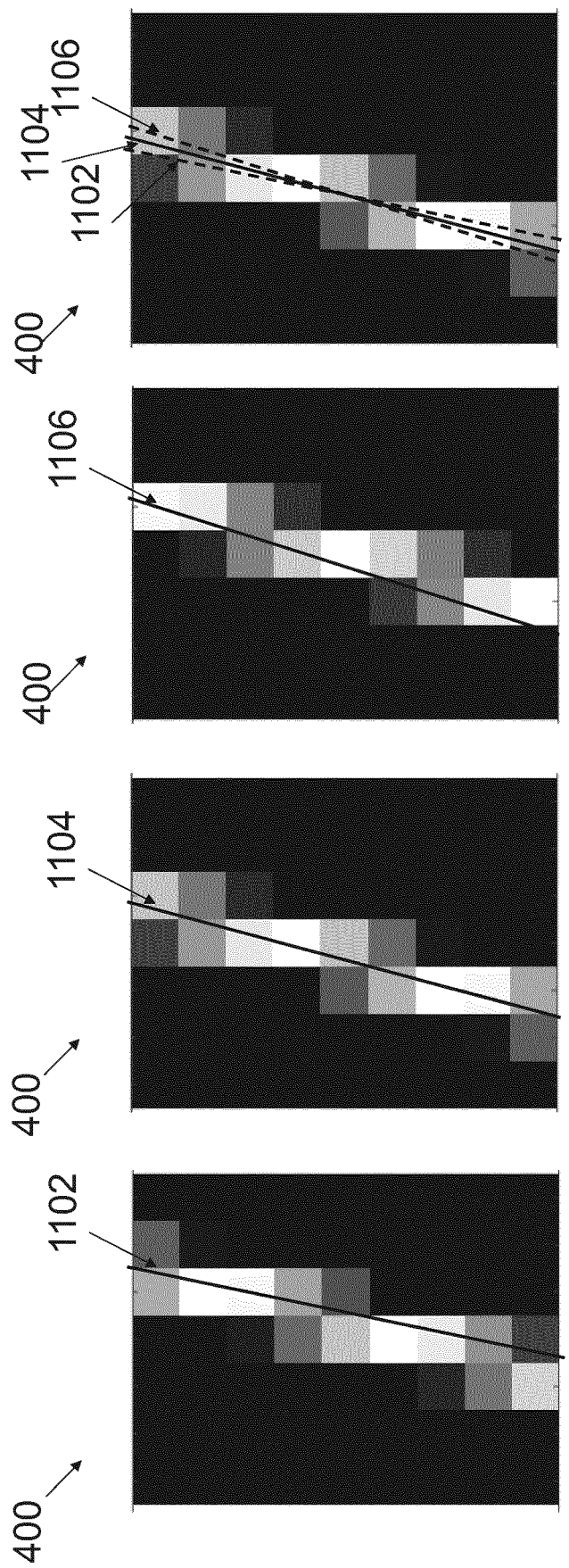

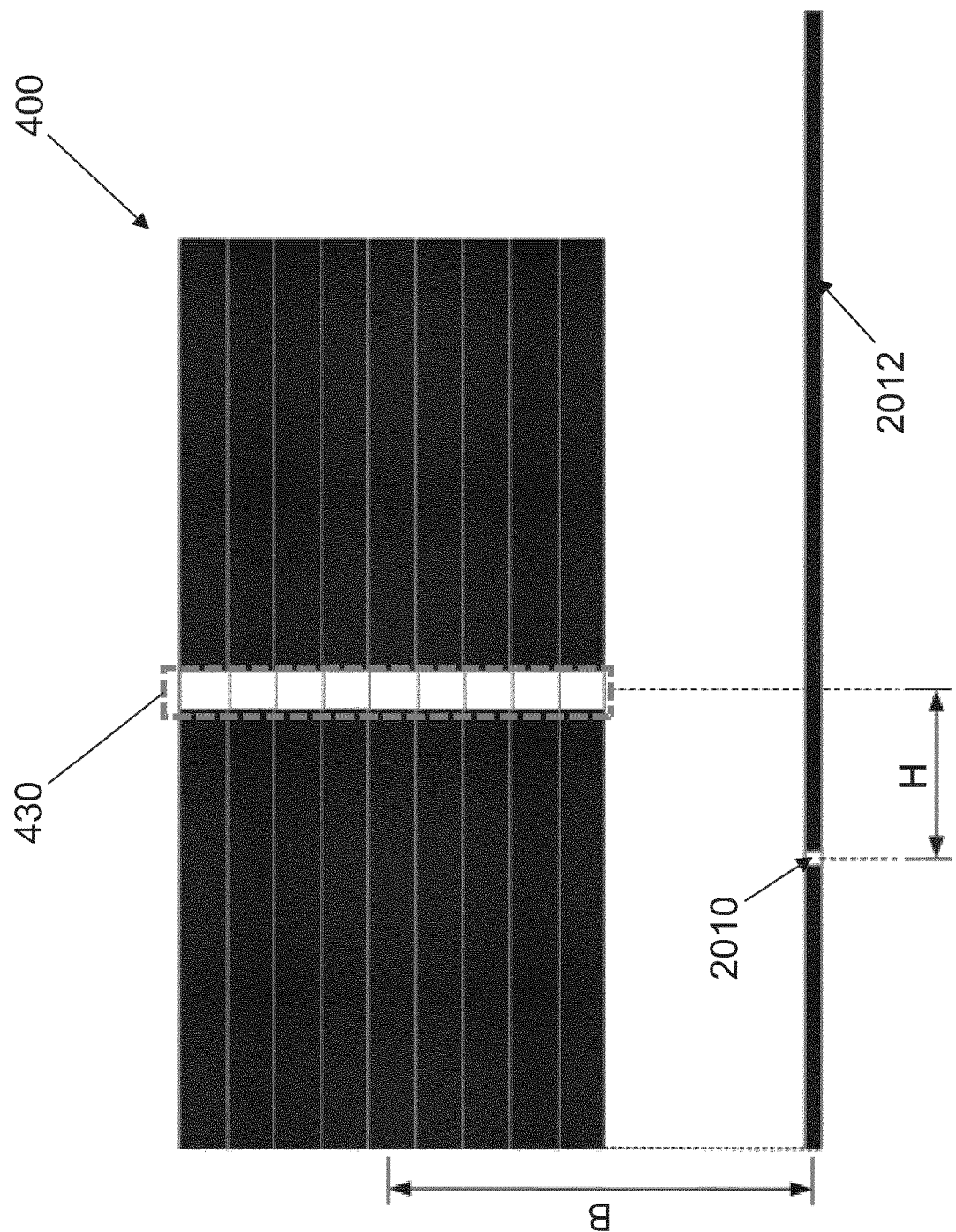

DEVICE AND METHOD FOR OBTAINING DISTANCE INFORMATION FROM VIEWS

CROSS REFERENCE TO RELATED APPLICATION

This Application is a 371 of PCT/EP2016/081966, filed Dec. 20, 2016, which claims the benefit of International Patent Application No. PCT/EP2016/074992, filed Oct. 18, 2016, each of which are incorporated herein by reference.

TECHNICAL FIELD

The present invention is comprised in the field of digital image processing, and more particularly to methods and systems for estimating distances and generating depth maps from images.

BACKGROUND ART

In the light field technology, multiview vision systems, such as a plenoptic camera or a multi-camera system (i.e. an array of several cameras), are frequently used to estimate depths of scenes. Plenoptic cameras are imaging devices capturing not only spatial information but also angular information of a scene, known as light field. The light field can be represented as a four-dimensional function LF(px, py,lx,ly), where px and py select the direction of arrival of the rays to the sensor and lx,ly are the spatial position of that ray.

A plenoptic camera is typically formed by a microlens array placed in front of the image sensor. This image capture system is equivalent to capturing the scene from several points of view (the so-called plenoptic views, like several cameras evenly distributed about the equivalent aperture of the plenoptic camera). Information about the depths of the different objects (the distance between the object itself and the camera) in the scene is implicitly captured in the light field.

A plenoptic view is obtained from the light field by fixing the variables px,py to a certain pair of values, which is equivalent to selecting only the rays that passed through a certain part of the aperture. Another system that can capture a light field can be formed by an array of several cameras. Accordingly, information about the depths of the different objects (i.e., the distance between the object itself and the camera) of the scene is captured implicitly in the light field.

A general approach to extract the depth information of an object point is measuring the displacement of the image of this object point over the several captured plenoptic views of the scene. The displacement or disparity is directly related to the actual depth of the object. In order to obtain the disparity of a point, it is necessary to identify the position of the same point in several views (or at least in two views). To solve this problem usually correspondence algorithms between views are used. Considering one point of a certain view, these methods analyse a surrounding region and try to find the most similar region in the rest of views, thus identifying the position of the same point in the rest of the views. Once the disparity is obtained and knowing the parameters of the device structure, it is possible to obtain the corresponding depth by triangulation methods. It is also possible to determine the depth information by refocusing the light field to several depth planes and detecting the regions of the image that are more focused. The main drawback of these methods is that they are too computationally intensive in order to obtain real-time depth maps on a mobile platform.

Another way of obtaining the depth information of a scene from a light field is to analyse the epipolar images. An epipolar image is a two-dimensional slice of the light field. A horizontal epipolar image is formed by fixing the variables py,ly and a vertical epipolar image is formed by fixing the variables px,lx. A horizontal/vertical epipolar image can be understood as a stack of the same line ly/lx of the different views py/px. Assuming that the same object point is captured by all the views in a plenoptic camera, lines corresponding to different points are formed in the epipolar images. The maximum displacement between adjacent views in a plenoptic camera is ±1 pixels. Therefore, the correspondence algorithms can be avoided in this kind of devices since every point corresponding to a certain line is directly connected to the same point of the rest of the views in an epipolar image. However, current plenoptic camera algorithms like Fourier domain techniques and depth-from-defocus techniques are computationally very inefficient since they analyse and process all the points of the image (not only the edges, as in the present invention). On the other hand, simple light field gradient methods (in the horizontal and vertical directions) yield very poor depth maps, with unreliable depth estimations. Moreover, these implementations cannot deal with real-time video images, taking from hundreds of milliseconds to minutes just to process a single frame.

Therefore, there is a need of an extremely efficient method that enables plenoptic cameras and 3D-images in mobile devices (such as mobile phones, tablets or laptops) to compute depth maps and process real-time video-images (e.g. 60 frames per second).

During the last fifteen years multiview imaging has appeared more frequently in scientific literature, in several research fields such as image de-blurring, virtual view synthesis or high-resolution image reconstruction, just to name a few. One of the main limitations of using a single plenoptic camera is that the spatial resolution is drastically reduced to become equal to the number of microlenses; therefore, most publications only consider improving the spatial resolution of such plenoptic cameras by means of super-resolution techniques, not considering to improve the accuracy and range of depth estimations. These approaches have demonstrated to be effective to increase the spatial resolution of plenoptic cameras by a factor of 4×, however, beyond 4× their performance falls drastically.

Depth map estimations using plenoptic cameras are generally effective when the estimation is made on a limited depth range very close to the camera. However, this estimation is progressively more and more inaccurate as the distance from the camera to the object world increases.

Stereo vision is another approach to obtain depth maps in a scene. Using triangulation techniques, it is possible to extract 3D information from a scene by means of two viewpoints, imitating the human visual perception. There are many stereo algorithms that can produce depth maps by using two cameras with known spatial offset. Since baseline of stereo vision devices are usually wider than baselines of plenoptic cameras, stereo vision approaches are able to better estimate depth maps for long distances. However, these binocular stereo approaches suffer from several disadvantages since they often result in incomplete disparity maps (holes produced by occlusions where it is not possible to find the same object point in both images) or have depth discontinuity regions where disparities among neighbouring pixels have experienced gaps larger than one pixel (in stereo vision, when a depth map is estimated, inaccuracies accumulate over the calculation of disparities among corresponding points at subpixel level; at some point, these inaccuracies may be greater than a pixel, causing a gap between two consecutive points and leaving a point with no depth estimation). In addition, stereo approaches are highly computationally expensive since they usually require computing intensive correspondence algorithms.

Another problem that affects stereo cameras is the relatively small depth of field of conventional cameras, since this kind of systems can estimate depths properly only in the range where both cameras are focused. With modern CMOS technologies the pixels have been reduced to dimensions as small as one micron and soon will be below one micron. It is well known that as the pixels of photo-sensors become smaller, the depth of field in the object world (depth of focus in the image world) deteriorates, hence the range of distances of the real world that are in focus become shorter and shorter as the pixels become smaller and smaller. It would be possible to reverse that trend using smaller apertures, but at the expense to receive less light and hence decrease the number of frames per second that can be recorded. For this reason, mini-cameras used in mobile telephony with a large pixel count (10-20 megapixels or more) and small pixel sizes (around one micron) are starting to use "autofocus" solutions which are mostly implemented with MEMS (Micro-Electro-Mechanical Systems), mobile elements that move lenses back and forth along the optical axis to focus the image.

If a stereo pair uses autofocus, both cameras will be focused, but the information of the areas out of focus has definitively been blurred or lost (mixing over the sensor or film information from different areas and depths of the object world). Hence, the stereo process, that is, triangulation to know the distance of the same pattern in both cameras to the real world, will not improve the blurriness in the areas out of focus, polluting the distance calculations which will not eventually offer any more reliable data. Different solutions can be thought to tackle this problem, for example, to have one of the two cameras focused on short distances and the other focused on long distances. However, this solution makes worse the triangulation solutions, having to identify the same pattern in areas blurred in one of the cameras and un-blurred in the second camera, which increases the difficulty and impacts the reliability of the correspondence algorithms.

Another possible solution but much more sophisticated is to use special lenses that are colour dependent, so that the 3 different colours of the Bayer pattern (or any other fundamental colour pattern) are focused at three different ranges for short, medium and long distances, combining the result afterwards to get what has been called EDOF (Extended Depth of Field). Although EDOF has been applied to only one camera, it can potentially be extended to the two cameras of a stereo pair. Different permutations of colours and focus position in the two cameras of the stereo pair can also be used.

Whichever of the mentioned approaches is used, it becomes finally necessary to either focus both cameras (or colours) around the same range of depths in the object world (in which case information from the areas out of focus in both cameras [or colours] cannot be used to calculate depths anymore) or mix blurred and un-blurred images in the triangulation process, yielding suboptimum results.

Yet another possible solution to extend the range of depth, where stereo approaches can be used to estimate depths, would be to design the cameras with extremely small apertures and relatively large pixels, extending the depth of field from very small distances (a few centimetres) to infinity, and do the same for both cameras in the stereo pair. However, that trade-off is not for free. In principle, it would be possible to reverse the trend previously explained with smaller apertures, but that at the expense to receive less light and hence decrease the number of frames per second that can be recorded (unacceptable in video applications). Finally, it would be possible to make the pixels larger, against the actual trend to have a larger number of megapixels with smaller pixels, but that would result in extremely large sensors inappropriate for handheld applications and allowable only in large professional cameras.

As previously indicated, plenoptic cameras can be used to estimate depths of a scene by analysing the epipolar images. Plenoptic cameras have the advantage of having a much higher depth of field since the aperture is effectively divided into several small apertures (usually hundreds), increasing drastically the depth of field. Depth of field of a plenoptic camera can practically be from a few centimetres to infinite distance, making these devices much more attractive for large depths of field than stereo approaches. In plenoptic cameras it is even possible to avoid the requirement to have MEMS to variate the focus of the camera.

The proposed invention enables plenoptic cameras to compute depth maps in an extremely efficient way, allowing the processing of real-time video-images at a high frame rate (60 frames per second or more). Moreover, the present invention also takes advantage of the multiview system to significantly enhance the accuracy of depth estimation of plenoptic cameras at large distances from the camera, still being able to enjoy existing (and/or novel) techniques for super-resolution and improvements of lateral resolution, refocusing and traditional depth estimation techniques. The procedure herein disclosed improves state-of-the-art approaches in terms of computational efficiency and power requirements.

SUMMARY OF INVENTION

The present invention relates to a computer-implemented method and a device that obtain a depth map by processing the light field image captured by a plenoptic camera or any other light field acquisition devices, plenoptic function sampling devices or integral image acquisition devices. Other cameras may be used in combination with a plenoptic camera, such as one or more conventional cameras or additional plenoptic cameras, forming a multiview system.

Plenoptic cameras can be used to estimate depths of a scene by analysing the epipolar images. There is a relation between the slope of the epipolar lines produced in epipolar images in a plenoptic camera and the actual depth of an object in a scene (in the object world). Hence, by detecting the slope of the lines of an epipolar image it is possible to generate a depth map of the scene. The method is very computationally efficient, since calculations may be performed only for those parts of the sensor where edges in the scene have been found, thus avoiding calculations in regions of the object world where edges were not detected. This way, the method can be used to obtain real-time depth maps even in low-cost mobile devices with low cost processors operated by batteries, where efficient computations are needed to avoid draining batteries quickly.

The present invention uses an extremely efficient algorithm that allows 3D-images in plenoptic cameras, mobile devices (mobile phones, tablets, laptops, compact cameras, etc.), motion sensing input devices and 3D-cameras processing real-time video-images (at 60 frames per second and even more) by identifying object edges and calculating the depth only for the identified edges.

There is a relation between the slope of the lines produced in the epipolar images and the actual depth of the object in the scene. Hence, by detecting the slope of the lines of an epipolar image it is possible to generate a depth map of the scene. Usually, methods based on a two-dimensional gradient of the epipolar images are used to obtain the corresponding slope. Similar methods based on four-dimensional gradients (and, thus, more computationally expensive) can also be employed. In contrast to all these approaches, the present method calculates the depth of the scene only for the edges, drastically reducing computation requirements.

Light field photography implicitly captures 3D scene geometry and reflectance properties into a light field. A light field is a four-dimensional structure where the incident light rays are described by means of their spatial position (2D: lx and ly) and by their directions of arrival (2D: px and py). In the present invention, a 4D light field (px,py,lx,ly) is considered as the output of a plenoptic camera. These devices are becoming more and more popular due to their potential application to estimate the depth map of a scene. If colours are also captured by the sensor (for example by using the so-called Bayer patterns or similar), the light field would be a 5D structure (px,py,lx,ly,c) where c is the different colour channels captured. For clarity and simplicity, in the present invention it is assumed that the light field is a 4D structure without colour information. Nevertheless, an expert in the field will understand that the extension of the disclosed information for sensors that capture colour information is trivial and straightforward. A possible solution would be to apply the algorithms herein presented to each colour channel separately in order to increase the redundancy of depth estimations.

Depth estimation from the light field is more and more spread in light field applications, especially in 3D imaging applications. However, in order to obtain a 3D reconstruction or a depth map of a scene, the data contained in the light field need additional post-processing that transforms the input 4D light field structure to a 2D image where for each pixel captured by the plenoptic camera it is possible to calculate its depth in the real object world. Basically, in plenoptic imaging objects at different distances from the camera produce different illumination patterns onto the sensor of a plenoptic camera and, therefore, an appropriate processing of these patterns can be carried out to obtain the corresponding distance, i.e. the depth at which these objects are in the object world. The main drawbacks of plenoptic imaging systems are the loss of spatial resolution and the fact that their depth estimation accuracy decreases very quickly as the distance to the camera increases.

Another well-known methodology to estimate the depth of the object in a scene is by stereo vision. By tracking the displacement of image points between different viewpoints of the same scene is possible to estimate the distance of the objects of a scene using basic triangulation. Stereo vision aims to identify the corresponding points from the object world as recorded (or viewed) from two different viewpoints (two different cameras separated from each other), working out their displacement to reconstruct the geometry of the scene as a depth map.

According to an embodiment of the present invention, the system and the processing method herein described are implemented as a multiview system including (but not limited to) at least one light field plenoptic camera and one or more additional cameras (conventional cameras and/or plenoptic cameras). This invention creates a high-quality depth map of a scene with higher precision and for larger distances than the previous art. The present invention allows improving epipolar lines from plenoptic cameras with additional data from a horizontally aligned conventional camera (horizontal epipolar line improvement); however, this does not limit the generality of the invention, which may include multiple cameras (provided that at least one of them is a plenoptic camera) and any alignment between them.

Considering an embodiment with only one plenoptic camera with N' plenoptic views (or, equivalently, N' pixels below each microlens) and (M×N)−1 conventional cameras within an array of M×N cameras, the present invention provides the following main advantages:

The invention improves the computational efficiency of the state-of-the-art methodologies since there is no need to work out stereo pair correspondences (very computationally intensive) between the points recorded by each camera, since the epipolar lines formed in the plenoptic epipolar images are used to find the corresponding points.

The method of the present invention is not computationally demanding; besides, the invention employs parallelizable tasks that can enjoy the benefits of modern parallel computing platforms.

The invention can be used in any kind of mobile devices operated by batteries due to its low computing power requirements. This, coupled to the progress of miniaturised mini-cameras, is especially useful for the new generation of mobile devices. Having two cameras is becoming common and multiview will soon be too.

The invention offers much more redundancy and noise tolerance since the image is formed by N'+[(M×N)−1] images, adding the images captured by the (M×N')−1 conventional cameras as additional plenoptic views. The present invention has N'−1 images more than a conventional multiview system of M×N conventional cameras and (M×N)−1 plenoptic views more than a conventional plenoptic camera, and having these additional images (or views) it is possible to have much wider baselines than the plenoptic camera.

Due to the small baseline and the high number of views captured by the plenoptic camera, the effect of occlusions is nearly negligible. This way, the drawbacks of stereo and traditional multiview vision systems regarding incompleteness and discontinuities produced in depth estimation due to occlusions in the object world are overcome.

The disclosed invention uses interpolation (or any other method to establish a correspondence between two images of different resolution of the same world scenery) to improve the resolution of the plenoptic camera, keeping up with the resolution of the conventional cameras. Therefore, the resolution of every plenoptic view is significantly increased.

The invention overcomes the drawbacks of a plenoptic camera-based system regarding inaccuracies produced in depth estimation at large distances from the camera. This improvement is achieved by using several possible different approaches:

Combining the depth map from the plenoptic camera and the 2D images of the (M×N)−1 conventional cameras.

Combining each of the N' plenoptic views of the plenoptic camera and the 2D images of the (M×N)−1 conventional cameras as multi-stereo configurations N'-times, considering as multi-stereo every one of the (M×N) cameras of the array. This may include using traditional correspondence algorithms.

Extending the epipolar images of the plenoptic camera with the 2D images of the (M×N)−1 conventional cameras.

The disclosed invention improves depth maps at particularly difficult zones of the image (due for instance to occlusions) by applying classic stereo algorithms. Assuming that a first depth map is created by means of any of the previously described combinations, in at least one embodiment a possible refinement of this first depth map may be carried out by applying classic stereo algorithms, solving possible ambiguities of the first depth map obtained on those difficult zones of the image.

The invention improves the refocusing capability that can be achieved using only a stereo pair or multiview.

In the discussion above it is assumed that there is only one plenoptic camera on the array of M×N cameras, but the generalization to have more than one plenoptic camera is straightforward. As it will be later explained, by having more than one plenoptic camera redundancy on the measurements to calculate distances and on the image formation process, and noise immunity are improved; moreover, the computational efficiency is enhanced when using the information of the conventional cameras.

This disclosure relates to light field technology and multiview vision systems in order to estimate depths of scenes. An image processing procedure to produce a depth map of a scene by estimating the slope of extended epipolar lines is also herein disclosed.

According to an embodiment, the present invention refers to a device and method for real-time depth estimation using a multiview imaging system. The system comprises at least one light field plenoptic camera and can also include additional conventional cameras. Such a multiview system, with the appropriate image processing procedures, is able to create a depth map of the scene with a very high-quality resolution, overcoming the drawbacks of current plenoptic cameras and multi-camera systems. The present invention achieves better precision in depth measurements and in the maximum measurable depth, and at the same time also provides additional advantages such as smoother transitions among the different depths captured and represented in the depth map as well as a better perception to the human eye, and also enhancing the capability to digitally refocus the image after the scene has been captured and to apply artistic effects.

The method of the present invention is extremely efficient in terms of computational requirements, and it can be used in any kind of mobile devices operated by batteries due to its low computing power requirements. The method herein described can also be parallelized efficiently in several processors and/or GPUs as well as in specific parallel processors for battery operated mobile devices.

For the description of the present invention the following definitions and acronyms will be considered hereinafter:

Microlens array: a plurality of lenslets (microlenses) arranged in an array.

Regular microlens array: array formed by microlenses that have been designed to be regularly spaced and regularly built (homogeneous pitch through the whole structure of the array, same radius of curvature for all the lenses, same focal length, etc.), not taking into account the inhomogeneity due to fabrication imperfections.

Lenslet or microlens: each small lens forming a microlens array.

Plenoptic camera: device that captures not only the spatial position but also the direction of arrival of the incident light rays.

Conventional camera: device that captures only the spatial position of the light rays incident to the image sensor, such that each pixel of the sensor integrates all the light coming in any direction from the whole aperture of the device.

Light field: four-dimensional structure LF (px, py, lx, ly) that contains information of the light captured by the pixels (px, py) below the microlenses (lx, ly) in a plenoptic camera.

Plenoptic view: two-dimensional image formed by taking a subset of the light field structure by choosing a certain value (px,py), the same (px, py) for every one of the microlenses (lx, ly).

Depth: distance between the plane of an object point of a scene and the main plane of the camera, both planes are perpendicular to the optical axis.

Depth map: two-dimensional image in which the calculated depth values (dz) of the object world are added as an additional dimension value to every pixel of the two-dimensional image, composing (dx,dy,dz).

Disparity map: difference in image position of the same set of 3D points in the object world when captured by two cameras from two different perspectives. Disparity can be used to determine depth by triangulation.

Epipolar Image: two-dimensional slice of the light field structure composed by choosing a certain value of (px,lx) (vertical epipolar image) or (py,ly) (horizontal epipolar image).

Epipolar line: set of connected pixels within an epipolar image detected as an object edge.

Valid epipolar line: epipolar line whose shape complies with a shape expected to be created by an edge in the object world in an ideal camera free of aberrations, misalignments and manufacturing tolerances.

Extended epipolar line: set of pixels of the epipolar line of a plenoptic camera extended by one or more pixels (corresponding to the same point in the object world) of one or more conventional cameras.

Baseline: in a multiview system, distance between the centre of the apertures of two consecutive cameras (plenoptic or conventional cameras or any camera).

Smart mini-cameras: miniature camera modules of small dimensions for mobile devices that can have additional features like the ability to adjust their frame rate automatically with illumination change, focus at different distances, zoom-in and out, etc., transforming the captured images according to predefined criteria.

Stereo correspondence (or just correspondence): technique that matches the points of an image with those points of another image, identifying the same point in the object world as seen from different points of view. This process figures out which parts of one image correspond to which parts of another image, where differences are due to different perspectives.

Microimage: image of the main aperture produced by a certain microlens of a plenoptic camera over the image sensor.

FOV: Field of view.

In accordance with one aspect of the present invention there is provided a method for obtaining depth information from a light field. The method comprises the following steps: generating a plurality of images (e.g. at least one horizontal epipolar image, at least one vertical epipolar image, or a combination thereof) from a light field captured by a light field acquisition device (such as a plenoptic camera); an edge detection step for detecting, in the epipolar images, edges of objects in the scene captured by the light field acquisition device; in each epipolar image, detecting valid epipolar lines formed by a set of edges; determining the slopes of the valid epipolar lines.

In an embodiment, the edge detection step comprises calculating a second spatial derivative for each pixel of the epipolar images and detecting the zero-crossings of the second spatial derivatives. The step of determining the slopes of the valid epipolar lines may comprise applying a line fitting to the detected edges.

The detection of valid epipolar lines in an epipolar image may comprise determining epipolar lines as a set of connected edges and analyzing the epipolar lines to determine whether the epipolar lines are valid or not. The epipolar lines are preferably determined as a set of connected edge pixels. In an embodiment, the analysis of the epipolar lines to determine whether they are valid or not comprises checking compliance with at least one criterion. In an embodiment, a criterion relates to the number of pixels forming the epipolar line exceeding a determined threshold (for instance, the number of pixels forming the epipolar line must be at least equal to the number of pixels of the height of the corresponding epipolar image). Another criterion may refer to the consistency of the direction of the edges pixels within the epipolar image. In an embodiment, a combination of the previous criteria is employed. Alternatively, instead of checking compliance with at least one criterion, the analysis of the epipolar lines to determine whether the epipolar lines are valid or not may comprise a morphological analysis, a heuristic method or a machine learning algorithm. In an embodiment, the analysis of the epipolar lines may include disregarding one or several rows of pixels at the top and/or at the bottom of the epipolar image.

The method may also comprise generating a slope map assigning slopes to positions in the object world. In an embodiment, the step of generating a slope map comprises assigning slope values only to the detected edges. The step of generating a slope map may also comprise applying a filling algorithm to assign slope values to positions of the slope map taking into account the slopes previously obtained for the detected edges. The method may comprise generating a single slope map from a combination of redundant slopes obtained from different valid epipolar lines for the same position. In an embodiment, the slopes assigned to a certain position with high dispersion with respect to rest of the values of such position are discarded.

The method may further comprise generating a depth map assigning depth values to positions in the object world, wherein the depth map is obtained by applying a conversion slope to depth to the slope map. According to another embodiment, the method comprises obtaining depth values corresponding to the slopes of the valid epipolar lines, and generating a depth map assigning depth values to positions in the object world.

The step of generating a depth map may comprise assigning depth values only to the detected edges. The step of generating a depth map may comprise applying a filling algorithm to assign depths values to positions of the depth map taking into account the depth values previously obtained for the detected edges. The method may comprise generating a single depth map from a combination of redundant depth values obtained from different epipolar images for the same position to generate a single depth map.

In an embodiment, the depth values assigned to a certain position with high dispersion with respect to rest of the values of such position are discarded.

In an embodiment, the method comprises the generation of a slope map and/or a depth map, wherein the number of positions of the slope and/or depth map is higher than the number of microlenses by using the subpixel precision obtained in the zero-crossings.

In an embodiment, only one slope value per valid epipolar line is obtained. The method may also comprise a step of applying a filter to the epipolar images to obtain filtered epipolar images before the edge detection stage. In an embodiment, the light field acquisition device is a plenoptic camera.

The detection of valid epipolar lines may comprise extending the epipolar lines of the epipolar images from the light field acquisition device with additional information of images captured by at least one additional image acquisition device to obtain an extended epipolar line.

The epipolar images may be extended adding, above and/or below, the additional information depending on the relative positions of the at least one additional image acquisition device to the light field acquisition device. The additional information is preferably added at a certain distance above and/or below the epipolar images according to horizontal and vertical offsets previously computed in a calibration process. In an embodiment, the horizontal epipolar images are extended adding the additional information of the at least one additional image acquisition device that is horizontally aligned with light field acquisition device. The vertical epipolar images may be extended adding the additional information of the at least one additional image acquisition device that is vertically aligned with light field acquisition device.

The additional information may comprise edge pixels contained in images captured by at least one conventional camera, wherein said edge pixels correspond to the object edge represented by the epipolar line. Alternatively, or in addition to, the additional information may comprise epipolar lines contained in images captured by at least one additional light field acquisition device, wherein said epipolar lines correspond to the object edge represented by the epipolar line.

In an embodiment, the method comprises determining a search region in the images captured by the conventional cameras where the edge pixels corresponding to the epipolar line are searched for. The method may comprise determining a search region in the images captured by the additional light field acquisition devices where the central edge pixel of the epipolar lines of the additional light field acquisition devices corresponding to the object edge represented by the epipolar line are searched for. In both cases, the search region may be a one-dimensional window or a two-dimensional window. The size of the search region is preferably selected based on the uncertainty of depth measurements from the light field acquisition device expected from the dispersion curve at a first estimated depth distance considering only the light field acquisition device.

According to an embodiment, the method comprises:
  Calculating a linear regression of the epipolar line from the light field acquisition device.
  Obtaining an extension line from the image captured by a conventional camera.
  Extending the epipolar image of the light field acquisition device with the extension line of the conventional camera.

Calculating the intersection point of the epipolar line and the extension line.

Defining a search region around the intersection point.

The epipolar image are preferably extended with the extension line using horizontal and vertical offsets previously computed during a calibration process. The calibration process to obtain the horizontal and vertical offsets may comprise placing a luminescent point in the conjugated plane of the light field acquisition device aligned with the optical axis and calculate the required offsets to obtain a vertical epipolar line vertically aligned with the pixel of the conventional camera that contains the light produced by the luminescent point.

The step of obtaining an extension line may comprise determining an equivalence between the vertical and/or horizontal coordinates of the image captured by the light field acquisition device and the vertical and/or horizontal coordinates of the conventional camera image. In an embodiment, the equivalence between the vertical and/or horizontal coordinates of the pixels of the image sensors of the acquisition devices is obtained by placing a luminescent pattern in the conjugated plane of the light field acquisition device aligned with the optical axis and calculate the relation between the vertical and/or horizontal sizes of the light patterns captured by each of the image sensors of the acquisition devices. The method may further comprise applying a correspondence process to find the edge pixel in the conventional camera image that matches the object edge represented by the epipolar line.

The step of obtaining the extended epipolar line may comprise assigning weights to the epipolar line and the additional information. The method may further comprise obtaining all-in-focus images from a multi-view system comprising the light field acquisition device and at least one conventional camera. The step of obtaining all-in-focus images comprises:

For objects located at a distance beyond a threshold from the multiview system, obtaining focused images from the at least one conventional camera.

For objects located at a distance below a threshold from the multiview system, obtaining refocused images from the light field acquisition device.

Composing a final all-in-focus image by taking, for distances below the threshold, the sharpest objects from the refocused images of the light field acquisition device and, for distances beyond the threshold, taking the focused images from the at least one conventional camera.

In another embodiment, the method further comprises a step of refocusing images from a multiview system comprising the light field acquisition device and at least one conventional camera. The step of refocusing images comprises:

Calculating a depth map.

For objects located at a distance below a threshold from the multiview system, using refocused images from the light field acquisition device.

For objects located at a distance beyond a threshold from the multiview system, selecting a focused range of distances from the at least one conventional camera and blurring objects in the image placed at a distance beyond the selected focused range. The blurring is preferably performed using a Gaussian filter.

The method may comprise generating a slope map for the light field acquisition device and for at least one additional light field acquisition device. In an embodiment, the different generated slope maps are combined into a single slope map considering the vertical and horizontal offsets between the light field acquisition devices. The method may comprise generating a depth map using stereo correspondence algorithms between all the views captured by the light field acquisition devices and the images captured by the conventional cameras. In an embodiment formed by one plenoptic camera and one or more conventional cameras, the method includes using information provided by the conventional cameras to enhance the accuracy of the slopes estimated in the epipolar images of the light field camera.

In accordance with a further aspect of the present invention there is provided a device for generating a depth map from a light field. The device comprises processing means configured to carry out the steps of the previously explained method. In an embodiment, the device may comprise a light field acquisition device, such as a plenoptic camera. In another embodiment, the device may comprise a multiview system comprising a plurality of cameras in which at least one of them is a light field acquisition device. The multiview system may comprise at least one conventional camera. In an embodiment, the device may comprise one or more plenoptic cameras and one or more conventional cameras. The one or more conventional cameras may be vertically and/or horizontally aligned with the light field acquisition device. The multiview system may comprise a two-dimensional array of light field acquisition devices and conventional cameras.

Preferably, the device is an electronic mobile device, such as a smartphone, a tablet, a laptop or a compact camera. The processing means may comprise a first CPU configured to obtain and analyze horizontal epipolar images and a second CPU configured to obtain and analyze vertical epipolar images. In another embodiment the processing means comprises a multi-core processor. Alternatively, or in addition to, the processing means may comprise a graphics processing unit.

In accordance with yet a further aspect of the present invention there is provided a computer program product for generating a depth map from an image captured by a plenoptic camera or generating a depth map from a set of images captured by one or more plenoptic cameras and one or more conventional cameras, comprising computer code instructions that, when executed by a processor, causes the processor to perform the method previously explained. In an embodiment, the computer program product comprises at least one computer-readable storage medium having recorded thereon the computer code instructions.

BRIEF DESCRIPTION OF DRAWINGS

A series of drawings which aid in better understanding the invention and which are expressly related with an embodiment of said invention, presented as a non-limiting example thereof, are very briefly described below.

FIGS. 4A-4D depict the formation process of horizontal and vertical central epipolar images for the examples of FIGS. 1, 2 and 3.

FIG. 11A-11D shows the uncertainty introduced by the non-infinitesimal pixel size of the sensor when measuring the slope of epipolar lines produced by an object located at a certain distance.

FIG. 19A-19B illustrates how a possible setup formed by a conventional and a plenoptic camera captures the light emitted by an object in the world placed at the conjugated plane of the microlens array of the plenoptic camera.

FIG. 20A-20B shows the calculation process of the horizontal offset H.

DETAILED DESCRIPTION

The present invention relates to a device and method for generating a depth map from a light field. A light field can be captured by multiple kinds of devices. For simplicity, first only plenoptic cameras will be considered. Afterwards, the method is described when applying it to a multiview system consisting of one or more plenoptic cameras and one or more conventional cameras. Nevertheless, the method herein described can be applied to light fields captured by any other device, including other integral imaging devices.

A conventional camera only captures two-dimensional spatial information of the light rays captured by the sensor. In addition, colour information can be also captured by using the so-called Bayer patterned sensors or other colour sensors. A plenoptic camera captures not only this information but also the direction of arrival of the rays. Usually a plenoptic camera is made by placing a microlens array between the main lens and the sensor. Each of the microlenses (lx,ly) is forming a small image of the main aperture onto the sensor. These small images are known as microimages such that, each pixel (px,py) of any microimage is capturing light rays coming from a different part of the main aperture, every one of the microimages below any microlens is an image of the main lens aperture, and every pixel in position px1,py1 or pxn,pyn in every microlens integrates light coming from a given part of the aperture (axn,ayn) irrelevant of the position of the microlens. Light crossing the aperture in position (axn,ayn) coming from different locations from the object world will hit different microlenses, but will always be integrated by the pixel (pxn,pyn). Accordingly, the coordinates (px,py) of a pixel within a microimage determine the direction of arrival of the captured rays to a given microlens and (lx,ly) determine the two-dimensional spatial position. All this information is known as light field and can be represented by a four-dimensional matrix LF(px,py,lx,ly) or five-dimensional matrix LF(px,py,lx,ly,c) if the colour information (c) is considered. Hereinafter only monochrome sensors are considered. These sensors capture the intensity of the sensed light for the whole spectrum for which they have been designed. However, the invention herein described can be straightforwardly extended to sensors that also capture colour information as it will be obvious for an expert in the field. A possible adaptation of the present invention for these kind of sensors is to apply the method herein described to each colour channel separately in order to further increase the redundancy of depth estimations.

Figure 1B:
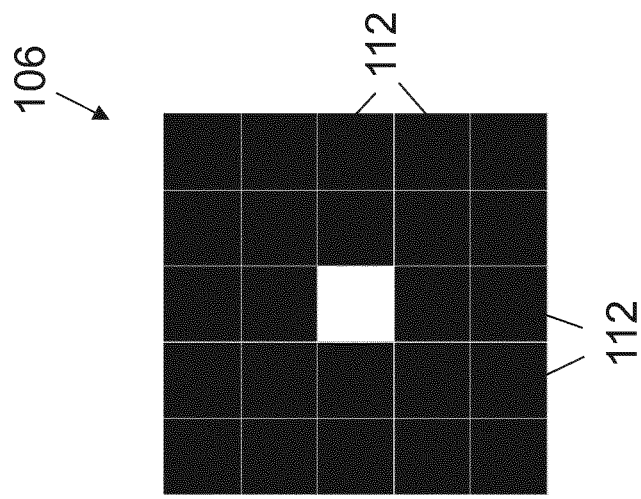
FIG. 1B illustrates the light captured by the image sensor of the plenoptic camera.
Figure 1A:
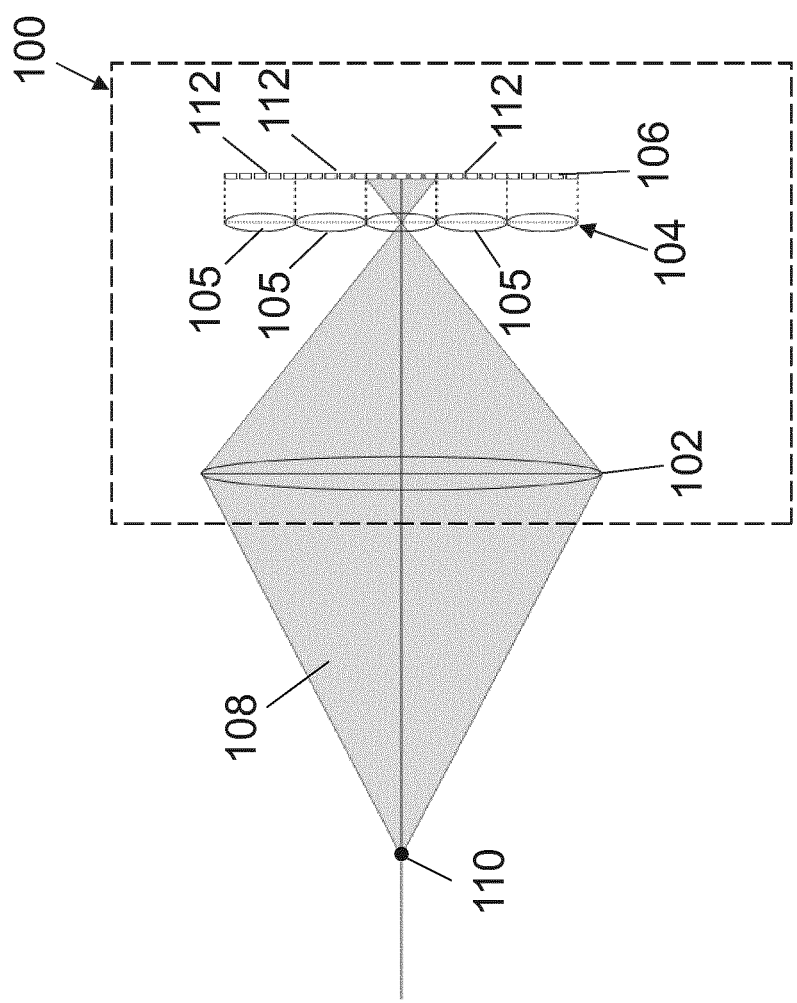
FIG. 1A represents a plenoptic camera capturing the light of an object placed at the conjugated plane of the microlens array.

Objects in the world at different depths or distances to the camera produce different illumination patterns on the image captured by the image sensor of a plenoptic camera. FIG. 1A depicts a schematic two dimensional view of a plenoptic camera 100 comprising a main lens 102, a microlens array 104 (formed by a plurality of microlens 105 gathered in rows and columns) and an image sensor 106 positioned behind the microlens array 104 to sense intensity, color and directional information. In the example shown in FIG. 1A, the plenoptic camera 100 is capturing the incoming light rays 108 from an object point 110 placed at the conjugated plane of the microlens array 104. FIG. 1B represents the light captured by the image sensor 106 of the plenoptic camera 100. Each cell of the grid represents the microimage 112 produced by each microlens 105 over the image sensor 106.

When the image of an object point 110 is focused on the microlens array 104, the object point 110 is placed at the conjugated plane of the MLA through the main lens 102 of the plenoptic camera 100 and only an infinitesimal point over a microlens 105 is illuminated (actually, not an infinitesimal point but a diffraction pattern). In addition, since the separation between the microlenses 105 and the image sensor 106 is approximately the focal length of the microlenses 105, all the pixels of the corresponding microimage 112 collect exactly the same light intensity, as shown in FIG. 1B. In all the images over the image sensor plane herein shown, the black colour is used to represent the lack of light and the whiter the pixels are, the more illuminated they are with grey levels meaning partial illuminations.

Figure 2B:
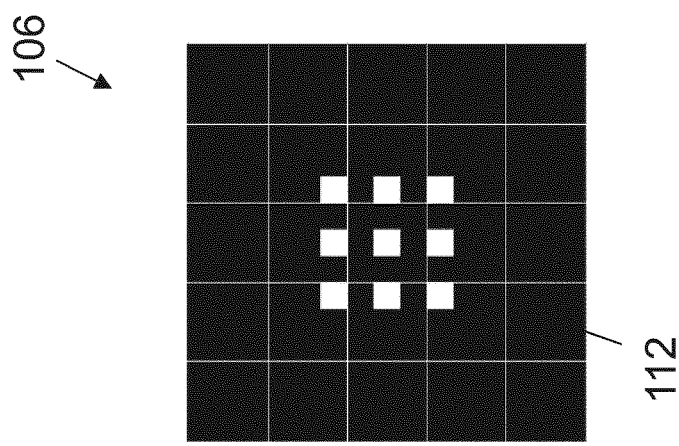
FIGS. 2A and 2B show a plenoptic camera capturing the light of an object placed closer than the conjugated plane of the microlens array.
Figure 2A:
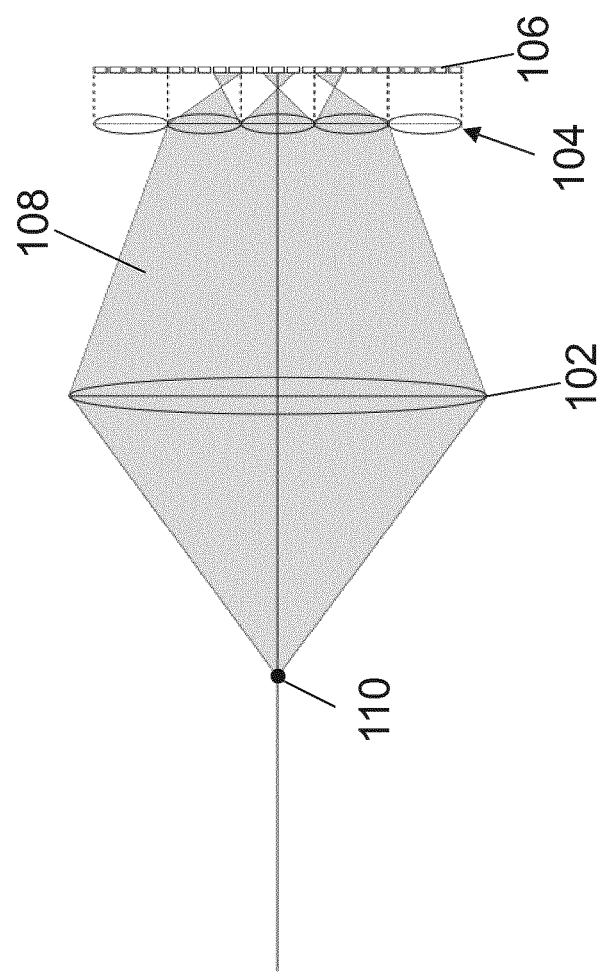

On the other hand, object points 110 of the scene that are closer than the conjugated plane of the microlens array 104 in the object world will illuminate more microlenses 105 since the focus point in the image world would have been further than the microlens array 104 (more towards the right side), and the pattern captured by the sensor pixels will be different. The diagram of this scenario is illustrated in FIG. 2A, whereas FIG. 2B shows the corresponding pattern produced over the image sensor 106.

Figure 3B:
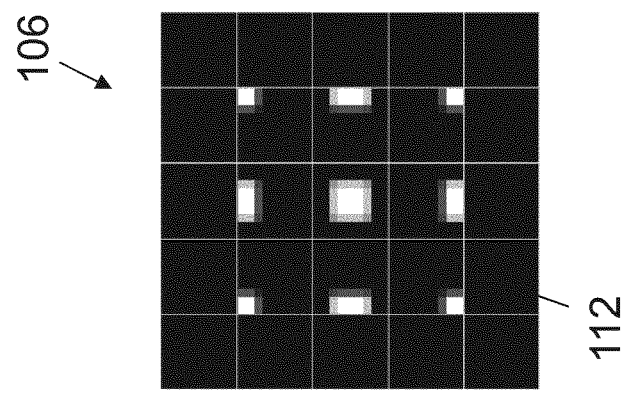
FIGS. 3A and 3B depict a plenoptic camera capturing the light of an object placed further than the conjugated plane of the microlens array.
Figure 3A:
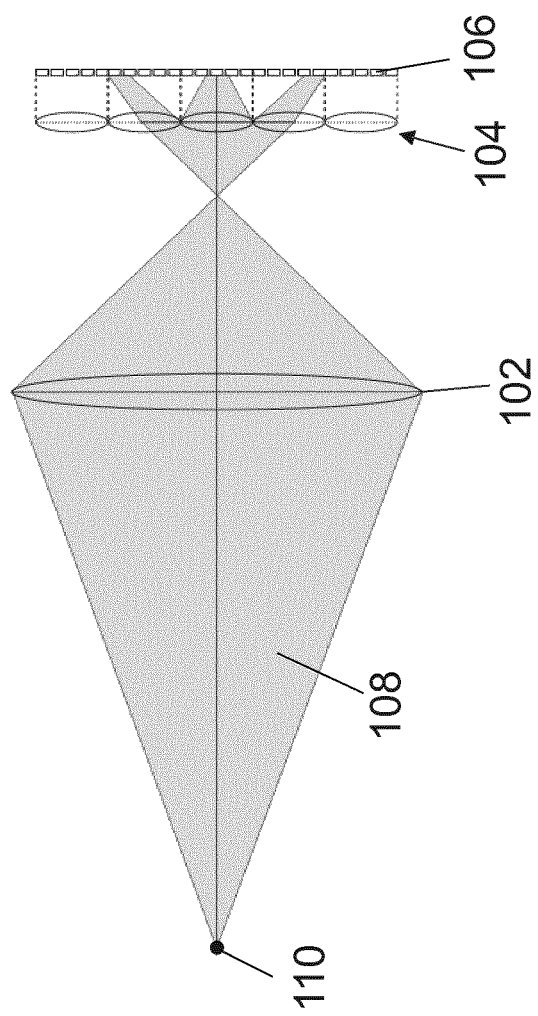

Conversely, an object point 110 that is further than the conjugated plane of the microlens array 104 illuminates also more microlenses 105 but now the focus point is closer to the main lens 102 than the microlens array 104 position and, thus, the pattern captured by the image sensor 106 differs from the two previous situations, as shown in FIGS. 3A and 3B. The grey levels in some of the microimages 112 correspond to pixels partially illuminated whereas in the white pixels the whole area of the pixel has been hit by the light coming from the object point 110 in the object world.

These various patterns of the light field captured by the image sensor 106 can be represented in epipolar images by taking two-dimensional slices of the light field. FIGS. 4A-4C depict, respectively for each one of scenarios of FIGS. 3A-3C, the generation process of horizontal epipolar images 400 (upper row) and vertical epipolar images 402 (lower row), by reorganizing the pixels captured by the image sensor 106. FIG. 4A shows the pattern created over the sensor for a point in the object world located at the conjugated plane of the microlens array. FIG. 4B depicts the pattern created for a point in the object world located closer to the camera than the conjugated plane of the microlens array. FIG. 4C represents the pattern created for a point in the object world located further from the camera than the conjugated plane of the microlens array.

Horizontal epipolar images 400 are formed by fixing the coordinates (py,ly) of the light field whereas vertical epipolar images 402 are formed by fixing the coordinates (px,lx). In FIGS. 4A-4C the horizontal epipolar images 400 and the vertical epipolar images 402 are, respectively, horizontal-central epipolar images and vertical-central epipolar images since the pixels py and px which have been fixed for the epipolar images are the central-horizontal and central-vertical pixels of their respective microlenses. FIGS. 4A-4C shows how vertical epipolar images 402 (lower row) and horizontal epipolar images 400 (upper row) are formed directly from the captured light field.

Figure 4D:
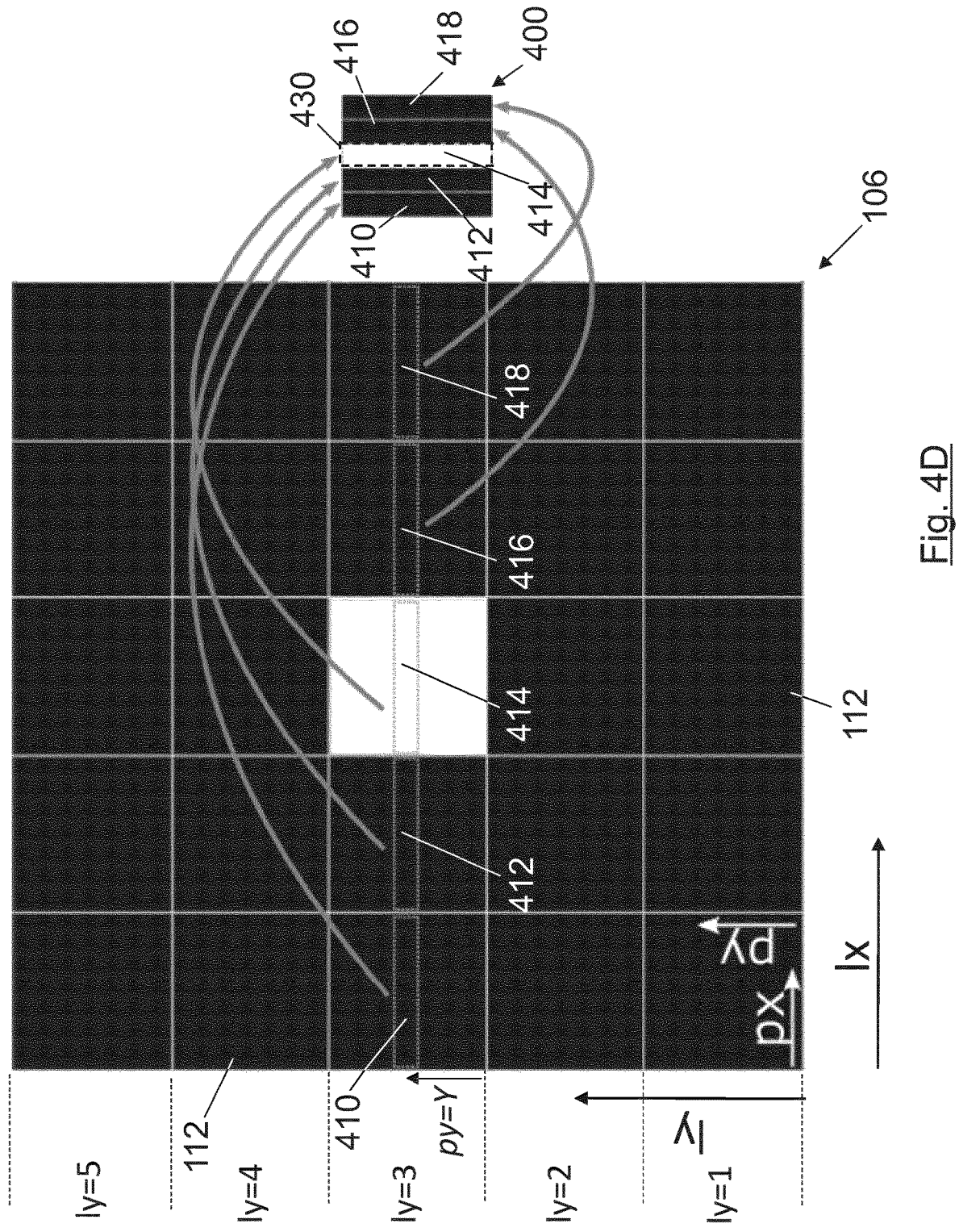

FIG. 4D shows in more detail the generation process of a horizontal epipolar image 400 (a zoom view of upper row of FIG. 4A), formed by stacking the pixel lines (410, 412, 414, 416, 418) located at height py=Y of the microimages 112 corresponding to the microlenses 105 located in the same row ly (at ly=3 in the example of FIG. 4D, the horizontal-central microlenses 105 of the microlens array 104). Since the selected height py=Y of the pixel lines (410, 412, 414, 416, 418) in the microimages 112 is the central height, the horizontal epipolar image 400 is considered a horizontal-central epipolar image. The individual pixels (px=1, px=2, ... ) forming each pixel line (410, 412, 414, 416, 418) in FIG. 4D are not depicted. By contrast, each vertical epipolar image (402) is formed by stacking the pixel lines positioned at a determined width px=X of the microimages 112 corresponding to microlenses 105 located in the same column lx.

As it can be seen in FIGS. 4A-4D, in the horizontal epipolar images 400 and vertical epipolar images 402 an epipolar line 430 (coloured in white) is formed. All the illuminated pixels (white pixels) of this epipolar line 430 correspond to the same object point 110 in the object world, as illustrated in the examples of FIGS. 1B-3B. An epipolar line 430 is a set of connected illuminated pixels (not black pixels) within an epipolar image which are detected as edges. Additionally, the slope of the epipolar line 430 is directly related to the type of pattern illuminated over the microlenses 104 and over the image sensor 106 and also to the corresponding depth of the object point 110 in the object world. In the example of FIG. 4D, the slope of the epipolar line 430 is ∞ (angle=90° with respect to the horizontal axis), which corresponds with a distance such that the object point 110 is placed at the conjugated plane of the microlens array 104 (FIG. 1A). If the slope is positive (angle is lower than 90°), the object point 110 is closer to the main lens 102 (FIG. 2A), whereas if the slope is negative (angle higher than 90°), the object point 110 is further from the main lens 102 (FIG. 3A).

Hence, by knowing this pattern it is possible to back-trace the patterns sampled by the pixels through the plenoptic camera 100 and obtain the exact depth (dz) of the object point 110 that produces such pattern. The relation between depth and slope depends on the physical dimensions and design (which are known) of the plenoptic camera 100 used to capture the light field.

Accordingly, a certain slope of an epipolar line 430 is unequivocally related to a certain depth of an object point 110 of the real three-dimensional world scene.

The estimated slope of an epipolar line contains depth information of a certain object. Slope and depth are two sides of the same coin (it is possible to obtain depths from slopes in a deterministic way and vice versa, with only quantification errors in the conversions due to the fact that sensor pixels are not infinitesimal). The slope itself is sufficient to obtain information about the relative depth of the different objects of a scene. This relative information (i.e. the slope) can be useful for some applications in which it is not necessary to provide absolute depth information, such as identifying the different objects of a scene that are located at the same depth (same slope). Thus, in such scenarios the calculation of slopes is sufficient and the conversion slope to depth can be omitted.

The method of the present invention is based on the calculation of depths only for the areas where there are edges on the projection of the world over the microlens array 104 (or what is the same, edges on the object world). In a preferred embodiment, a linear regression is applied to the illuminated pixels that form an epipolar line 430 in order to obtain a certain slope. When analysing an epipolar line 430 in a horizontal 400 or vertical 402 epipolar image, all the plenoptic views distributed along the horizontal (pa) or vertical (py) dimension are considered since the same object point 110 has been captured by all these views. Therefore, the linear regression technique reduces statistical noise by taking advantage of redundant information along one dimension.

Furthermore, the method includes an additional stage to further reduce the statistical noise by analysing the same object point 110 in the horizontal 400 and vertical 402 epipolar images and considering the depth values obtained with the various epipolar images (400, 402) that contain information of the same object point 110 (for example, it is clear that a unique object point 110 in the object world, as shown in FIGS. 1 to 4, produces several imprints in several points of the image sensor 106 and those imprints appear in several vertical and several horizontal epipolar images).

In an embodiment, all the epipolar lines 430 formed in the horizontal 400 and vertical 402 epipolar images are identified and the corresponding slope is calculated. Then, the corresponding depth of the object point 110 is calculated by considering the physical dimensions of the device.

Only one slope and depth value per epipolar line 430 is calculated since an epipolar line is formed by the same object point 110 captured from several points of views. Hence, the amount of data is drastically reduced due to the following two factors:

(i) As compared to other approaches which process all the points captured by the image sensor 106, the present method only processes the points of interest, i.e. the areas of the object world that are detected as edges because they create epipolar lines (as areas of the object world completely uniform, without edges, do not produce any epipolar line but uniform colours).

(ii) It is possible to store only one slope value per epipolar line 430 instead of storing one value per each pixel that forms the epipolar line 430.

Therefore, the output of this calculation process may be just the corresponding depth values of these detected slopes.

According to an embodiment, the slopes obtained by analysing the horizontal 400 and vertical 402 epipolar images and epipolar lines 430 are combined into one four-dimensional matrix to reduce statistical noise, due to the fact that the reliability of the output is improved by redundancy of additional measurements since the same sensor pixel is considered when analysing both the vertical 402 and the horizontal 400 epipolar images and, thus, several slope values may have been produced by the same point of the object world.

The slopes calculated are transformed to the corresponding object depths by considering the physical parameters of the plenoptic camera 100. In an embodiment, this transformation stage is performed after combining all the redundant slopes, reducing drastically the number of slope-to-depth transformations.

In another embodiment, the previously generated four-dimensional matrix of depths/slopes is combined into a two-dimensional sparse depth/slope map (sparse because it offers readings only where there are edges in the object world), reducing even more the statistical noise and, thus, increasing the quality of the depth map.

In yet another embodiment, the depths/slopes calculated for the epipolar lines 430 in the horizontal 400 and vertical 402 epipolar images are directly combined into a two-dimensional sparse depth/slope map, therefore performing a single combination stage, what increases the computational efficiency.

In an embodiment, the sparse depth/slope map is filled by applying image filling techniques to obtain depth/slope values for every pixel dx, dy).

In yet another embodiment, only the horizontal-central epipolar images (formed by setting the coordinate py to be equal to the centre pixel in the p, dimension within a microimage 112), and/or only the vertical-central epipolar images (formed by taking the coordinate px equal to the centre pixel in the px dimension within a microimage), as shown in FIGS. 4A-4D are considered with the aim to reduce the number of epipolar images to analyse and, thus, increasing the performance at the cost of reducing the statistical redundancy.

The method of the present invention can be implemented in mobile devices (e.g. smartphones, tablets or laptops) equipped with a plenoptic camera.

Figure 5:
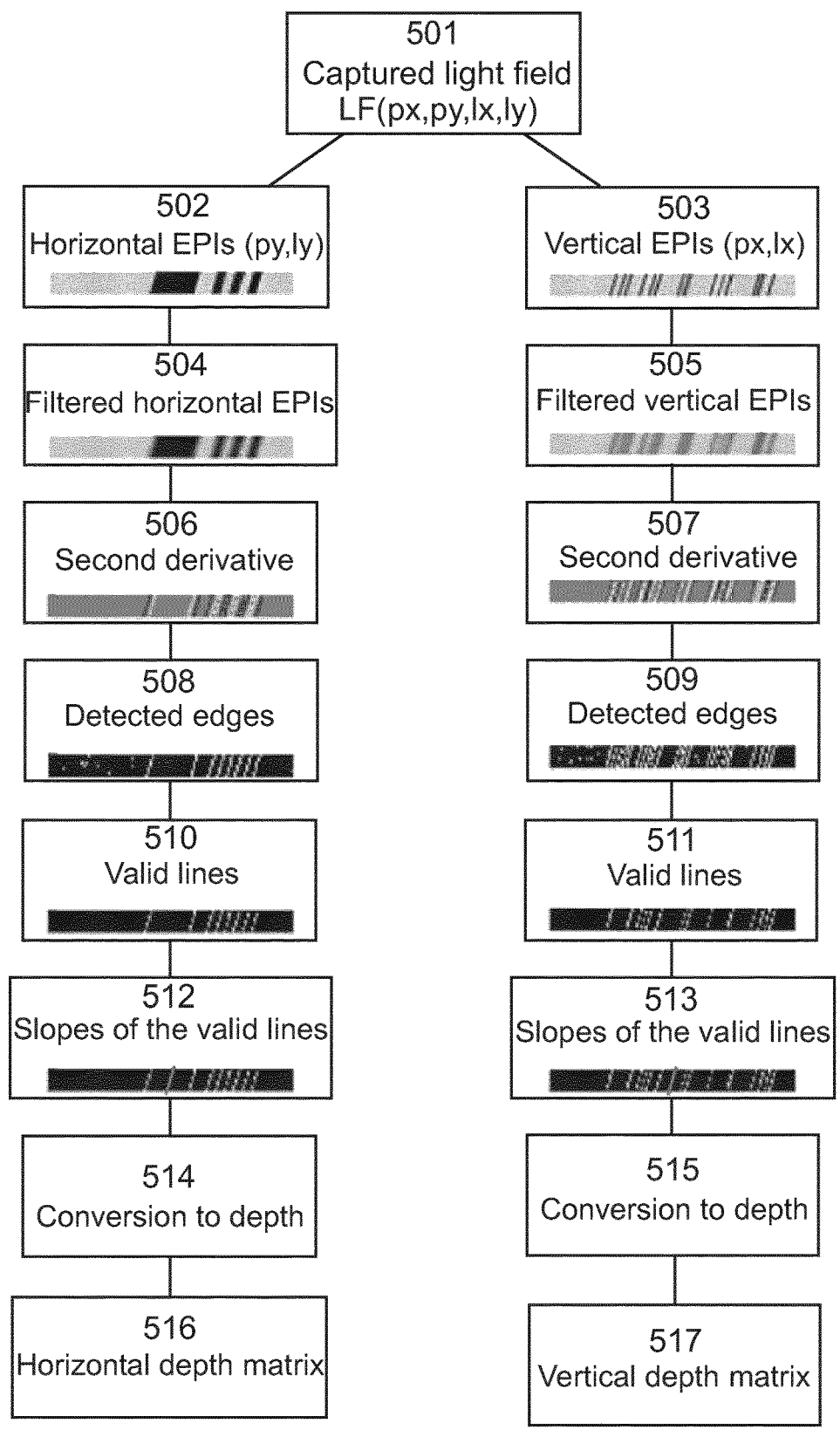
FIG. 5 depicts, according to an embodiment, a diagram of a process flow for determining the depth of a point in the object world by analysing the lines detected in the epipolar images.

FIG. 5 shows a flow diagram of a method for generating depth maps according to an embodiment. In order to generate a depth map, the method generates horizontal 502 and vertical 503 epipolar images from a light field 501 captured by a plenoptic camera 100. For each horizontal 502 and vertical 503 epipolar image generated, the valid epipolar lines (510, 511) within epipolar images are identified. Then, the slopes (512, 513) of these valid epipolar lines (510, 511) are calculated and the corresponding depth values (514, 515) are finally obtained.

FIG. 5 describes the process of identifying and processing the valid epipolar lines (510, 511) taking as input a captured light field 501 and processing all the horizontal 502 and vertical 503 epipolar images ("EPIs" in FIG. 5) performing the following steps:

For each horizontal epipolar image 502, obtained for a fix couple of (py,ly) values:
  Apply a one-dimensional (or higher) filter along the lx dimension in order to reduce noise, obtaining a filtered horizontal epipolar image 504.
  For each pixel (px,lx), calculate the second spatial derivative 506 at pixel (px,lx) over the light intensity or contrast of the pixels along the lx dimension.
  Determine the edges 508 of the object world by analysing the epipolar lines with sub-pixel precision, more specifically by detecting the zero-crossing of the second spatial derivatives.
  Search for every one of the zero-crossings that are correctly arranged forming a valid epipolar line 510, discarding invalid epipolar lines.

For each vertical epipolar image 503, obtained for a fix couple of (px,lx) values:
  Apply a one-dimensional filter along the ly dimension in order to reduce noise, obtaining a filtered vertical epipolar image 505.
  For each pixel (py,ly), calculate the second spatial derivative 507 along the ly dimension.
  Determine the edges 509 of the object world by analysing the epipolar lines with sub-pixel precision, more specifically by detecting the zero-crossing of the second spatial derivatives.
  Search for every one of the zero-crossings that are correctly arranged forming a valid epipolar line 511, discarding invalid epipolar lines.

For each valid epipolar line (510, 511) found in both the horizontal and vertical epipolar images, the sub-pixel precision edges are used to determine the slope (512, 513) of the valid epipolar line (510, 511) by performing a linear regression technique (but any other fitting technique might also be used).

For each calculated slope, a conversion slope-to-depth (514, 515) is applied.

Finally, two matrixes of depths are generated, a horizontal depth matrix 516 for the horizontal epipolar images 502 and a vertical depth matrix 517 for the vertical epipolar images 503.

The noise reduction filter steps to obtain filtered horizontal 504 or vertical 505 epipolar images may be optionally discarded to increase the processing speed.

In another embodiment the two slope matrices (obtained from the horizontal 502 and vertical 503 epipolar images) are combined into a single slope matrix and finally obtain a single depth matrix.

According to an embodiment, the zero-crossings of the second spatial derivatives are identified by consecutive positive-negative or negative-positive values of the second derivative. In addition, in order to obtain sub-pixel precision, the magnitude of the second derivative of these points is considered to determine where the actual zero-crossing is taking place. An expert skilled in the art would recognize that many other edge detection methods (such as the Canny edge detector operator, curve fitting methods or moment-based methods) can also be applied for this purpose and the techniques described herein are not limited to the zero-crossing method. Nevertheless, it is extremely important to obtain the maximum accuracy as possible when determining the slope of the lines formed by the detected edges, that is why the sub-pixel precision to determine the edges is very important. One of the goals of the proposed method is to be computationally efficient (this requirement should be considered when choosing the edge detection algorithm to be employed).

Areas of the object world completely uniform (without any texture or colour contrast) will not produce any epipolar line as all the pixels will record the very same light intensity, independent of the distance of the light sources to the camera. All the embodiments shown in FIGS. 1 to 4 correspond to a "dark" object world with only one radiating point light source (object point 110) creating epipolar lines 430 within epipolar images (400, 402).

In a real situation epipolar lines 430 are created by a change of contrast or a change of colour, and that is why epipolar lines 430 correspond to edges (changes of colour or contrast) in the object world.

Hence, epipolar lines 430 are produced by object edges. The first derivative of the epipolar images (i.e. over the intensity of the pixels) provides the gradient (i.e. the quickness with which the light intensity or contrast changes). The second derivative indicates where the contrast is changing quickest (which corresponds to object edges in the object world). Since the second derivative will not necessarily have the zero crossing at a given pixel (as it depends on the values of intensity of light in pixels, for example the epipolar image in FIG. 6A has some grey level) the object edges are being determined with subpixel precision.

Due to the very nature and the design constraints of a plenoptic camera 100, the pixels that form a valid epipolar line (510, 511) within an epipolar image, must necessarily be in neighbouring positions (i.e. the points that form a valid epipolar line must be connected) and must compose a line with all its points going towards the same direction as we go up-downwards or down upwards in the epipolar line.

Figure 6C:
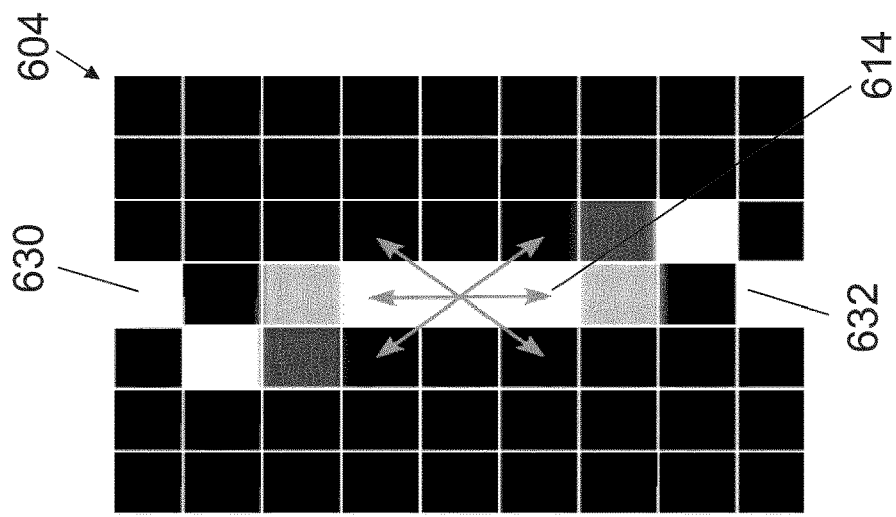
FIGS. 6A-6C show various examples of valid and not-valid epipolar lines in an epipolar image.
Figure 6B:
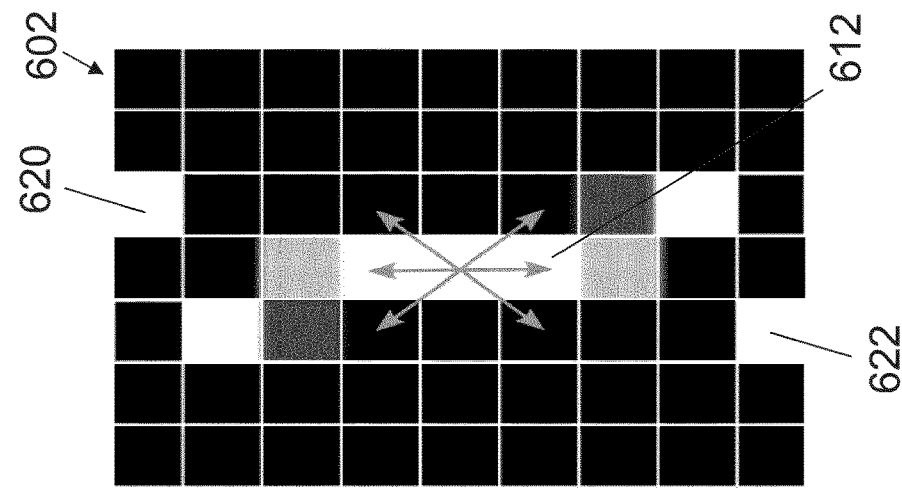
Figure 6A:
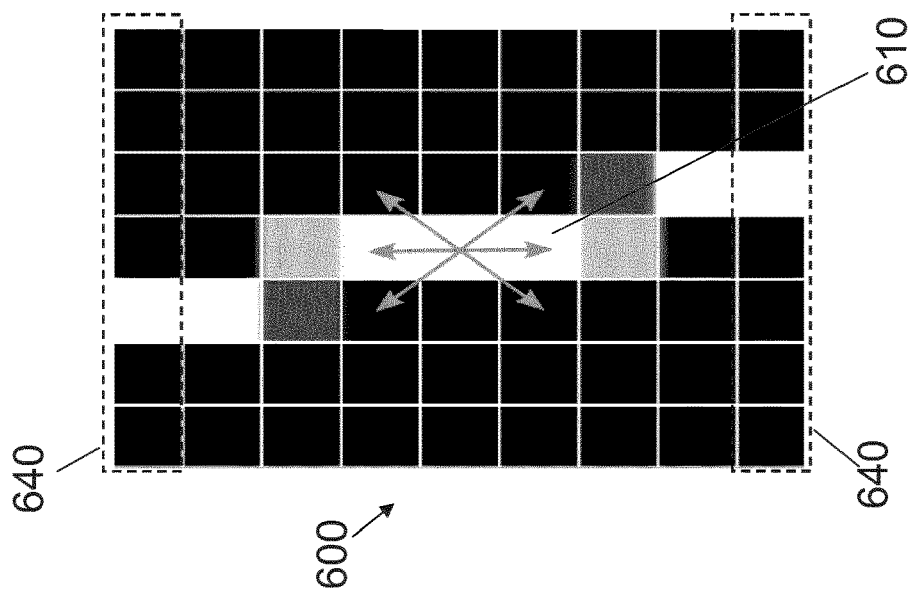

FIGS. 6A-6C depict an example (FIG. 6A) of a valid epipolar line 610 in an epipolar image 600 and several examples (FIGS. 6B and 6C) of not-valid epipolar lines (612, 614) in respective epipolar images (602, 604). In a preferred embodiment only the neighbouring positions are considered when looking for edges in an epipolar image to form a valid epipolar line (starting from the central pixel detected as edge, the arrows in FIGS. 6A-6C represent the neighbouring positions which are considered for determining the connected edge pixels that form the epipolar line). Consequently, epipolar lines 610 as the one shown in FIG. 6A are considered as valid whereas epipolar lines 612 like the one shown in FIG. 6B are detected as not-valid as the pixel at the top 620 and the pixel at the bottom 622 of the epipolar image 602 are not connected to the rest of the epipolar line 612.

At first sight, epipolar lines 614 as the one shown in FIG. 6C may be considered as a valid epipolar line. However, due to the nature of plenoptic cameras 100 such lines would not happen in a flawless device (the pixels at the top 630 and at the bottom 632 do not follow the same direction as the rest of the epipolar line). In one embodiment, these extreme pixels (630, 632) of these kind of lines can be omitted when calculating the slope of the epipolar lines, and still be considered as valid epipolar lines, as the outer pixels possibly come from aberrations of the main lens. This way, we trade-away received light power and slope discrimination capabilities to reduce the aberrations of extreme pixels, formed by rays that crossed the most aberrated peripheral part of the aperture. It is also possible that the entire line can be labelled as not-valid in order to avoid performing calculations with not-valid epipolar lines.

Heuristically, it is easy for a human-being to discriminate between valid and not-valid epipolar lines by visually inspecting the morphology of the lines. However, the algorithms to take a decision on a computer are not straightforward. For an expert in the matter it is not difficult to conceive several different algorithms to perform that task and the particular implementations of any algorithm analysing the morphology are irrelevant for the content of the invention. It has been defined heuristically how to identify valid epipolar lines and many computer solutions to perform that task may be developed.

In an embodiment, only the epipolar lines that have at least the same number of illuminated pixels than the height of the epipolar images are considered as valid lines. This can increase the accuracy of slope calculations in devices where aberrations have been practically corrected (optically or computationally in a previous stage).

The highest aberrations of the main lens 102 are produced at the extremes of the lens (areas far from its centre in which the paraxial approximation is not valid anymore). All the light rays that pass through these extreme parts of the main lens 102 are more aberrated than the rays that crossed the lens nearer its centre. In a plenoptic camera 100 these rays are captured by the extreme pixels of every microimage 112, or extreme pixels of every microlens 104, which are also the extreme pixels 640 (FIG. 6A) near the top or the bottom of epipolar images. Hence, in an embodiment the extreme pixels 640 of the epipolar images can be omitted to reduce the effects of optical aberrations as well as to increase the number of detected depth values (increasing the number of valid epipolar lines by disregarding extreme pixels). Therefore, epipolar lines that have fewer pixels than the height in pixels of the epipolar images can be considered as valid, as for example FIGS. 6B and 6C disregarding their top (620, 630) and bottom (622, 632) pixels.

Figure 6E:
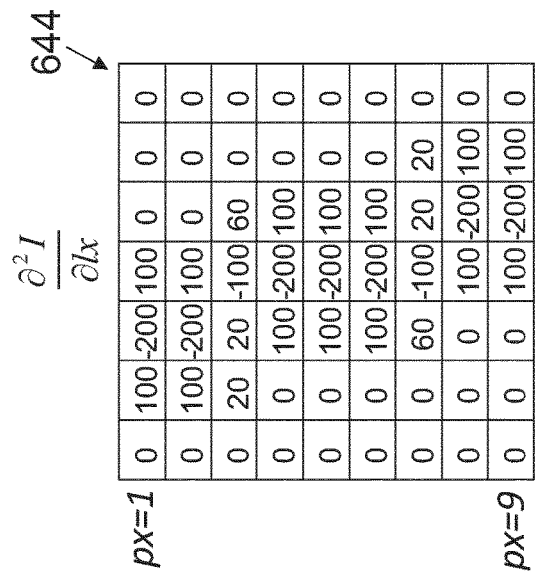
FIGS. 6D-6G show the calculation process of the slope of the epipolar line in the example of FIG. 6A.
Figure 6D:
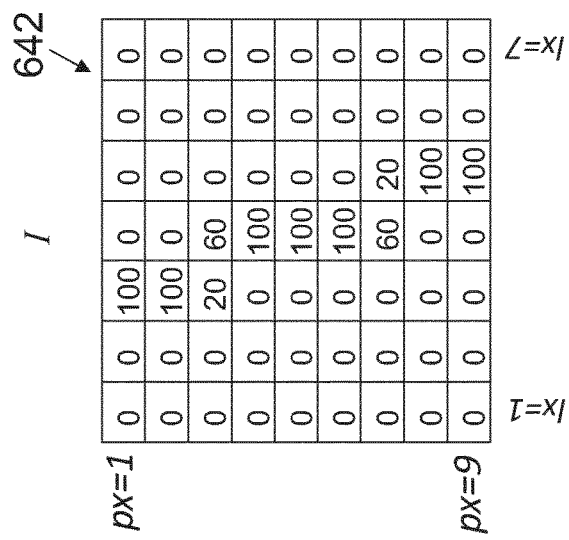

FIGS. 6D-6G represent an example for the calculation process of the slope of the epipolar line 610 in epipolar image 600 of FIG. 6A. In this example, the following intensity values "I" of the pixels have been considered, as shown in the table 642 of FIG. 6D: a value of 0 for the black pixels, a value of 20 for dark grey pixels, a value of 60 for light grey pixels, and a value of 100 for the white pixels. The table 644 of FIG. 6E represents the numerical second derivative at pixel i of the intensity I along the lx dimension, according to the following equation:

$$\frac{\partial^2 I(i)}{\partial lx} = I(i+1) + I(i-1) - 2 \cdot I(i)$$

where i+1 represents the subsequent pixel and i−1 the preceding pixel over the lx dimension. The distance Δlx between consecutive pixels is always the same (it has been considered a value of Δlx=1).

Figure 6F:
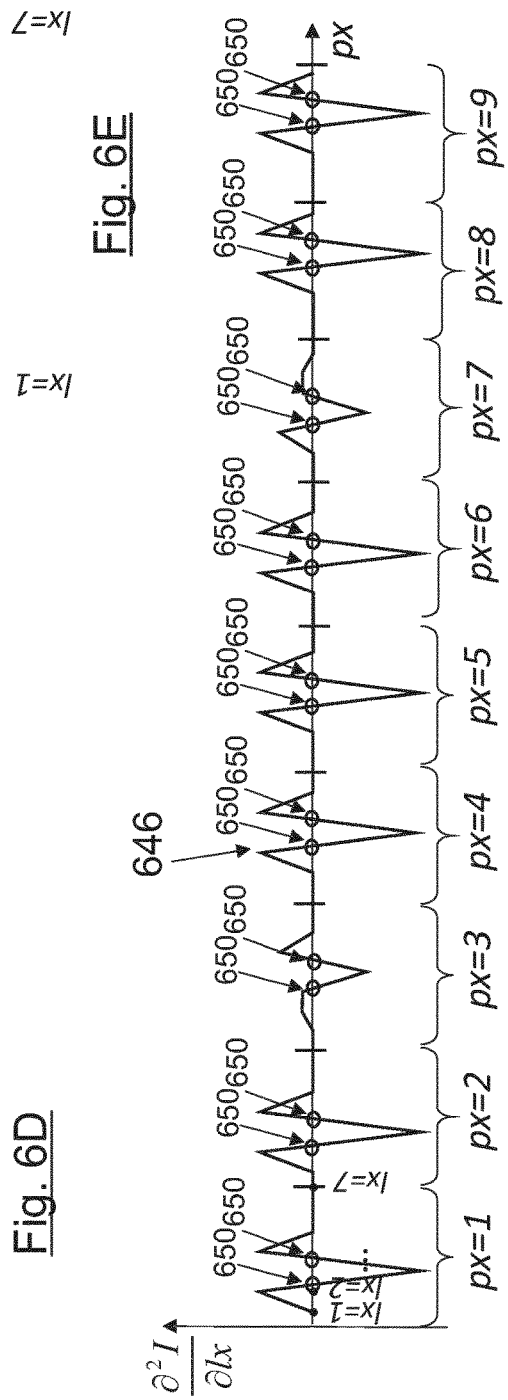

FIG. 6F depicts a graph 646 with the values of the second derivative (vertical axis) for every pixel px (horizontal axis) along the lx dimension (horizontal sub-axis), showing the zero-crossings 650 of the second derivative, identified by consecutive positive-negative or negative-positive values. As previously explained, the object edges in the object world are determined by detecting the zero-crossings 650 of the second spatial derivative.

Figure 6G:
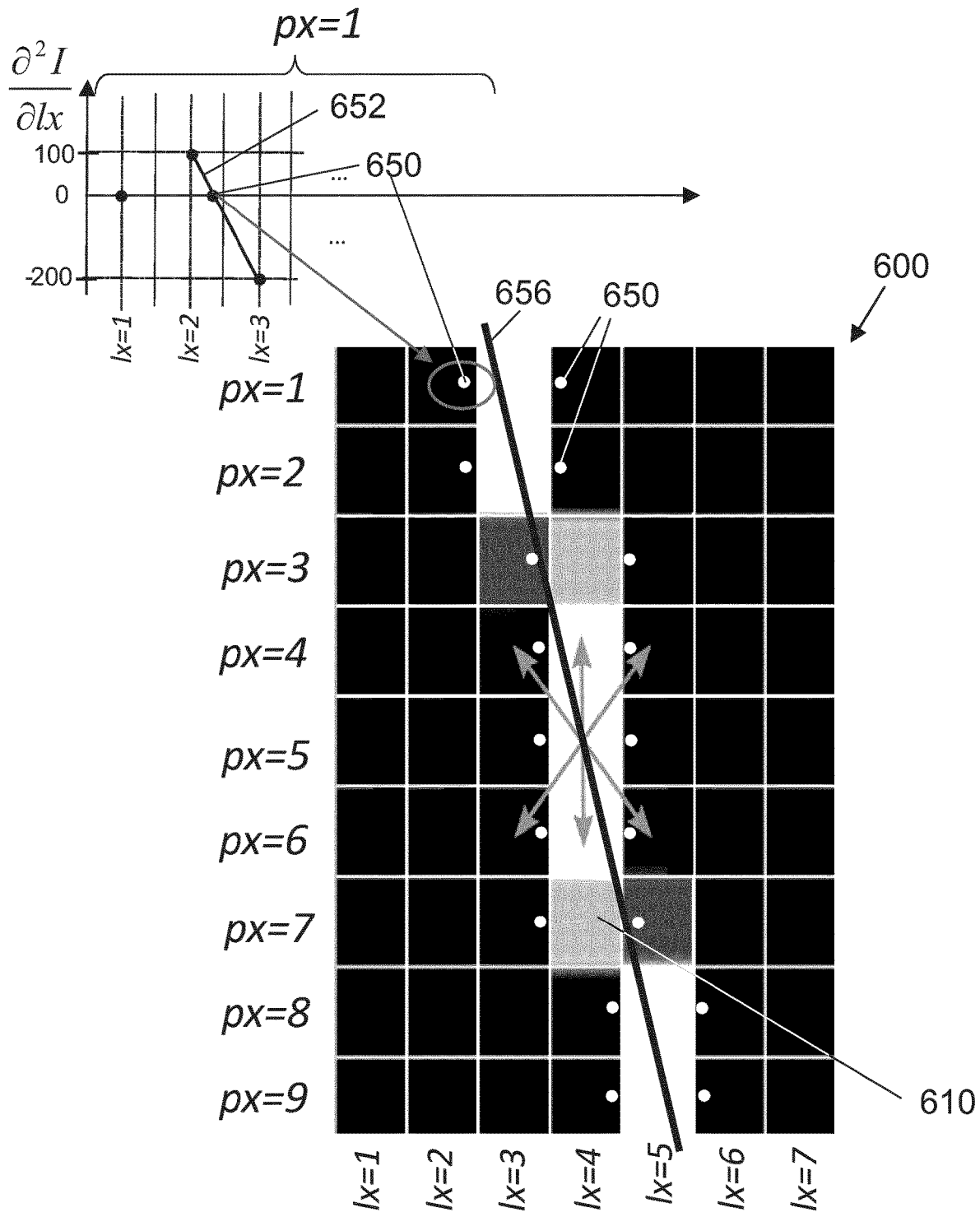

FIG. 6G depicts, in the epipolar image 600 of FIG. 6A, the zero-crossings 650 with sub-pixel precision. To understand the sub-pixel precision, the zero-crossing occurred for pixel px=1 between microlenses lx=2 (with a second derivative value of 100) and lx=3 (second derivative value of −200), has been zoomed-in. The line 652 connecting both second derivative values intersects the zero ordinate in the zero-crossing 650, which is located inside lx=2 with sub-pixel precision. The slope of the epipolar line 610 of FIG. 6G is obtained by applying a linear regression 656 to the detected zero-crossings 650 and directly computing the slope of the linear regression 656.

Figure 6J:
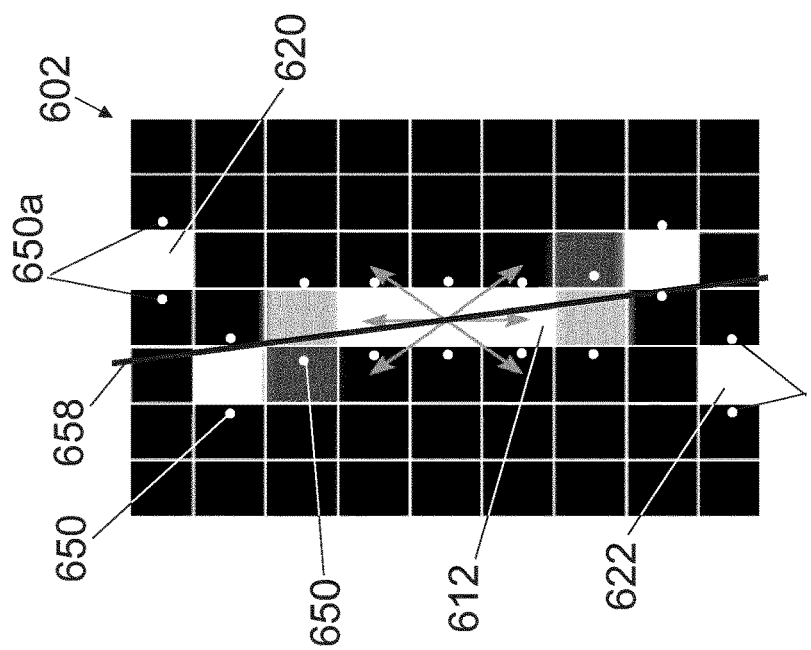
FIGS. 6H-6J illustrates the calculation process of the slope of the epipolar line of FIG. 6B.
Figure 6I:
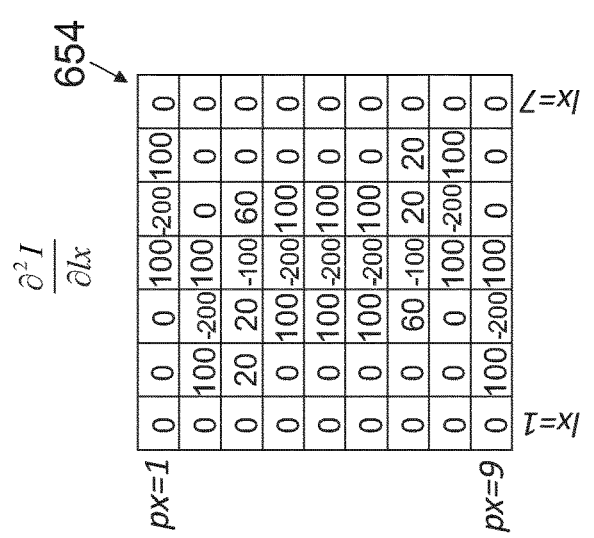
Figure 6H:
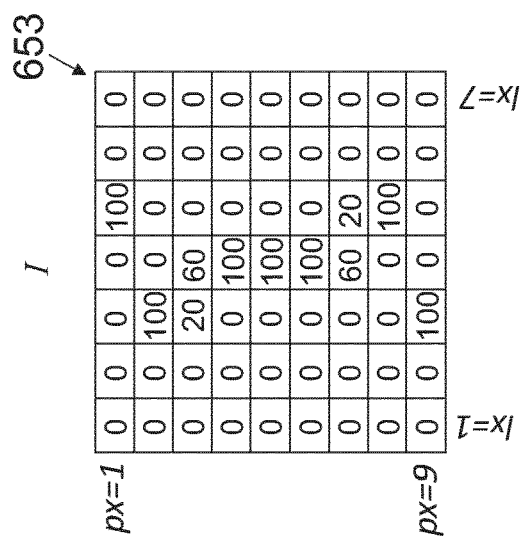

FIGS. 6H-6J represent another example for the calculation process of the slope of the epipolar line 612 in epipolar image 602 of FIG. 6B. The intensity values I of the pixels are shown in table 653 of FIG. 6H, whereas table 654 of FIG. 6I represents the second derivative values. The zero-crossings 650 are computed and shown as dots in FIG. 6J. The slope of the epipolar line 612 is computed by applying a linear regression 658 to the detected zero-crossings 650. Note that the linear regression 658 of the epipolar line 612 in FIG. 6J has a higher slope than the linear regression 656 of the epipolar line 610 in FIG. 6G due to the zero-crossings 650*a* and 650*b* obtained from the pixels 620 and 622 respectively.

In an embodiment all the zero-crossings are considered in the linear regression. However, in another embodiment some of the zero-crossings may be previously discarded and not considered in the process of obtaining the slope of the epipolar lines. The points with high dispersion in comparison with the rest of the points that are used to apply the linear regression technique can be identified and excluded from this process in order to obtain a more accurate slope estimation or to eliminate outliers. For example, in FIG. 6J the zero-crossing 650*a* originated by the top pixel 620 and the zero-crossing 650*b* originated by the bottom pixel 622 of the epipolar image 602 may be discarded when computing the linear regression 658 (obtaining an epipolar line with a slope similar to the slope obtained for the epipolar line 610 of FIG. 6G), since the top 620 and bottom 622 pixels are not connected to the rest of the pixels that originate the epipolar line 612 (in this case the top 620 and bottom 622 pixels may have been caused by aberrations of the main lens 102).

Once the second derivatives 644 are computed, it is decided whether they define valid or not-valid epipolar lines. For this process, some values of the second derivatives corresponding to some pixels may be discarded, as previously explained. A linear regression is applied to the valid zero-crossings to calculate their corresponding slopes. Conversely, for all those epipolar lines identified as not-valid, no further calculation need to be performed.

It is possible to use heuristic methods, morphological analysis, artificial intelligence or any other method to determine in advance from epipolar images if epipolar lines are valid or not-valid and avoid further calculations, not even calculating the slopes for epipolar lines that we know in advance they are not-valid.

In an embodiment, when applying the linear regression to the detected valid epipolar lines an error estimation may also be calculated. As an example, the sum of the distances between the points of the epipolar line (i.e. the zero-crossings) and the final estimated regression line can be used as error (i.e. the addition of the absolute values of the distances between the epipolar line calculated and the points used to calculate this epipolar line). However, any other type of error computation may be defined.

In an embodiment, a maximum error threshold can be used to discard (and not consider in the rest of the algorithm) an epipolar line. To that end, if the computed error is higher than the maximum error threshold the epipolar line is deemed not-valid, and if the computed error is lower than the maximum error threshold the epipolar line is deemed valid.

A horizontal epipolar image 400 may contain several epipolar lines (up to Nlx epipolar lines), as shown for instance in the detected valid epipolar lines 510 of a horizontal epipolar image 502 in FIG. 5. Similarly, a vertical epipolar image may contain several epipolar lines 511 (up to Nly epipolar lines). FIG. 7A shows an example of a horizontal epipolar image 700 including two different epipolar lines (710 and 712 in FIG. 7E). FIG. 7A shows the linear regressions (756, 758) of the zero-crossings 650 corresponding to both epipolar lines. This example represents a more realistic scenario than those presented in FIGS. 4 and 6 since the light pattern is now produced by an object with a certain size instead of infinitesimal. That is why the high intensity (white pixels) recorded by the image sensor 106 occupies several microlenses (lx) as in FIG. 7A.

Figure 7B:
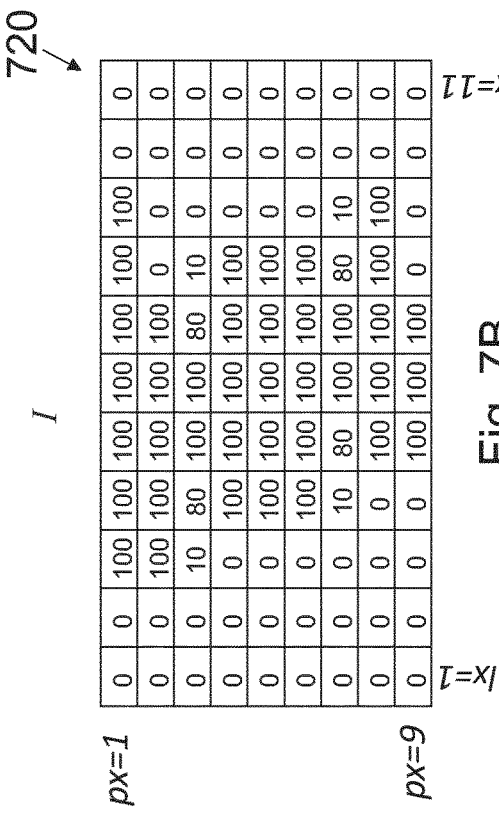
FIGS. 7A-7E show an epipolar image including several epipolar lines, and the calculation process of the corresponding slopes.
Figure 7C:
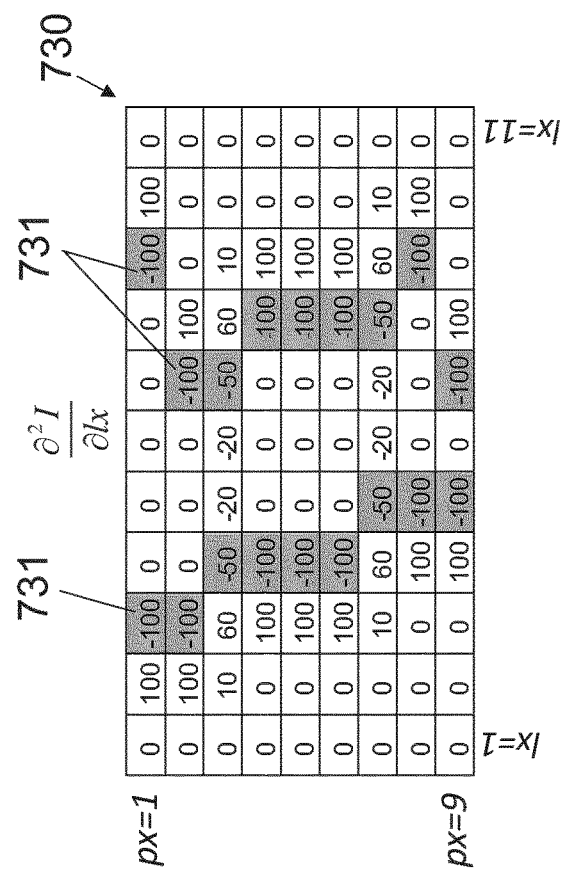
Figure 7A:
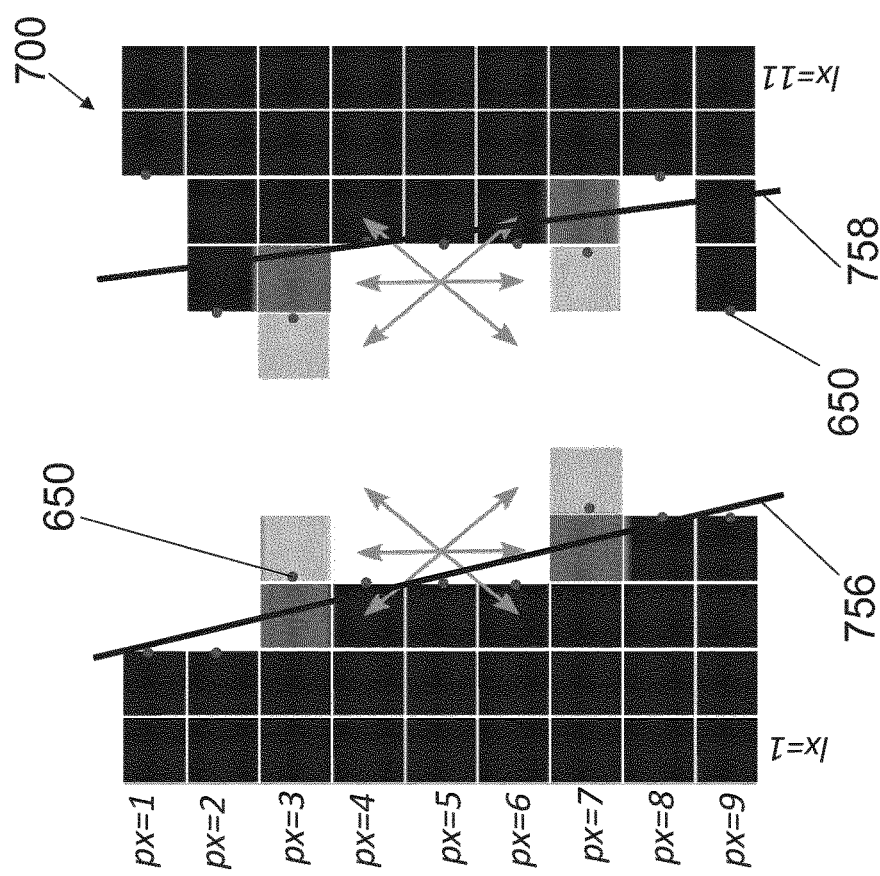
Figure 7D:
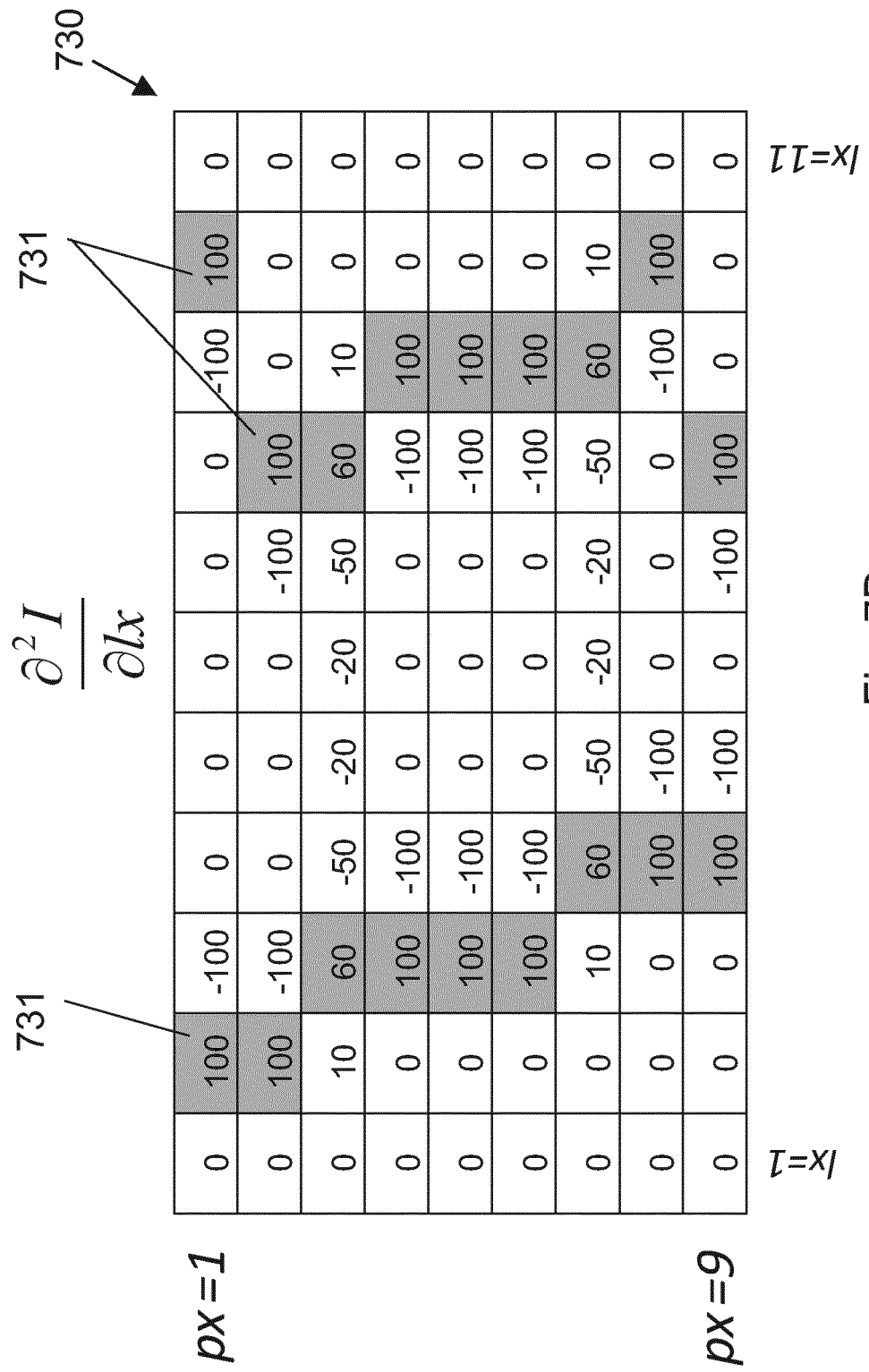

The intensity values "I" of the pixels of the epipolar image 700 are shown in table 720 of FIG. 7B, whereas table 730 of FIG. 7C represents the second derivative values. In an embodiment, the method to consider whether a pixel of an epipolar image is labelled or detected as edge pixel 731 or not comprises finding those pixels (px,lx) with a negative value of the second derivative that have at their right or left side a pixel with a positive second derivative (highlighted pixels of FIG. 7C). Alternative, as shown in FIG. 7D (the same table of FIG. 7C, second derivative values), a pixel of an epipolar image may be labelled as edge pixel 731 for those pixels (px,lx) with a positive value of the second derivative that have at their right or left side a pixel with a negative second derivative (highlighted pixels of FIG. 7D).

Figure 7E:
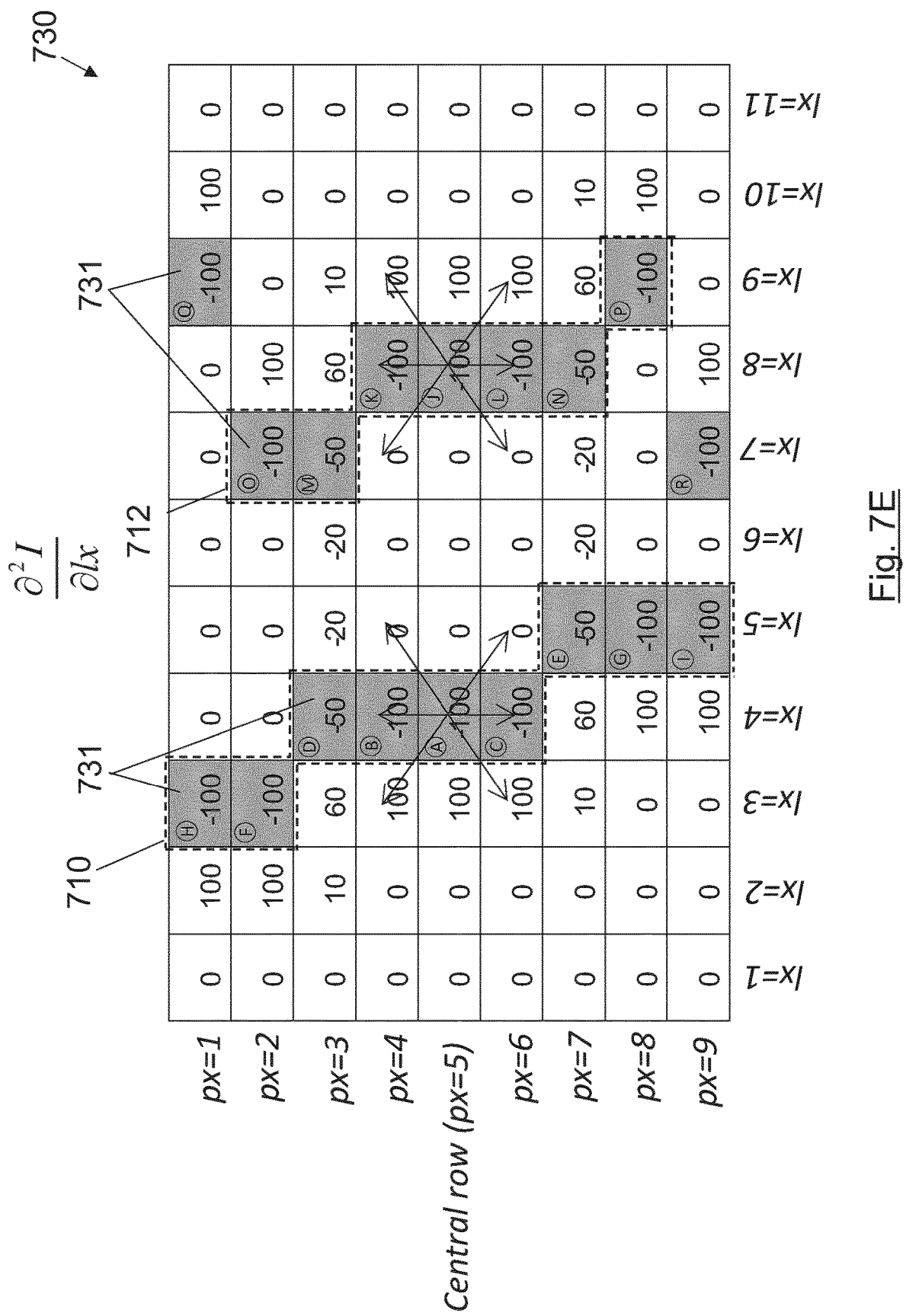

Once the edge pixels 731 have been detected, according to an embodiment the procedure to identify valid epipolar lines within epipolar images is herewith explained, making reference to the example of FIG. 7E (corresponding to the second derivative values and edge pixels 731 of FIG. 7C):

For each lx pixel (lx=1 to lx=1) in the horizontal epipolar images (or ly in the vertical epipolar images) located in the central row px (or py for vertical epipolar images) corresponding to the central pixels (px=5) and labelled as edge pixel 731 (edge pixels A and J):

1—Search for pixels labelled as edge pixel 731 in the upper neighbouring positions (lx, px−1), (lx+1, px−1), (lx−1, px−1): edge pixel B (for the first iteration starting from edge pixel A) and edge pixel K (for the first iteration starting from edge pixel J) are found.

2—If an edge pixel 731 is found, update lx and px with the coordinates of the new edge pixel 731 (coordinates of edge pixel B: lx=4, px=4 in the first iteration starting from edge pixel A; coordinates of edge pixel K: lx=8, px=4 in the first iteration starting from edge pixel J) and repeat step 1 (next edge pixels found: edge pixels D, F and H when iterating from edge pixel A; edge pixels M and O when iterating from edge pixel J, where edge pixel Q is not considered part of the epipolar line since it is located in lx+2 relative to edge pixel O). Otherwise continue to step 3.

3—Search for pixels labelled as edge in the lower neighbouring positions (lx,px+1), (lx+1,px+1), (lx−1,px+1): edge pixel C (when the iteration starts from edge pixel A) and edge pixel L (when iterating from edge pixel J).

4—If an edge pixel 731 is found, update lx and px with the coordinates of the new edge pixel 731 (coordinates of edge pixel C: lx=4, px=6 in the first iteration starting with edge pixel A; coordinates of edge pixel L: lx=8, px=6 in the first iteration starting from edge pixel J) and repeat step 3 (next edge pixels found: edge pixels E, G and I when iterating from edge pixel A; edge pixels N and P when iterating from edge pixel J, where edge pixel R is not considered part of the epipolar line since it is located in lx−2 relative to edge pixel P). Otherwise proceed to next step.

The result of this iterative process is a first epipolar line 710 (corresponding to central edge pixel A) and a second epipolar line 712 (corresponding to central edge pixel J). First epipolar line 710 is formed by 9 edge pixels (H, F, D, B, A, C, E, G, I). Second epipolar line 712 is formed by 7 edge pixels (O, M, K, J, L, N, P).

Depending on the number of edge pixels 731 detected for a certain lx in the central row px in the iterative process described, the epipolar line can be considered valid or not-valid. In an embodiment, the number of edge pixels 731 detected must be at least the height in pixels (i.e. 9 in the example of FIG. 7E) of the epipolar image. The first epipolar line 710 complies with this criterion since it has 9 pixels; however, the second epipolar line 712 does not comply with this criterion since it is formed by only 7 pixels. In another embodiment, the extreme pixels (px=1, px=9) may be omitted to reduce the effects of optical aberrations of the main lens 102 (in that case, the number of edge pixels 731 detected should be at least the height in pixels of the epipolar image minus 2, i.e. 7 pixels in FIG. 7E). In this last embodiment, both of the epipolar lines (710, 712) of FIG. 7E would be considered as valid.

Depending on the consistency of the direction of every edge pixel 731 within an epipolar line, the epipolar line can be considered as valid or as not-valid (pointing towards the same direction within the epipolar image). For example, in the first epipolar line 710, starting from central edge point A all the upper edge pixels (B, D, F, H) are located in positions lx−1 or lx, while the lower edge pixels (C, E, G, I) are in lx+1 or lx positions, forming a consistent direction for the first epipolar line 710. The same applies to the second epipolar line 712, starting from central edge point J all the upper edge pixels (K, M, O) are located in positions lx−1 or lx, while the lower edge pixels (L, N, P) are in lx+1 or lx positions.

In an embodiment, both these two criteria (number of edge pixels 731 detected for an epipolar line and consistency of the direction) must be complied with for the epipolar line to be considered a valid one.

Therefore, and according to the embodiment described in FIG. 7E, to consider an epipolar line as valid:

Firstly, pixels in the epipolar image corresponding to an object edge (i.e. edge pixels 731) are detected using the second derivative values.

Then, a set of connected edge pixels forming an epipolar line is obtained. Different algorithms can be employed, such as the iteration process previously defined in FIG. 7E, starting from edge pixels A and J (the arrows shows the upward and downward iteration search directions looking for adjacent edge pixels so as to obtain a set of connected edge pixels forming the epipolar line).

Based on one or more criteria (e.g. number of edge pixels in the set and coherent direction of the edge pixels in the set), the epipolar line is deemed valid or not-valid.

Figure 8:
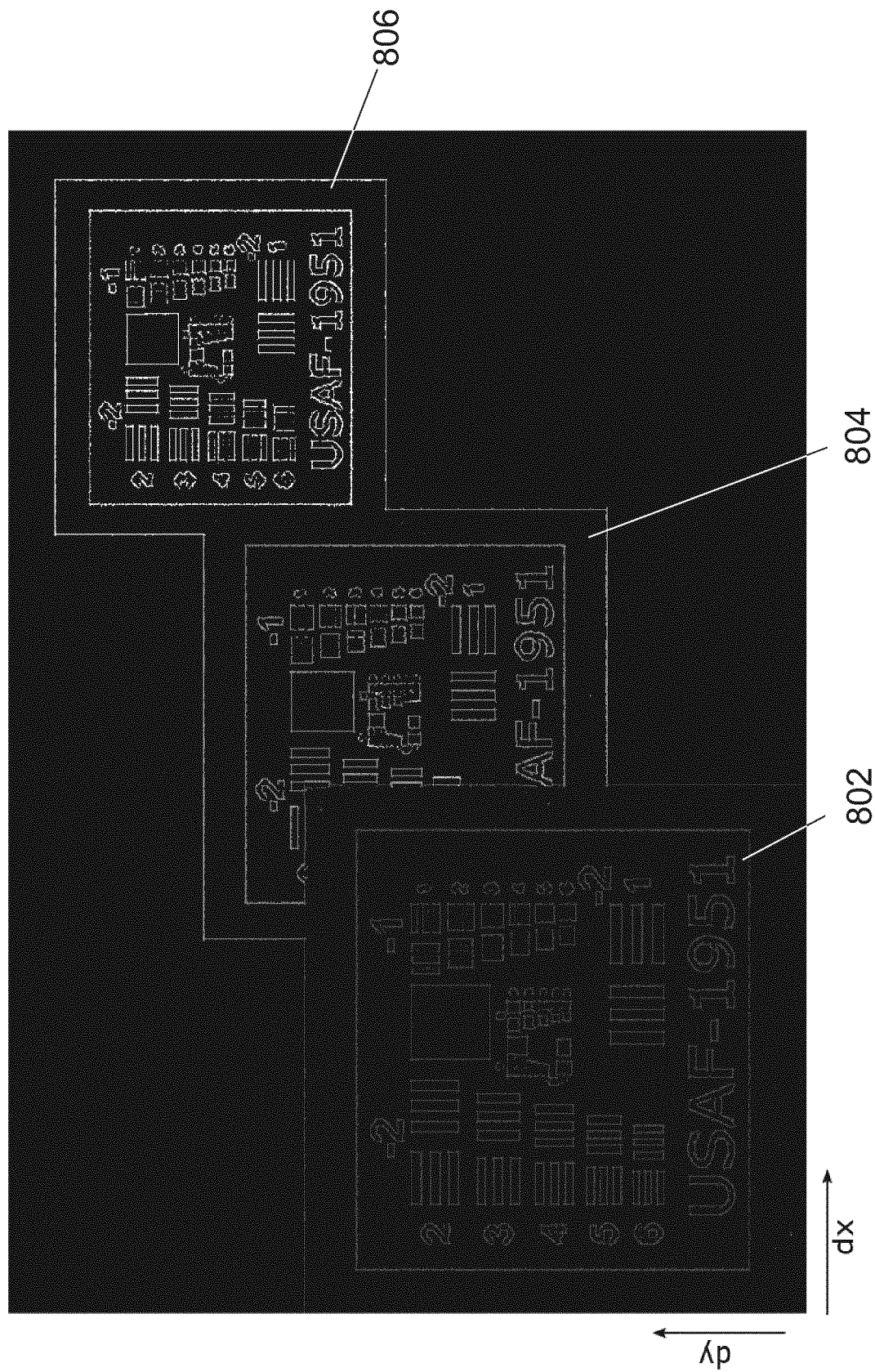
FIG. 8 depicts an example of a sparse depth map showing three objects at different depths.

When a valid epipolar line is detected, the slope of this line is computed. This slope value may be then directly converted into a depth value, since there is a direct relation between slopes and distance values. Once the slopes of the analysed epipolar lines are calculated, according to an embodiment the output of the method is a sparse two-dimensional depth map containing the depth values (dz) of the edges of the objects of the scene captured by a plenoptic camera. The coordinates (dx,dy) of the depth map indicate the lateral position of the corresponding object points (i.e. the two-dimensional coordinates of the object world), whereas the depth values (dz) represent the depth of the corresponding coordinates (dx,dy) in the object world. FIG. 8 illustrates the edges of a sparse depth map showing three objects (802, 804, 806) at different depths, wherein black colour represents no depth value assigned and the whiter the depth value, the further is the object in the scene.

The method may comprise an additional stage to generate a sparse depth map considering the slope of the epipolar lines obtained in the previous stage. The sparse depth map is obtained by assigning depth values (dz) of objects in the real world to the edges calculated before (dx dy).

In an embodiment, the input to the sparse depth map generation are two matrices (a horizontal depth matrix 516, and a vertical depth matrix 517 relating the calculated depth values (dz) and the corresponding position in the light-field structure (px,py,lx,ly). The input to the sparse depth map generation can also be the two matrices of slopes (512, 513) obtained in a previous step. In this case, a sparse slope map is first obtained and the conversion to depth is only applied to this two-dimensional slope map, thus, reducing the computational requirements.

The horizontal depth matrix 516 is obtained by analysing the horizontal epipolar images whereas the vertical depth matrix 517 is obtained from the vertical epipolar images. The size of each of these matrices in the state of the art (516, 517) is Npx×Npy×Nlx×Nly, being Npx and Npy the number of pixels per microimage in the horizontal and vertical directions, and Nlx and Nly the number of horizontal and vertical microlenses.

When performing the linear regression of an epipolar line, it is possible to obtain only one slope value. Accordingly, in an embodiment the size of the input matrices of this stage can be greatly reduced to store only the depth/slope value for every epipolar line produced by the linear regression method, such that the size of the horizontal depth matrix is Npy·Nly·Nlx (an horizontal epipolar image may contain up to Nlx epipolar lines) and the size of the vertical depth matrix is Npx·Nlx·Nly (a vertical epipolar image may contain up to Nly epipolar lines).

In an embodiment, the two depth/slope matrices may include only the points analysed in the horizontal-central and vertical-central epipolar images (or any other epipolar image), such that the sizes of the matrices is Nlx×Nly for both of them.

Many points of these matrices may have no depth value calculated since no valid epipolar line has been detected in the corresponding position within the epipolar images (no edges were detected).

A combination stage may be used to assign every depth value obtained (dz) to the two-dimensional coordinates of the object world (dx,dy), obtaining the depth map (dx,dy,dz) depending on the calculated slope of the points and considering the coordinates (px,py,lx,ly) of the points (namely the position over the sensor). As it can be observed in FIGS. 1 to 4, an object point 110 produces different patterns over the sensor as well as different slopes on the epipolar lines. Hence, by calculating the slope and knowing the position (px,py,lx,ly) over the sensor it is possible to find the corresponding world position (dx,dy) for every detected epipolar line.

Several different dz values may be obtained for the same pair (dx,dy), as a single edge in the object world can originate several epipolar lines affected by slightly different noise, aberrations, occlusions or quantization errors, yielding epipolar lines with different slopes and hence different depths. Also some of the horizontal and some of the vertical epipolar lines might yield slightly different dz values.

In an embodiment, all the redundant depth values (different values of dz) are combined into a single depth map in order to reduce statistical noise when generating the two-dimensional depth map (a single dz value per dx,dy coordinates).

When obtaining all the depth values (dz) onto the depth map (dx,dy,dz), several depth values (dz) can be obtained for the same position (dx,dy). Hence, several methods can be applied in order to obtain the final value. By way of example and not by way of limitation, the arithmetic mean or the median or any other averaging technique (with or without weighted ponderations) can be applied to all the depths values (all the dz values) that were obtained for the same depth map position (dx,dy).

Due to this redundancy the statistical noise is reduced, improving the quality of the depth map. In addition, in at least one embodiment, the error estimation calculated for the epipolar lines can be considered in order to choose the final depth value (dz) of a certain position of the depth map (dx,dy); for example, by choosing the value with the lowest error among all the values that were projected to the same position (dx,dy) (for example, considering as error the addition of all the distances between the epipolar line and the pixels that originated that epipolar line or any other measurement).

The more depth values obtained, the more accurate depth map is produced since the redundancy is increased, minimizing the errors of the depth measurements. Nevertheless, the redundancy considered by the algorithms can be decreased, reducing also the quality of the depth map, in order to reduce the computational requirements and complexity of the implementation.

In an embodiment, the two-dimensional sparse depth map is directly generated by taking a certain plenoptic view of horizontal (or vertical) epipolar structure that contains the estimated depth values, i.e. by taking all the points with px and/or p set to certain pixels (typically the central pixel since it is the view less affected by aberrations). In this case the computational complexity is reduced at the expense to have less redundant and possibly sparser depth maps (only a depth value for every microlens).

In an embodiment, the resolution of the depth map can be higher than the total number of microlenses in order to take advantage of the subpixel-accuracy obtained in the zero-crossing border detection stage.

Since slope values can only be obtained at the identified epipolar image edges (at the epipolar lines), the sparse depth map obtained in the previous stage contains a lot of empty positions (dx,dy), not only for a large number of pixels, but also for a large number of microlenses in which the homogeneity of the real world does not produce edges on the epipolar images. In an embodiment, the corresponding depth values for all this empty positions can be obtained by considering the depth values of the neighbouring positions. This procedure to obtain a dense depth map can be called "depth map filling" and takes profit of lots of previous art in image filling techniques.

Several techniques can be applied to fill the sparse depth map in order to obtain a dense depth map. Accordingly, some of these approaches are mere examples but not limitations: region growing, split and merge, and/or clustering techniques, as well as some other approaches known in previous art for image processing. Additionally, regularization methods can be employed to fill the depth map.

Figure 9:
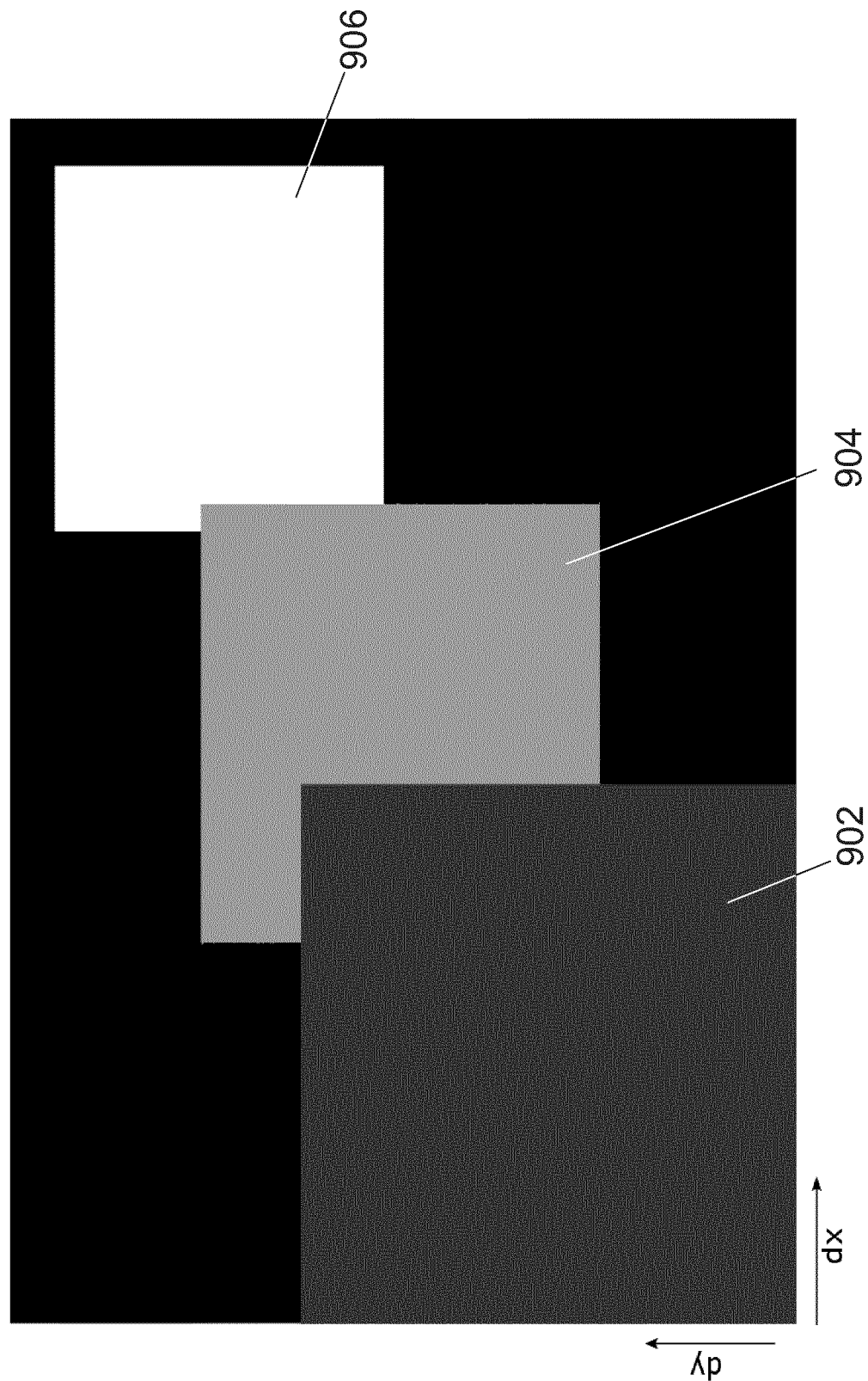
FIG. 9 depicts an example of a dense depth map showing three objects at different depths.

FIG. 9 depicts an example of a dense depth map showing three objects (902, 904, 906) at different depths. This FIG. 9 shows in grey levels a dense depth map of the sparse depth map generated in FIG. 8, wherein black colour represents no depth value assigned and the whiter the depth value, the further is the object in the scene.

Figure 10A:
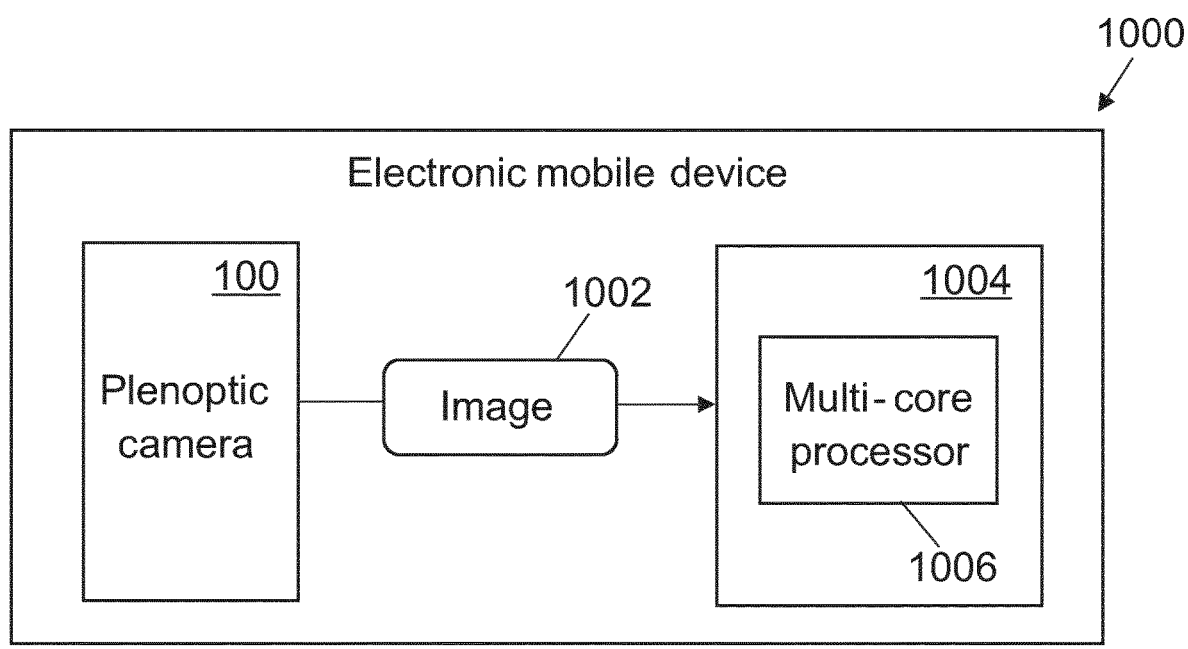
FIGS. 10A-10C show different embodiments of electronic mobile devices executing the method of the present invention when the capturing device is a single plenoptic camera.
Figure 10B:
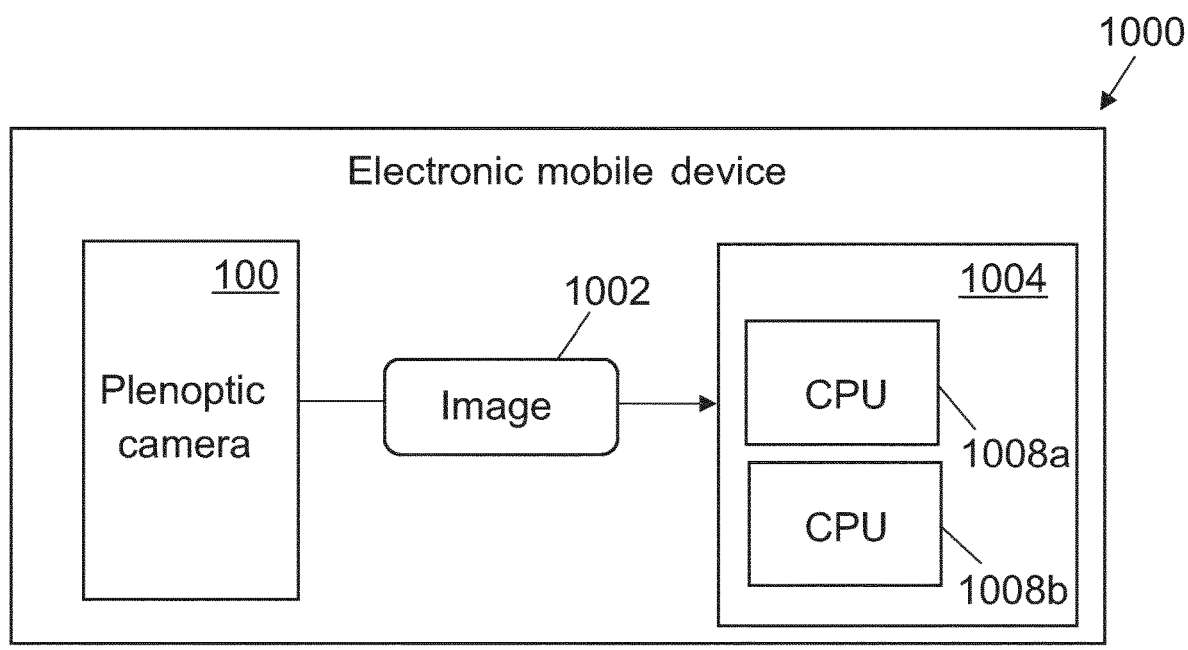
Figure 10C:
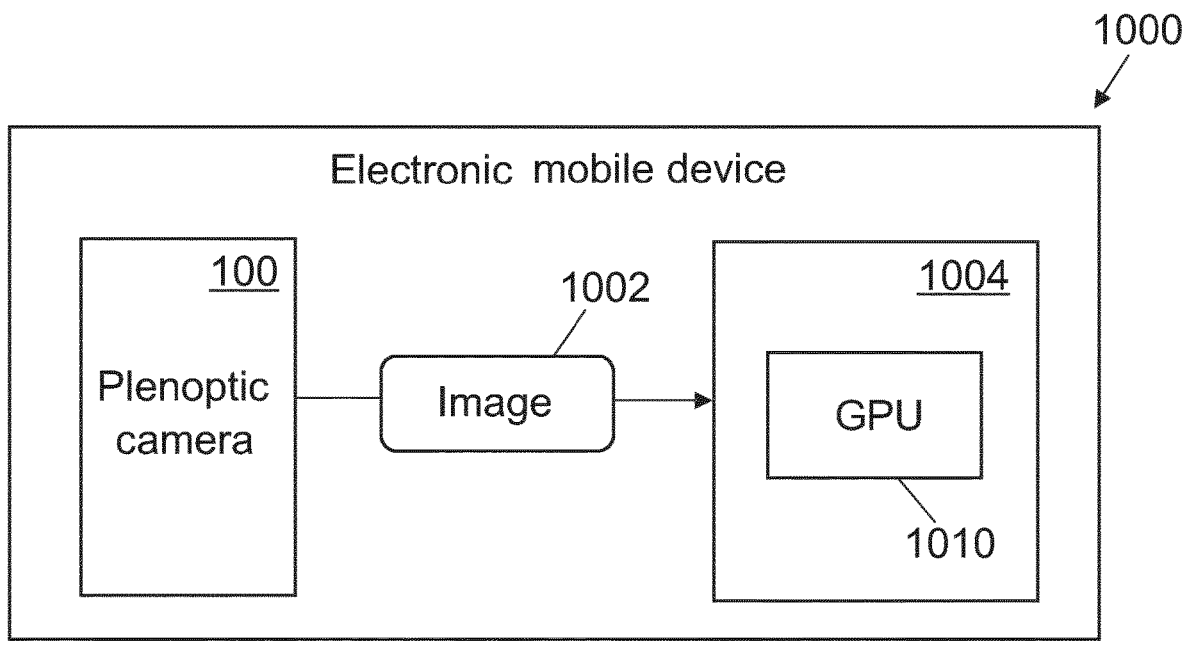

According to a preferred embodiment, the method of the present invention is executed in an electronic mobile device, such as a smartphone, a tablet or a laptop. FIGS. 10A, 10B and 10C illustrates different embodiments of electronic mobile devices 1000 with a processing unit or processing means 1004 configured to execute the method in order to obtain depth maps from images 1002 captured by a plenoptic camera 100.

In order to obtain depth maps in real-time in mobile devices it is highly recommended to implement the present method in an extremely efficient way. To achieve this, it is possible to take advantage of the multiple cores included in current multi-core processors 1006 (FIG. 10A), even in processors from mobile devices, creating several algorithm execution threads in such a way that each of them is in charge of performing different operations.

In an embodiment two CPU execution threads are created so that a first CPU 1008a (in FIG. 10B) executes the described steps (see FIG. 5) for the horizontal epipolar images 502 whereas a second CPU 1008b is in charge of performing the same operations on the vertical epipolar images 503.

More advanced computational techniques can be used in order to increase the computational efficiency. For example, a graphics processing unit (GPU 1010 in FIG. 10C), even those included in mobile devices, can be used since a GPU includes several hundreds or thousands of cores capable of executing operations simultaneously. Accordingly, in an embodiment, each epipolar image (vertical and horizontal)

is processed simultaneously in a different core of a GPU 1010 to further accelerate the execution of the algorithm.

As already explained, the process to transform the patterns found in epipolar images to depth information requires the application of some image processing techniques. Epipolar images contain epipolar lines, which are connected pixels forming a line (several sensor pixels corresponding to the same point in the object world). The slopes of these epipolar lines are directly related to the shape of the pattern illuminated over the microlenses and, more importantly, to the corresponding depth of that point in the object world. Summarizing the process, patterns found in epipolar images, the epipolar lines, provide information about the depth of the objects in the real object world. These lines may be detected using edge detection algorithms and their slopes may be measured by linear regression techniques. Both edge detection and linear regression can be performed with subpixel accuracy. Thus, in an embodiment, the edge detection step comprises calculating a second spatial derivative in lx and ly dimensions for horizontal 400 and vertical 402 epipolar images, respectively, for each pixel of the epipolar images and detecting the zero-crossings of the second spatial derivatives, determining the slopes of the valid epipolar lines with subpixel accuracy and applying a line fitting to the zero-crossings of those points that form the detected edges. Hereinafter, a pixel is considered an edge pixel when a zero-crossing of the second spatial derivative is found within the area of such pixel.

The slope from each epipolar line gives a value that, conveniently processed as described, provides the actual depth of the point in the object world that produced such pattern. One of the main advantages of this methodology for depth estimation is that all the calculations can be performed only on those pixels of the sensor where edges of the object world have been detected, which represents a relatively small portion of the image, avoiding to perform calculations on every single pixel of the sensor.

However, due to optical and physical phenomena, at large distances from the camera, where the light rays from any point in the object world arrive all of them almost in parallel to each other to the camera lens (whichever the field of the object point that created those rays), a relatively large amount of distance variation is required to produce just a small variation in the sensed slope of epipolar lines in a plenoptic camera, i.e. two different objects placed at different distances can produce practically the same slope (as the sensor would need infinite accuracy to sense this variation; in other words, only infinitesimal pixels and a noise-free world would produce changes in slope). In these situations, it is extremely important to obtain an accurate estimation of the slope, otherwise the estimated depth will differ significantly from the real depth of the objects in the world. Note in this sense that, as the sensors are discretized in finite pixels, an error is always introduced when measuring slopes in a plenoptic camera.

FIGS. 11A-11C show three different examples of horizontal epipolar images 400 captured by a plenoptic camera 100 when measuring the depth of an object located at a certain distance from the camera. The difference between the three horizontal epipolar images 400 is that, even if the distance is exactly the same in the three cases, the fact that the hand of the operator of the plenoptic camera 100 produced slightly different variations of the position due to vibrations caused three slightly different readings. Ideally, the three epipolar lines should be exactly equal. However, due to the noise intrinsic to the system and since the light is illuminating slightly different pixels, the zero-crossings of the epipolar lines are also in slightly different positions, producing three different values of slope after applying a linear regression 1102, 1104 and 1106, respectively. Assuming that FIG. 11A and FIG. 11C are the extreme cases (maximum and minimum possible slope measurements for a certain object at a certain distance to the camera), an uncertainty region can be defined between these two limits. An example of this region is shown in FIG. 11D, in which the horizontal epipolar image 400 of FIG. 11B is represented with its corresponding linear regression and those corresponding to the extreme values. Only one exact value of slope within this range of uncertainty would produce the exact correct value of depth.

Figure 12:
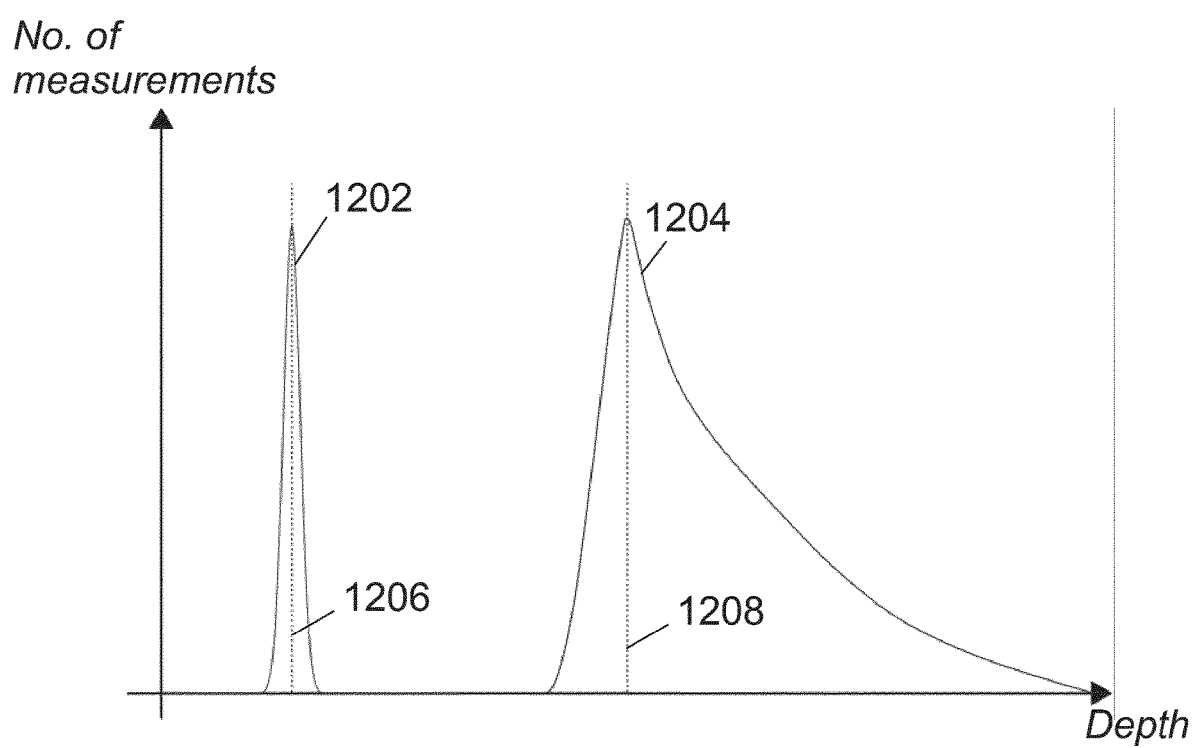
FIG. 12 depicts the probability distribution of the depth estimated by a plenoptic camera for the depths of two objects located at different depths (at the left near the camera and at the right further from the camera).

Due to this lack of precision, the accuracy of the estimated depths in a plenoptic camera 100 decreases as the depth increases. FIG. 12 shows the uncertainty of a certain plenoptic camera 100 when measuring the distance of an object located at a relatively short distance and a relatively large distance. This FIG. 12 shows two examples of the statistical distributions 1202 and 1204 (or possible fluctuations on the vertical axis, originated from slightly different readings of the camera with an object always located at the same distance) of the depth measurements obtained with a plenoptic camera 100 when calculating the depth of two objects located at different distances (the two dotted vertical lines 1206 and 1208) from the camera (horizontal axis increases with distance). The horizontal axis represents the depth or distance from the plenoptic camera 100 whereas the vertical axis is the number of measurements that provided the same depth value for a point in the object world always at the same distance. The curve 1202 on the left shows the distribution when measuring an object located at a relatively short distance whereas the curve 1204 on the right of the graph represents the distribution obtained with the same camera but now with the object located at a larger distance. As illustrated in FIG. 12, the uncertainty of the estimated depth increases with larger distances, increasing also the dispersion of the estimated depths. That is the reason why a single plenoptic camera provides good depth estimations only for relatively short distances.

According to another embodiment of the present invention, there is provided a method and system for obtaining a depth map that enhances the capacities provided by a single plenoptic camera, drastically reducing the uncertainty of the measurement of large distances introduced by the low slope variation provided by using the information of the additional cameras that form a multiview system. This improved embodiment can be applied to multiple and very complex camera configurations including large numbers of cameras in an array-like configuration, as it will be later described. By using one or more conventional cameras 1304 in combination with one or more plenoptic cameras 100, at a certain separation D (typically a few centimetres when using cameras in mobile devices), the uncertainty of the measurement of large distances is reduced.

Figure 13C:
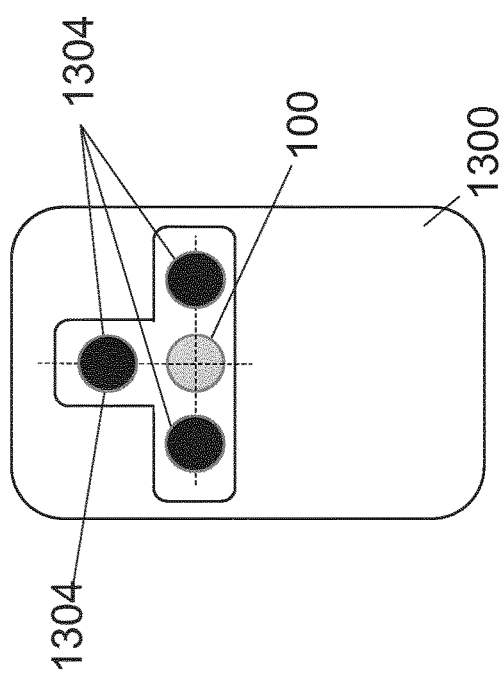
FIGS. 13A-13E shows a portable device containing five possible configurations of the multiview system formed by a plenoptic camera and several conventional cameras.
Figure 13E:
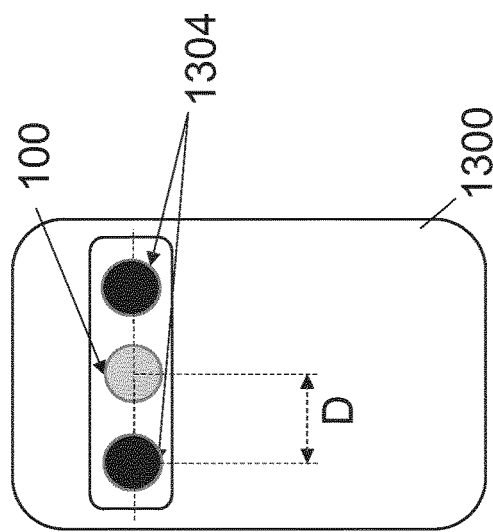
Figure 13B:
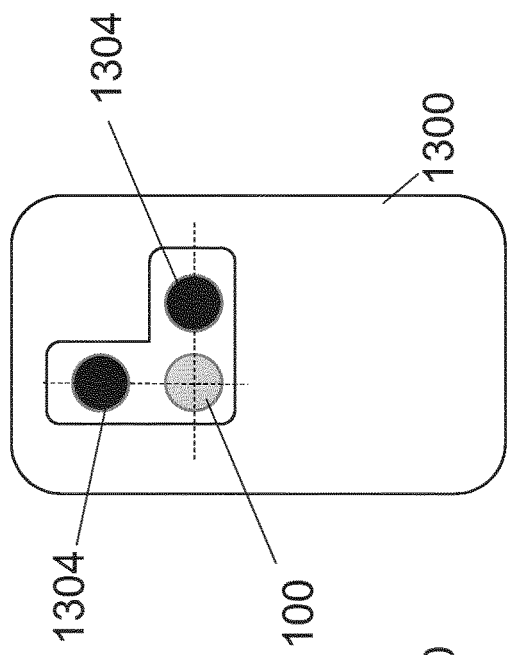
Figure 13D:
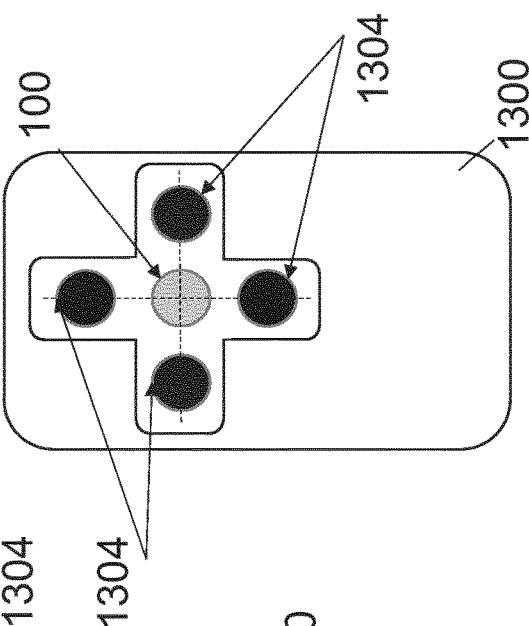
Figure 13A:
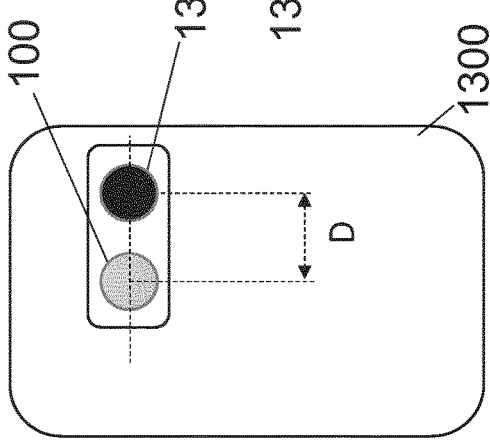

FIGS. 13A-13E show some examples of possible multiview system configurations using a plenoptic camera 100 and several conventional cameras 1304 at a certain distance D although the distances between the plenoptic camera 100 and each conventional camera 1304 may vary for each conventional camera 1304. The cameras may be incorporated, for instance, as rear cameras of a mobile device 1300, such as a smartphone or a tablet. The embodiment of FIG. 13A represents a plenoptic camera 100 horizontally aligned with a conventional camera 1304 separated a distance D. FIG. 13B shows a plenoptic camera 100 horizontally aligned with a conventional camera 1304 and also aligned vertically with a second conventional camera 1304. The embodiment of FIG. 13C shows a plenoptic camera 100 horizontally aligned with two conventional cameras 1304, one on the right and one on the left side, and a third conventional camera 1304 vertically aligned. The example of FIG. 13D depicts a plenoptic camera 100 horizontally and vertically aligned with two conventional cameras 1304 in each dimension. Finally, FIG. 13E shows a mobile device 1300 incorporating a plenoptic camera 100 horizontally aligned with two conventional cameras 1304, one on the right and one on the left side.

However, for the sake of clarity and simplicity, but not as a limitation, it is herein described an improved method for an embodiment where the image capturing system or camera setup comprises a plenoptic camera 100 and a conventional camera 1304 placed at a certain distance D over the horizontal axis, as depicted in the example of FIG. 13A. Once the method for a conventional camera is explained, replicating the method to an embodiment using several conventional cameras 1304 would be straightforward. The improved method will also be explained for horizontal epipolar images 400, although vertical epipolar images 402 may also be employed.

The improved method to obtain depth information is based on the depth estimation procedure previously explained for a plenoptic camera 100, wherein the slope of the epipolar lines formed in the epipolar images are computed and finally related to a certain depth in the object world. However, one of the main contributions of the improved system and method is the use of the 2D image provided by one or more conventional cameras 1304 as an additional view of the plenoptic camera 100. This new plenoptic view is located at a certain distance of the plenoptic camera 100. By properly adapting it with the required techniques, the 2D image can be used to drastically extend the baseline of the plenoptic system. Accordingly, the epipolar lines of the plenoptic camera 100 can also be extended with the new plenoptic view provided by the conventional camera 1304. This extension procedure is used to improve the accuracy when measuring the slope of an epipolar line.

Figure 14:
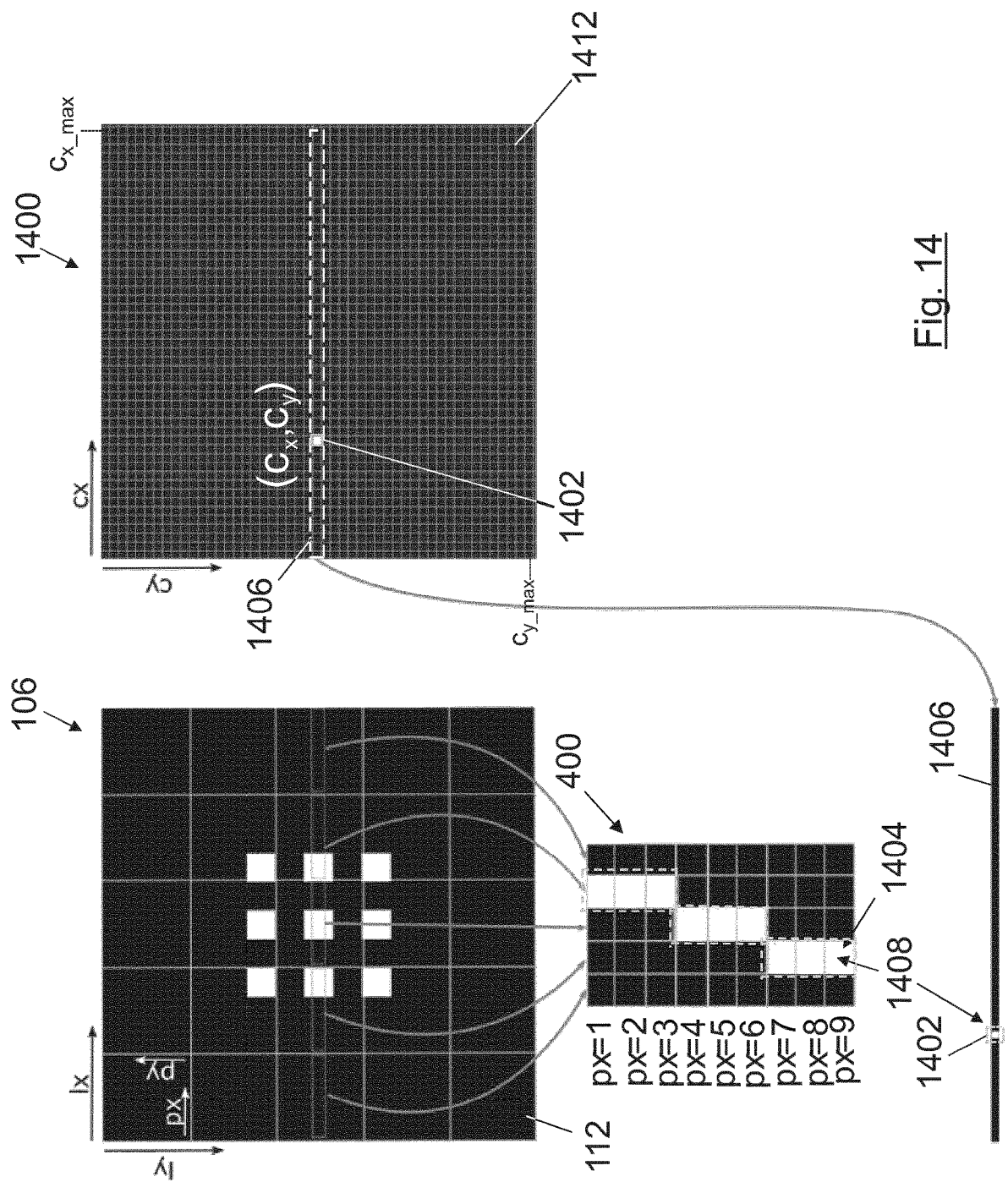
FIG. 14 illustrates the extension process of an epipolar image captured with a plenoptic camera with a 2D image of the same scene captured by a conventional camera.
Figure 15:
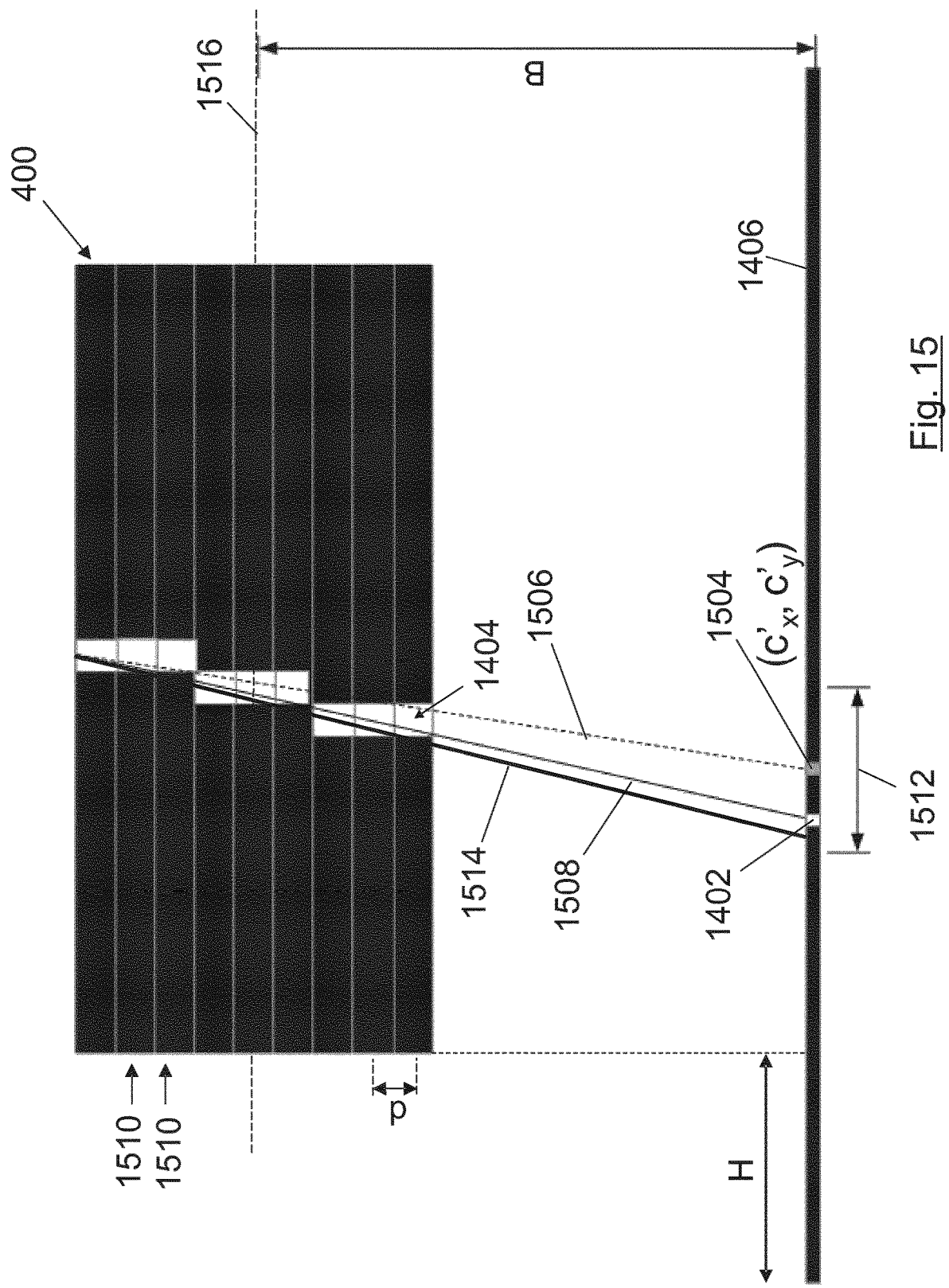
FIG. 15 shows the first slope estimation obtained considering only a plenoptic epipolar line and how the slope estimation is enhanced by considering the 2D image of a conventional camera.

The information of the conventional camera 1304 is used to measure the slopes with higher accuracy. However, to use this additional information, it is necessary to find the equivalence between the 2D image of the conventional camera 1304 and the plenoptic views of the plenoptic camera 100. To achieve this, the separation between the cameras as well as the differences in the field of view, pixel size, sensor size, microlenses size, etc., must be considered. The process is explained in FIG. 14, wherein a point located at a certain distance from a plenoptic camera 100 and from a conventional camera 1304 illuminates an edge pixel (cx,cy) 1402 in the image sensor 1400 of a conventional camera 1304 and several pixels and microimages 112 in the image sensor 106 of the plenoptic camera 100. This allows to include an additional line to the horizontal epipolar image 400 captured by the plenoptic camera image sensor 106, said additional line being an extension line 1406 of the conventional camera image sensor 1400. This extension line 1406 is considered as an additional plenoptic view of the plenoptic camera 100. As illustrated in FIG. 15, the location of the extension line 1406 is determined by two offsets, a vertical separation B (directly related with the distance D between the plenoptic camera 100 and the conventional camera 1304) and a horizontal offset H (by which the common fields of both cameras are matched). Additionally, it is also necessary to obtain the row cy (corresponding to the extension line 1406) of the conventional camera image 1412 that corresponds to the row (py, ly) (which forms the epipolar image 400) of the plenoptic camera 100. All these equivalences only depend on the intrinsic parameters of both cameras and their alignment (relative positions). The procedures to obtain them are explained below.

Following the process just described, an extension line 1406 obtained from the conventional camera 1304 is used as an extra view of the plenoptic camera 100 at certain distance D, as explained in FIG. 15. Thus, the linear regression 1506 of the epipolar line 1404 obtained exclusively from the epipolar image 400 of the plenoptic camera 100 is prolonged to the extension line 1406. Around this intersection point 1504 (which corresponds to a pixel (cx', cy') of the conventional camera sensor 1400) a region 1512 is defined to search for the corresponding edge pixel (cx, cy) 1402 of the conventional camera 1304. This edge pixel (cx, cy) 1402 corresponds to the same object edge in the world than those pixels that form the epipolar line 1404 of the epipolar image 400. At this step of the process correspondence algorithms to find the edge pixel 1402 among all the pixels within the window 1512 are performed, said edge pixel 1402 will correspond to the most similar pixel to the pixels forming the epipolar line 1404.

Once the corresponding edge pixel 1402 has been found, the pixels of the epipolar line 1404 and the edge pixel 1402 form an extended epipolar line 1408. The pixels of the extended epipolar line 1408 are used to perform a new linear regression procedure to obtain a linear regression 1508 and a recalculated slope. To compute the new slope, a procedure to calculate the edges corresponding to the extended epipolar line 1408 with subpixel precision may be used, for example by obtaining the zero-crossings of the second derivative of the extended epipolar line 1408 along the lx direction (or the ly direction for vertical epipolar lines). The second derivative of the points of the conventional camera in the direction of the extension line 1406 may also be applied along the Cx direction.

Due to the information provided by the conventional camera, the new slope of the linear regression 1508 associated to the extended epipolar line 1408 is much closer to the ideal slope 1514 that would have been obtained in a noise-free world and with infinitesimal pixels, and by far much better than the first estimation 1506 where only the pixels provided by plenoptic camera 100 were used.

Figure 16A:
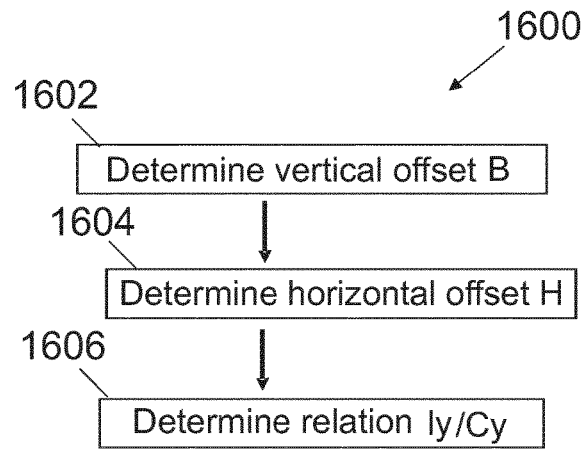
FIGS. 16A-16B depicts, according to an embodiment, the several steps of the procedure of the present invention to enhance the slope estimations of a single plenoptic camera.
Figure 16B:
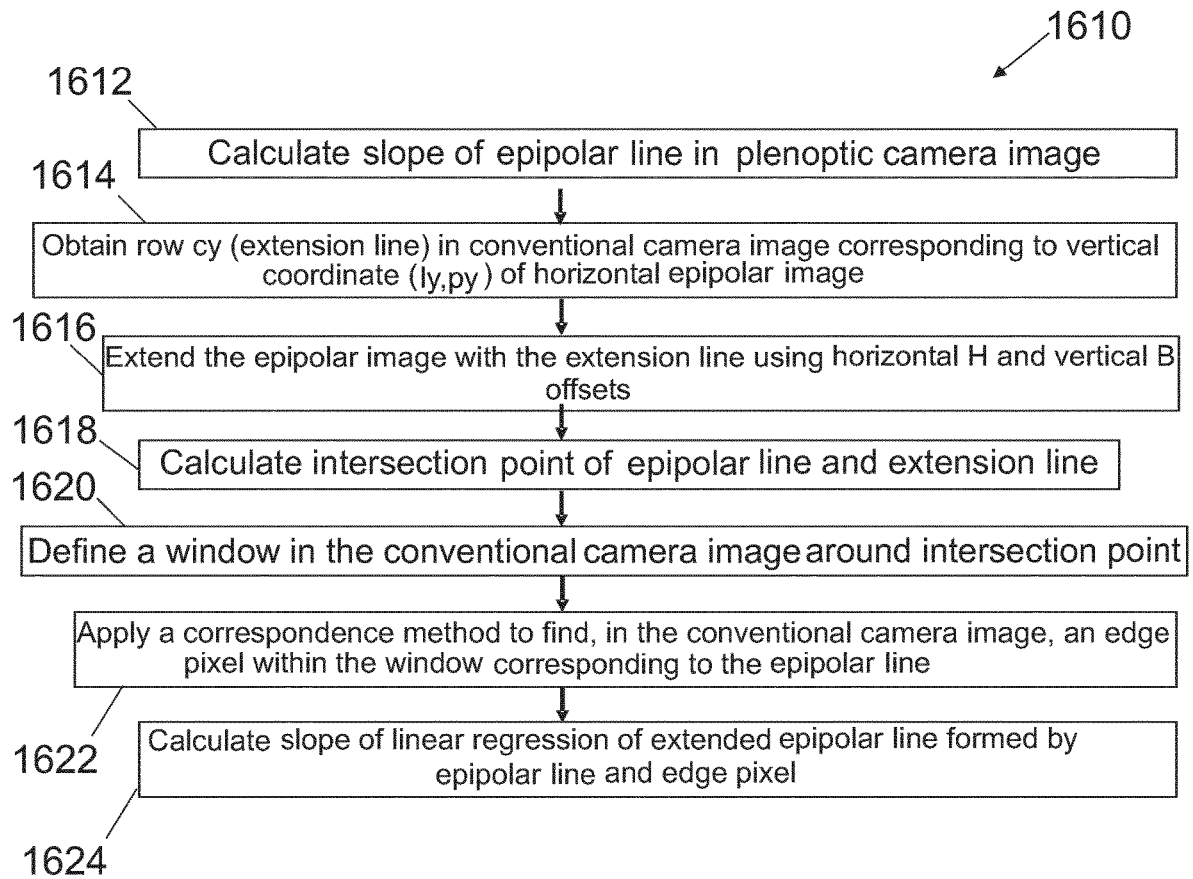

The whole procedure to enhance the depth estimation accuracy of a plenoptic camera can be summarized in two stages, as shown in the flow diagrams of FIGS. 16A and 16B. The procedure to extend the epipolar images is described only for horizontal epipolar images; however, it is straightforward to extend this analysis to a scenario where the conventional camera is placed at the vertical axis and the vertical epipolar images are considered instead of the horizontal epipolar images:

A first stage 1600 corresponding to calibration of cameras:
  Determination of the vertical separation B 1602 where the extension lines 1406 of the conventional camera image 1412 must be added in the horizontal epipolar images 400 (vertical separation B depends on the distance D between the plenoptic camera 100 and the conventional camera 1304).
  Determination of the horizontal offset H 1604 that must be applied to the extension lines 1406 of the conventional camera 1304 when they are included in the horizontal epipolar images 400 of the plenoptic camera 100 (to match the common field of both cameras in the horizontal direction).

Obtain the relation 1606 between spatial positions of the plenoptic camera and spatial positions of the conventional camera, taking into account the field of view, the size of the pixels and the location of both cameras. In particular, when applied to horizontal epipolar images 400, obtain the relation between the spatial dimension ly of the plenoptic camera 100 and the spatial dimension cy of the conventional camera 1304 according to the vertical field of view, the size of the pixels and the location of both cameras.

A second stage 1610 corresponding to slope calculations, by which slope accuracy is enhanced. For each epipolar line 1404 found in the horizontal epipolar images 400 of the plenoptic camera 100:

Calculate a first estimation of the slope 1612 considering only the pixels of the epipolar line 1404, and the corresponding linear regression 1506, in the epipolar image 400 of the plenoptic camera 100.

Obtain 1614 the $c_y$ line (extension line 1306) of the conventional camera image 1412 that corresponds to the vertical coordinate (ly, py) of the horizontal epipolar image 400 of the plenoptic camera 100. This row $c_y$ contains the particular edge pixel 1402 in the conventional camera image corresponding to the same object in the world than the edge pixels of the epipolar line in the plenoptic camera image.

Extend 1616 the epipolar image 400 by placing the extension line 1406 according to the horizontal offset H and the vertical separation B previously obtained in the first stage 1600.

Calculate 1618 the intersection point 1504 of the plenoptic camera linear regression 1506 with extension line 1406 and obtain the corresponding pixel (cx',cy') of the conventional camera image.

Figure 17B:
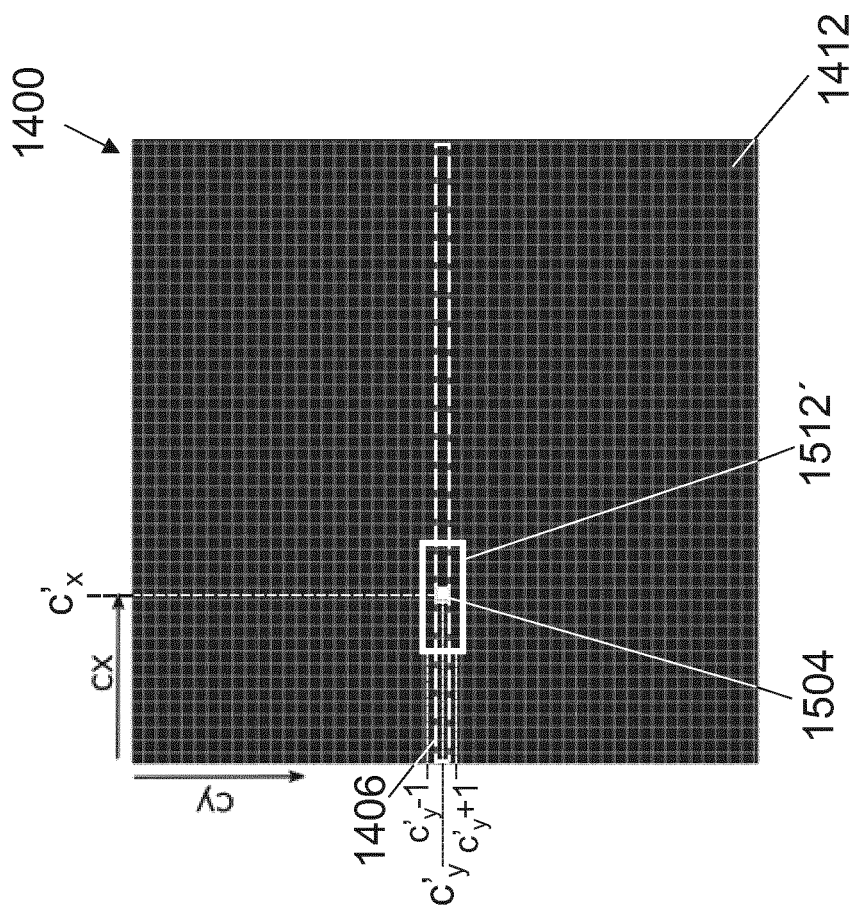
FIGS. 17A-17B represent the windows or regions (1D and 2D) where the edge pixel is searched in the conventional camera image.
Figure 17A:
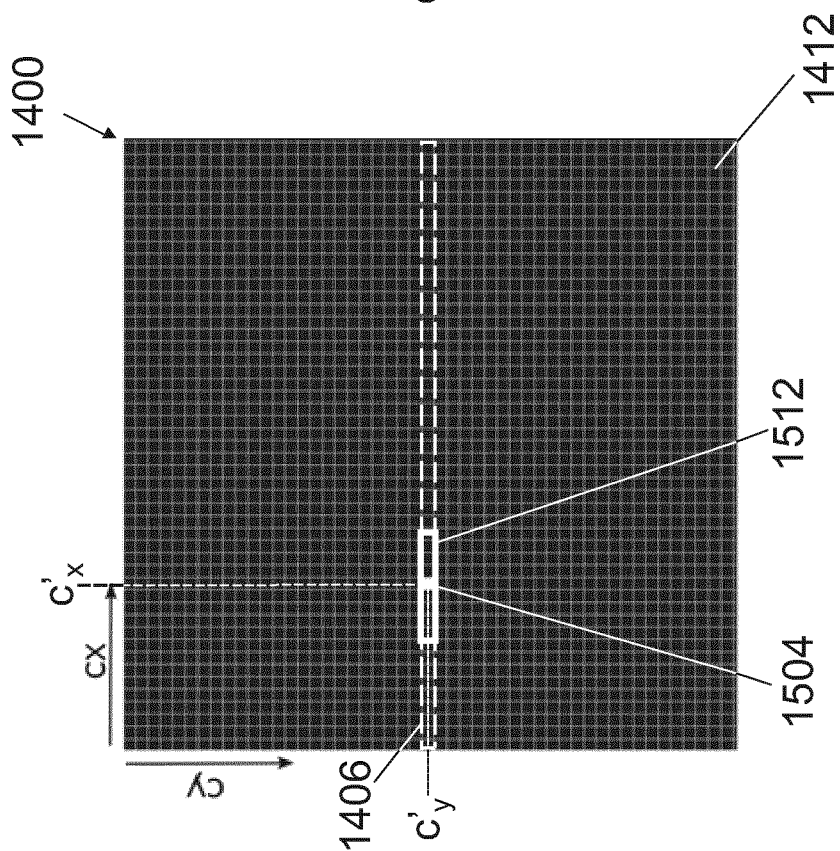

Define 1620 a window 1512 (which can be a one-dimensional window 1512 or a two-dimensional window 1512', as respectively depicted in FIGS. 17A and 17B; in the example of FIG. 17B the 2D-window 1512' is formed by three rows of pixels: row $c'_y-1$, row $c'_y$ and row $c'_y+1$) around the (cx',cy') pixel (intersection point 1504) where the edge pixel 1402 of the extension line 1406 of the conventional camera will be sought.

Apply 1622 a correspondence method to find the ($c_x$, $c_y$) edge pixel 1402 in the conventional camera image 1412 that best matches the object point of the world represented by the epipolar line 1404. The edge pixel 1402 is a point in the conventional camera image 1412 that corresponds to the same point in the object world than the edge point represented by the epipolar line 1404.

Finally, apply a linear regression technique 1624 to the extended epipolar line 1408 formed by the pixels of the epipolar line 1404 and the edge pixel 1402, and calculate the slope of the linear regression 1508. To that end, in an embodiment a linear regression is applied to the set of points formed by the zero-crossings of the second derivative of the edge pixels of the epipolar line 1404 of the horizontal epipolar image 400 in the lx direction (or ly for vertical epipolar images) and the zero-crossing of the second derivative of the values around the edge pixel 1402 along the cx direction (along line 1406) of the conventional camera image 1412.

It is straightforward to extend the procedure to other multiview camera setups, such as the ones shown in FIGS. 13B-13E or FIG. 18 representing another possible embodiment of the multiview system according to the present invention, comprising a two-dimensional array of plenoptic cameras 100 and conventional cameras 1304. As an example, but not as a limitation, if a plenoptic camera is surrounded by four conventional cameras (one on the top, one on the bottom, one on the left and another one on the right of the plenoptic camera, as in the example of FIG. 13D), both horizontal 400 and vertical 402 epipolar images provided by the plenoptic camera 100 can be extended adding horizontal extension lines 1406 at the top and at the bottom of the horizontal 400 and vertical 402 epipolar images, said extension lines 1406 corresponding to horizontal/vertical lines (for horizontal/vertical epipolar images) of the image 1412 captured by the conventional camera image sensor 1400; therefore, additional redundancy can be obtained by having four instead of only one conventional camera, what reduces the effects of noise by increasing the number of measurements. Horizontal epipolar images are extended with extension lines 1406 (horizontal lines placed at the adequate distance at the bottom as in FIGS. 14 and 15 for the first conventional camera 1304 at the right side, and horizontal lines placed at the adequate distance at the top for the second conventional camera 1304 at the left side), lines provided by the right and left conventional cameras, whereas vertical epipolar images are extended with vertical extension lines 1406 (vertical lines of the conventional camera image 1412 located at the adequate distance) from the top and bottom conventional cameras. In order to properly extend the epipolar images (400, 402) with multiple conventional cameras 1304, vertical separation B and horizontal offset H must be calculated for each additional individual conventional camera 1304 depending on their location and their physical parameters.

Figure 19B:
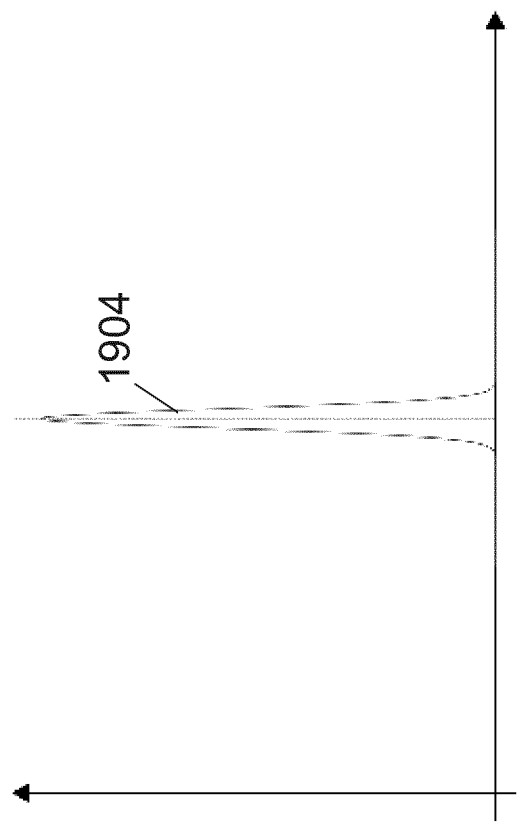
FIGS. 19A and 19B compare the probability distribution when measuring the depth of an object located at a certain depth, with a single plenoptic camera (FIG. 19A) and with a multiview system composed by a plenoptic camera and a conventional camera (FIG. 19B).
Figure 19A:
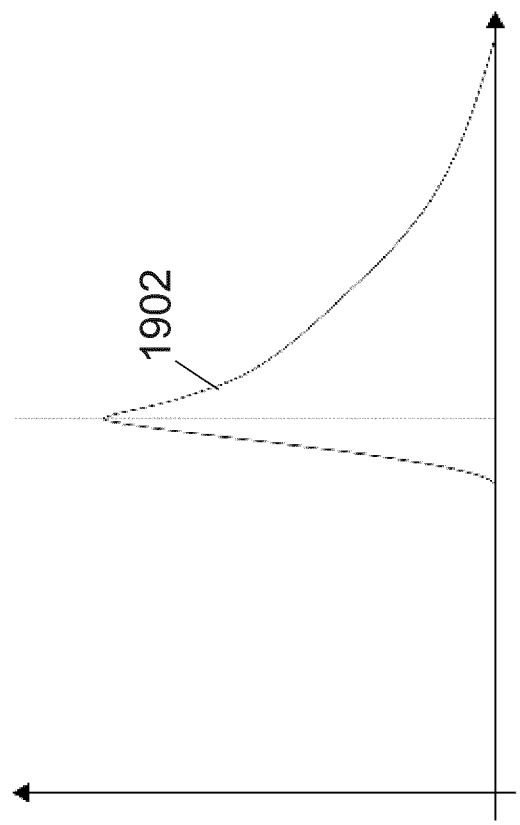

Note that since the separation between the plenoptic and the conventional camera is much larger than the baseline of a single plenoptic camera, at relatively large distances smaller depth variations are required to produce noticeable slope changes in the new extended epipolar line 1408, formed by edge pixel 1402 of the conventional camera in addition to the set of edge pixels of the epipolar line 1404 of the plenoptic camera. The new slope of the linear regression 1508 of the extended epipolar line 1408 can be used to determine a highly accurate depth of edge points in the object world. This implies that the uncertainty in the slope from the epipolar line 1404 of the plenoptic camera (or similarly the uncertainty defined by slopes 1102 and 1106 around the slope 1104 in the example of FIGS. 11A-11D) is drastically reduced when edge pixel 1402 of the conventional camera is identified, generating the extended epipolar line 1408 (and the corresponding linear regression 1508), as shown in FIGS. 14 and 15. This drastic reduction of uncertainty is shown in FIGS. 19A and 19B. FIG. 19A depicts the distribution 1902 obtained for a certain large depth using only a plenoptic camera, whereas FIG. 19B shows the distribution 1904 obtained for the same object but considering the plenoptic camera and also the conventional camera information. Note how the dispersion (and therefore the uncertainty) is much narrower when the information provided by the conventional camera is used.

The first stage 1600 of the process to extend the epipolar images requires knowledge of some physical parameters of the optical system in order to use the 2D image of the conventional camera as an additional plenoptic view. First of all, the separation B between the extension line 1406 of the conventional camera and the centre (in particular, the central horizontal line 1516) of the epipolar image 400 is directly related to the distance D between the conventional camera 1304 and the plenoptic camera 100 (related to the baseline between the two cameras). Since each row 1510 in an epipolar image 400 corresponds to a different plenoptic view of the plenoptic camera and the views are distributed along the aperture of the plenoptic camera, it is straightforward to obtain the position of the extension line 1406 of the conventional camera image 1412 (just an additional view at a vertical separation B in pixels corresponding to the distance D between the plenoptic camera 100 and the conventional camera 1304, see FIG. 15). As an example, and without limiting the generality of the invention, a typical separation between the plenoptic camera and the conventional camera can be around 5 cm, the number of plenoptic views (equal to the number of pixels below each microlens 106) is usually around 10×10 and the aperture 200 of a mini camera can typically be around 1 mm (thus, the pitch between plenoptic views is ⅒ mm in this example). Thus, the separation B between the central horizontal line 1516 of the horizontal epipolar image 400 (between the central plenoptic view of the plenoptic camera) and the extension line 1406 of the conventional camera is the fraction between the 5-cm baseline (the separation between both cameras) and the pitch between plenoptic views of the plenoptic camera:

$$B = \frac{D}{\text{pitch\_plenoptic\_views}} = \frac{50 \text{ mm}}{\frac{1}{10} \text{ mm}} = 500 \text{ plenoptic views}$$

Since each plenoptic view is represented as a row in the epipolar images, the separation B in the vertical dimension between the central row (central horizontal line 1516) of the epipolar image 400 and the conventional camera extension line 1406 would be in the example 500 pixels (taking into account that the separation d between consecutive rows 1510 of an epipolar image is one pixel), as shown in FIG. 15.

Another physical parameter required in the first stage 1600 of the epipolar extension procedure is the horizontal offset H, which is calculated to ensure that the common part of the field of both cameras is matched to consider the line 1406 as an additional camera aligned with the plenoptic views (the 10×10 cameras in the example above). Usually, the sensor of the conventional camera is receiving light from slightly different parts of the real world than the plenoptic camera due to the separation between them. Additionally, the field of view (FOV) of both cameras can be different (even if in the most usual case it makes sense to design both FOVs exactly the same), what implies capturing also different parts of the real world.

Figure 20A:
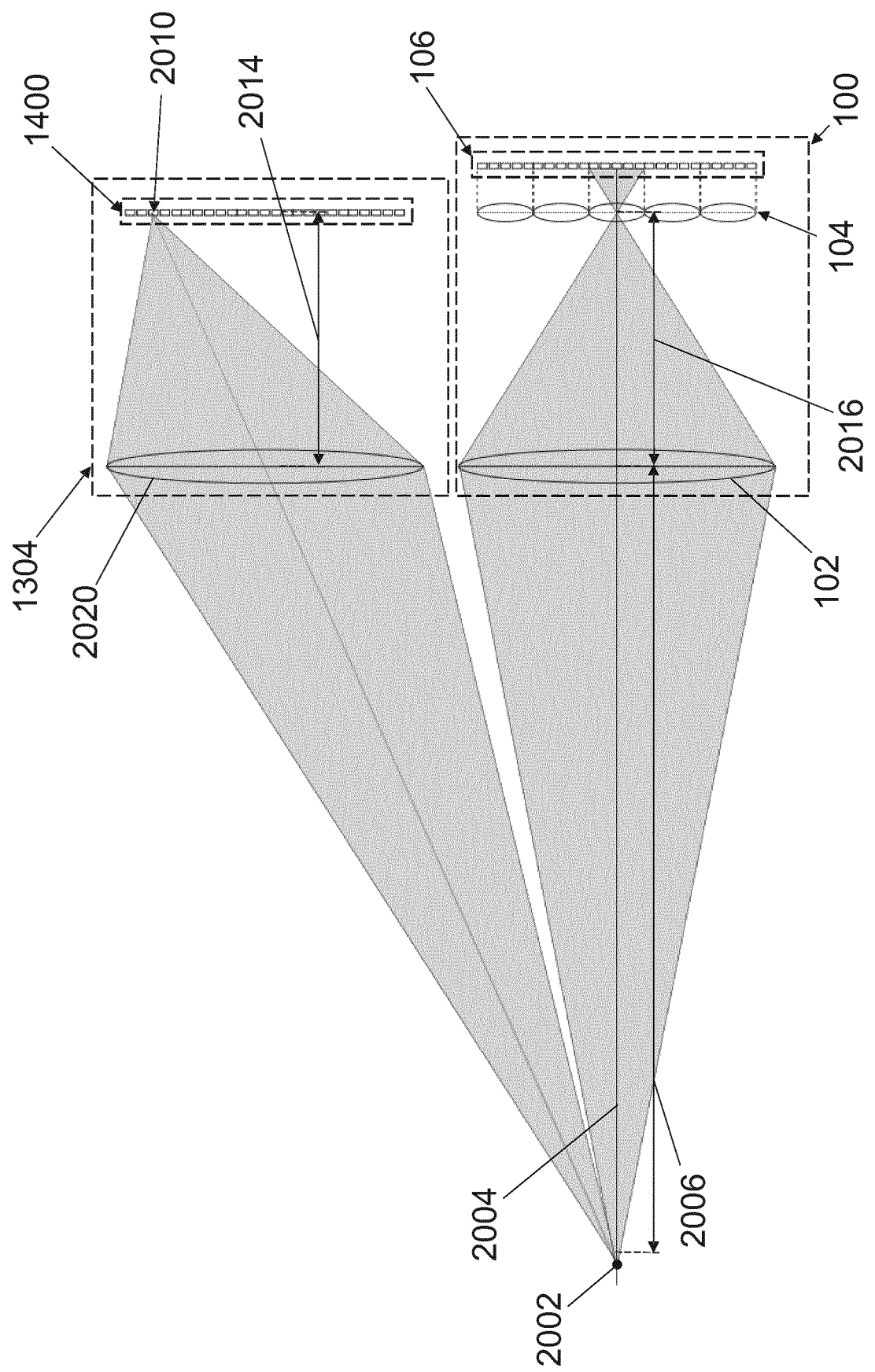

The horizontal offset H of the conventional camera image sensor must take into account all these factors to properly estimate the slope of the linear regression 1508 of the extended epipolar line 1408. As it can be observed in FIG. 15, an incorrect horizontal offset H applied to the extension line 1406 would produce a wrong estimation of the slope of the extended epipolar line 1408. In a preferred embodiment, the horizontal offset H is calculated experimentally as depicted in FIG. 20A. The experiment consists in placing a luminescent point 2002 aligned in the optical axis 2004 of the plenoptic camera 100. Furthermore, this luminescent point 2002 is placed at a distance 2006 to the main lens 102 of the plenoptic camera 100 that corresponds to the conjugated plane of the microlens array 104 of the plenoptic camera 100. In that specific scenario, all the plenoptic views capture exactly the same pattern and the epipolar images contain perfectly vertical epipolar lines 430 (as depicted in FIG. 4D and FIG. 20B).

On the other hand, since the conventional camera 1304 is separated a certain distance D from the plenoptic camera 100, the point 2002 illuminates a certain pixel 2010 that is different from the centre of the sensor of the conventional camera 1304 (since we are assuming that the conventional camera image sensor 1400 is aligned with the optical axis of the conventional camera). FIG. 20B shows the horizontal epipolar image 400 of the plenoptic camera containing the completely vertical epipolar line 430 as well as the horizontal line of pixels 2012 ($c_x=1, \ldots, c_x=c_{x\_max}$) of the conventional camera image sensor 1400 that contains the illuminated pixel 2010. Note that if both cameras are horizontally aligned, this line 2012 would correspond to the central line of the sensor, otherwise a simple search must be performed to find the pixel 2010 over the image sensor 1400 of the conventional camera 1304. Once the pixel 2010 and the horizontal line 2012 are located, the horizontal offset H that must be applied in order to obtain the pixel 2010 perfectly aligned with the epipolar line 430 can be directly calculated in FIG. 20B.

Once determined the vertical separation B and the horizontal offset H of the line 2012 of the conventional camera image 1400, a relation between spatial coordinates of the plenoptic camera (lx,ly) and the spatial coordinates of the conventional camera (cx,cy) must be found in order to extend properly the epipolar lines found within an epipolar image (400, 402). In a horizontal epipolar image 400 (py,ly) the rows represent the same spatial position ly captured by the different plenoptic views along the px dimension (in the example of FIG. 14 the first row of the epipolar image 400 corresponds to px=1, and the last row corresponds to px=9). Thus, in order to properly choose the extension line 1406 of the conventional camera image 1412 that must be added to the horizontal epipolar image 400, an equivalence between ly and the vertical dimension cy of the conventional camera image 1400 must be found.

In a preferred embodiment, this relation can be found by using a setup similar to the one presented in the FIG. 20A but instead of using a luminescent point 2002, a bigger pattern that illuminates more pixels 2010 of the conventional camera 1304 and more microlenses of the plenoptic camera 100 is used. The correspondence between (cx, cy) and (lx, ly) is obtained by identifying the size of the pattern Sc produced over the sensor of the conventional camera (the number of illuminated pixels) and the size of the pattern Sp produced over the microlens array of the plenoptic camera (the number of microlenses that have been illuminated). By comparing both sizes, the relation between both spatial coordinates is obtained, nevertheless the horizontal offset H must be also considered. Accordingly, when a conventional camera 1304 is aligned on the horizontal axis of a plenoptic camera 100 the next relations can be obtained:

$cx = lx \cdot Scx/Spx + \text{hor\_offset}$ $cy = ly \cdot Scy/Spy + \text{ver\_offset}$ Where Spx and Scx are the sizes in the x dimension of the patterns produced on the plenoptic camera 100 and the conventional camera 1304, respectively. Similarly, Spy and Scy are the size in the y dimension of the patterns produced on the plenoptic camera 100 and the conventional camera 1304, respectively. The parameter hor\_offset is the horizontal offset H previously obtained. On the other hand, the parameter ver\_offset is zero if the plenoptic camera 100 and the conventional camera 1304 are perfectly aligned in the horizontal axis. Otherwise, a similar experiment as the one explained in FIGS. 20A and 20B (but with vertical epipolar images 402) must be used in order to obtain a vertical offset to compensate the misalignment in the vertical axis.

In at least one embodiment, the procedures to find these relations are performed using subpixel precision when calculating the sizes Spx, Scx, Spy and Scy, as it is possible to use the zero-crossings of the second derivative of the edges of the patterns in order to calculate the corresponding sizes. Similarly, the horizontal offset H can be obtained with subpixel precision by aligning the zero-crossing of the pixel 2010 with the epipolar line 430.

At this point in the process, the first stage 1600 of the diagram of FIG. 16A has been completed and the different cameras have been calibrated. Then the second stage 1610 is started in order to enhance the accuracy of the slopes of the plenoptic camera.

For each epipolar line 1404 detected in the epipolar image, the corresponding edge pixel 1402 in the extension line 1406 of the conventional camera image must be found. In at least one embodiment, the slope of each epipolar line 1404 is first calculated by linear regression techniques considering only the points identified as edges in the object world (using the corresponding zero-crossings of the second derivative calculated with subpixel precision in the plenoptic camera) obtaining the linear regression line 1506. After that, the corresponding extension line 1406 must be identified from the conventional camera image 1412 by using the rationale explained above: the relationship between ly and cy and the vertical offset, and the relationship between lx and cx and the horizontal offset H.

Then, considering the horizontal offset H and the separation B, the line 1406 is extended and the intersection 1404 with the extension line 1306 of the conventional camera is calculated. The relation between cx and lx must be applied in order to obtain the corresponding pixel (cx',cy'). This pixel will be used to determine the region 1412 within the extension line 1306 of the conventional camera in which we will look for the edge pixel 1302. This point corresponds to the same edge in the object world than those pixels of the plenoptic epipolar line 1304.

In at least one embodiment, a one-dimensional window 1512 with an arbitrary number of pixels is used as the considered region within the line 1406 to look for the edge pixel 1402 of the conventional camera 1304 that corresponds to the same edge in the object world than the pixels that form the epipolar line 1404 of the plenoptic camera.

It is also possible, in at least one embodiment, to use a two-dimensional window 1512' considering adjacent lines to the line cy 1406 of the conventional camera image 1412. In at least one embodiment, the width (and height in a 2D window 1512') of this window 1512 is chosen according to the dispersion obtained when estimating a certain depth with only the plenoptic camera (see dotted lines 1102 and 1106 in FIG. 11D and dispersion curves 1202 and 1204 in FIG. 12). This window can be asymmetric, i.e. the number of pixels considered on the left of the pixel (cx',cy') can be different that the number of pixels considered on the right side of such pixel.

Once a 1D window 1512 or 2D window 1512' of a certain number of pixels within the image 1412 of the conventional camera 1304 is defined around pixel 1504, it is necessary to identify which pixel of the several possible candidates is the edge pixel 1402, namely the pixel in the conventional camera 1304 that has been generated by the same source of light in the object world, which corresponds to the pixel that best matches the edge pixels forming the epipolar line 1404 (i.e. the most similar pixel). Several techniques can be used to match the images from the two cameras (SAD-Sum of absolute differences, correlations, entropies, or any other quantitative measurement of deviation). A possible embodiment uses as a reference for the comparison in the plenoptic camera the center pixel of the epipolar line 1404 since the rays that produce said center pixel cross the central part of the main lens 102 of the plenoptic camera 100 and cross the corresponding microlens 104 at low angles, suffering the lowest aberrations.

A robust way to perform the identification is to match patterns instead of comparing single pixels, such that a certain part of the object world can be identified more easily. These patterns can be formed by taking adjacent pixels of the central pixel that correspond to adjacent parts of the object world. In a plenoptic camera these adjacent parts of the object world are sampled by the adjacent microlenses. As an example, let us assume that the edge pixel 1402 to be found in the conventional camera corresponds to the same object of the world than the central pixel of the epipolar line 1404, which is located at the centre (px=5,py=5) of the microimage (lx, ly). Then, in order to properly identify the pixel 1402, a pattern to be matched around this central pixel of the epipolar line 1404 is defined by considering the four surrounding central pixels (px=5,py=5) from the four adjacent microimages (lx+1, ly), (lx−1,ly), (lx, ly), (lx, ly+1), (lx, ly−1). In this way only the least aberrated points from the five plenoptic central views (px=5, py=5 in every microimage with 9×9 pixels per microimage) are considered. Once the reference pattern of the plenoptic camera 100 has been defined, patterns of the same number of pixels are defined in the image sensor 1412 of the conventional camera 1304. In particular, one pattern is defined for each pixel of the extension line 1406 within the window 1512. This reference pattern could have a different size or even be a 1D pattern.

In an embodiment, the pixels of the conventional camera 1304 are much smaller than the microlenses of the plenoptic camera 100 such that a single microlens is integrating light coming from a much larger part of the object world than that integrated by a single pixel of the conventional camera 1304 (see FIG. 15). In such scenario, the patterns defined on the image sensor of the conventional camera must include more pixels in order to properly identify the same spatial region (as a region of the world that projects its light over a relatively large size single microlens 105 of a plenoptic camera 100 will project its light over a larger number of relatively small pixels of a conventional camera 1304).

If the sensors in both cameras were of the same size (for example both 10 megapixels sensors), and the number of pixels per microimage 112 was for example 10×10 (100 pixels) in the example above, we would have to match the pattern formed by these five pixels (the reference pixel (lx,ly) and its four connected neighbours) in the plenoptic camera with patterns of 500 pixels (one pattern per each pixel within region 1512) in the conventional camera. Each of these patterns of the conventional camera is formed by five squares of 10×10 pixels each. This way, the robustness of the solution is improved vs a mere comparison of 1 pixel vs 10×10 pixels in the conventional camera. However, in the example above, if the image sensor of the conventional camera 1304 is a 40 megapixels sensor, we would have to match a pattern of five central pixels from the central plenoptic view in the plenoptic camera with a pattern of 2000 pixels (five squares of 20×20 pixels of the conventional camera image sensor 1412) in the conventional camera, improving in this view the precision of the depth result.

The pattern matching algorithms (entropy, correlation, SAD, . . . ) will finally yield the pixel in the conventional camera 1304 that best matches the central pixel of epipolar line 1404. If for example we were using the SAD (sum of absolute differences) in the example before, the intensity value of the five pixels (i,j) of the reference pattern in the plenoptic camera is subtracted to the, for example, the mean of the intensity values of the 500 pixels (k, l) of patterns defined around each candidate pixel of the conventional camera. The sum of all the absolute values of these subtractions is computed for every candidate pixels within window 1512, obtaining a unique value for every candidate pixel within the region 1512 of the conventional camera. The pixel finally chosen is the one with the smallest difference (smallest SAD value), and is used to extend the epipolar line of the plenoptic camera.

Therefore, by applying correspondence algorithms the edge pixel 1402 of the conventional camera is found. With this extra pixel (which works as an extra plenoptic view), the slope of the linear regression 1508 of the extended epipolar line 1408 is calculated by applying a linear regression technique (or any other fitting method) to the set of points formed by the zero-crossing of the second derivative of the edge pixel 1402 found in the conventional camera image 1412 and the zero-crossings of the second derivative of the pixels that form the epipolar line 1404 found in the epipolar image 400 of the plenoptic camera 100. Note that both the linear regression and the edge detection performed in the epipolar image 400 of the plenoptic camera 100 and in the image 1412 of the conventional camera 1304 can be calculated using subpixel precision. In at least one embodiment, when computing the linear regression of the extended epipolar line 1408 the zero-crossing of the second spatial derivative of the edge pixel 1402 detected in the conventional camera 1304 can be assigned more importance than the zero-crossings of the second derivative of the edge pixels of the epipolar line 1404 detected in the plenoptic camera 100 (for example, by assigning a weight of the zero-crossing of the edge pixel 1402 higher values than the weight assigned to the rest of the zero-crossing points of the epipolar line 1404).

In at least one embodiment, the conventional camera can be designed to be optically equivalent to a plenoptic view. Ideally this will imply that horizontal offset H is zero and the spatial coordinates (lx, ly) of the plenoptic views are directly equivalent to those of the conventional camera (cx,cy). This system may be composed by a plenoptic camera and a conventional camera that is functionally equivalent to a shifted plenoptic view, i.e. the number of pixels of the conventional camera is equal to the number of microlenses of the plenoptic camera and the size of the pixels of the conventional camera is the same than the size of the microlenses of the plenoptic camera. Additionally, the distance 2016 between the main lens 102 of the plenoptic camera 100 and the microlens array 104 is the same as the distance 2014 between the main lens 2020 and the image sensor 1400 of the conventional camera 1304, as well as both focal distances, which are also the same for both cameras. In this embodiment, the relation between conventional camera pixels and plenoptic camera microlenses is straightforward (relations between (lx, ly) and (cx, cy)) and only the distance D between both cameras and the difference in the field captured by both cameras must be considered before extending the epipolar lines (the conventional camera might capture different parts of the scene than the plenoptic camera so the horizontal offset H must be calculated, for example, according to the experiment of FIGS. 20A and 20B previously commented).

This invention also improves the refocusing performance that can be achieved using only a stereo pair or only a plenoptic camera. As stated before, a requirement in order to be able to estimate depths in any imaging system is that the areas of interest of a scene must be focused, otherwise information from different spatial locations in the world are mixed in the sensor. In a plenoptic camera the depth range where a scene is focused is effectively increased since the aperture is divided into multiple equivalent views (with very small apertures and hence large depths of field).

This requirement also applies when we want to refocus the image to a certain depth plane. The refocusing process essentially consists in mixing properly the different captured views of the scene depending on the depth plane desired to be in focus in order to combine the views as if the sensors of the system were located at the conjugated distance of the desired depth (for example in the particular case of a plenoptic camera, the virtual film of the microlens array can be propagated forward and/or backward to obtain "virtual films" before or beyond the microlens array plane). Hence, the more different the views are the more realistic the refocusing effect can be achieved. Another possibility to perform the refocusing effect is to blur (for example with a Gaussian filter) those parts of the scene that are not located at the same depth plane than the desired depth (in reality this is defocusing by blurring the areas at certain known depths that we wish to be out of focus). This can be performed straightforwardly considering the known depth map of the scene.

From the above it is clear that the refocusing performance is directly related to the capability of depth estimation, such that the more reliably the distances are estimated the better the refocus effect is achieved. This principle is valid for any imaging system.

The embodiments shown in FIGS. 13A-13E improve the depth estimation performance (reducing drastically the uncertainty of the estimated depth values) and it also allow estimating larger distances compared to a single plenoptic camera or conventional multiview systems. Moreover, the refocusing performance is also enhanced.

Since plenoptic cameras start losing precision of depth measurements at relatively small distances from the camera, the refocusing process in plenoptic cameras is not effective anymore as the distance increases (about one meter for mini-cameras of a few mm for smartphones, not much more with practical larger lenses in handheld cameras). Due to the relatively small baseline between adjacent plenoptic views of a plenoptic camera 100 (a tenth of a mm in the previous example), beyond certain distances the rays arrive to the camera nearly as parallel as they would arrive if they came from infinite distance; hence, it is impossible to differentiate between depths of let us say two or three meters and infinite distance, and the refocus becomes impossible beyond two or three meters, working well only for distances below one meter.

The multiview system described from FIG. 13A onwards, combines effectively the good performance of plenoptic cameras 100 for small distances and also take advantage of larger baselines of multiple camera systems for large distances. In order to maximize the refocusing effect it is necessary to extend the depth of field of the multiview system as much as possible.

To achieve this, in at least one embodiment, the conventional camera 1304 hyperfocal distance is designed in a way that between infinity and a distance T (usually half of the hyperfocal distance, for example one meter) everything has an acceptable sharpness, and complementarily designs the plenoptic camera 100 such that it can measure distances with an acceptable uncertainty from distance T to distances very near the camera, even reaching the limit to estimate the distance of objects approaching the EFL (Effective Focal Length) of the plenoptic camera 100 (a few millimetres).

According to an embodiment, the present invention allows to obtain all-in-focus images of scenes even with lots of different objects located at lots of different distances in the object world (from very near objects, gradually increasing distance of the objects and eventually reaching infinite distance for some objects). As an example and never as a limitation, an embodiment applies standard refocusing methods of plenoptic cameras to obtain images focused on the objects that are located between the camera and T. The final all-in-focus image is composed by taking the sharpest objects of each refocused image whereas for objects located at distances larger than T we simply take them from the image of the conventional camera 1304 since all the objects within the range T and infinity are in focus.

Similarly, the present invention can also be used to refocus a photo to a certain depth plane after the photo has been taken, overcoming previous systems like single plenoptic cameras or stereo pairs. As previously explained, the present invention increases the distance discrimination capability of a plenoptic camera by using a multi-view system. This allows to calculate distances with good accuracy for objects located at distances higher than T; thus, it is possible to create artistic photography effects as, for example, to focus a small range between distances from A to B (being A and B chosen by the user to define the focused range). The image for distances higher than A and lower than B can be generated by defocusing the plenoptic camera 100 (if A and B are smaller than T) or just by digital filtering (a blur filter) the conventional camera image, what is possible in our multiview system as we have a reliable depth-map even for long distances and we can choose to defocus in a range of distances chosen by the user.

All the applications described are also compatible with super-resolution methods, which can be applied to increase the resolution of the plenoptic views. Additionally, it is possible to increase the low resolution of the plenoptic views by mixing the images of plenoptic camera and conventional camera through adequate image processing routines.

Besides the advantages already described, the present invention can avoid the use of motors (or MEMS) needed to focus modern micron-pixels cameras (as the focus is performed digitally: for large distances with conventional camera and for small distances with plenoptic camera), reducing cost, improving reliability and providing all-in-focus images if the users wish so after the photo has been taken. Nevertheless, this is not a limitation of the present invention and it can be used by cameras with variable focus as well.

The invention offers better refocusing for short distances, for long distances and for areas out of focus in stereo-pairs, as well as better distance calculations that allow higher quality 3D images.

For simplicity and clarity, the description of the disclosed invention to enhance the performance for depth estimation of single plenoptic cameras and of stereo pairs has been explained considering only a conventional camera horizontally aligned with a plenoptic camera. Nevertheless, an expert in the field can easily extend this invention to a multiview system formed by multiple cameras with at least one of them being a plenoptic camera. Besides, the spatial distribution of these cameras can be arbitrary (without any need of expensive calibration or alignment procedures) and only small and straightforward changes must be taken to adapt the methods proposed herein.

As explained before, when a conventional camera is horizontally aligned with a plenoptic camera, the horizontal epipolar images can be extended as shown in FIGS. 14 and 15 considering the separation between both cameras and the equivalence between both sensor pixels. It is clear that a similar process can be applied to the vertical epipolar images when both cameras are aligned in the vertical axis.

In at least one embodiment, the procedure previously described can be trivially extended to a scenario where a plenoptic camera is vertically aligned with two conventional cameras (one above and the other one below the plenoptic camera) and it is also horizontally aligned with two more conventional cameras (one at the right and the other one at the left of the plenoptic camera), as in the example of FIG. 13D, composing a system formed by a total of five cameras, one plenoptic camera and four conventional cameras surrounding it. In this embodiment, both the horizontal 400 and the vertical 402 epipolar images are extended with an extension line 1406 above and another extension line 1406 below the epipolar image 400 of the plenoptic camera 100 using the methodologies described before. In the vertical epipolar images 402 the extension lines 1406 are taken from the images 1412 of the vertically aligned conventional cameras 1304, and the horizontal epipolar images 400 are extended with the images 1412 of the horizontally aligned conventional cameras 1304. The obvious advantage of this configuration, besides the advantages for objects very near the camera brought by the plenoptic camera, is that it improves the baseline, adding capabilities for much larger distances while avoiding the heavy processing duties of multiview systems formed by conventional cameras to match patterns from a large number of images (five in the exemplary embodiment) with much easier searches for pattern identification (the windowing procedure in FIGS. 17A and 17B). Another simplified embodiment may use a plenoptic camera, a conventional camera aligned horizontally and a second conventional camera aligned vertically, as depicted in FIG. 13B, increasing the baselines for both the horizontal 400 and vertical 402 epipolar images.

Figure 18:
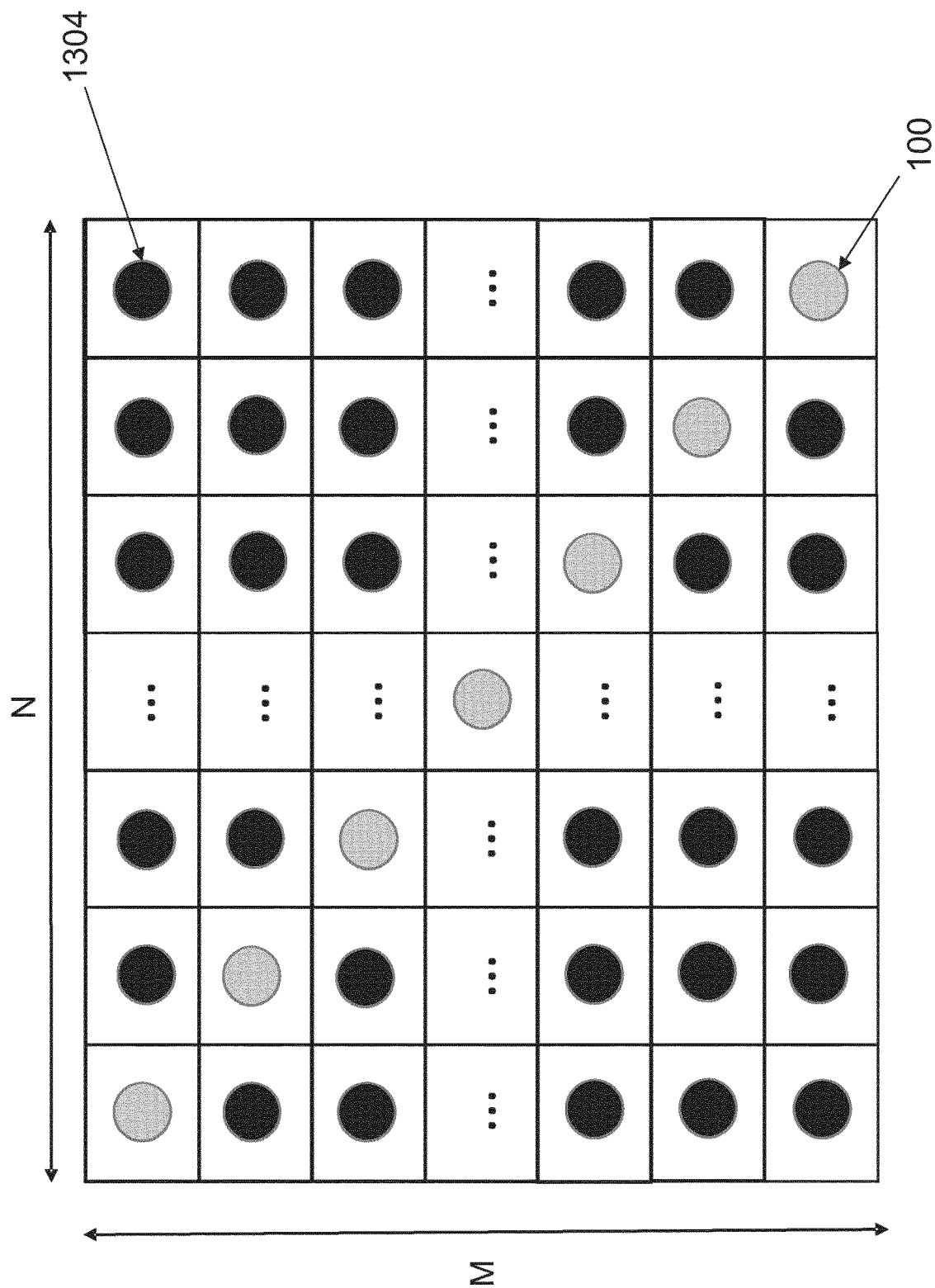
FIG. 18 shows a possible embodiment of the multiview system of this invention: a two-dimensional array of plenoptic cameras and/or conventional cameras.

The present invention can be applied to more general scenarios. Let us suppose a matrix of spatial positions such that in each position of the matrix a camera can be placed. FIG. 18 shows this matrix where the bullets can indistinctly be substituted by a plenoptic camera, a conventional camera or by no camera at all. The present invention can use any possible configuration of this matrix. As it is evident for an expert in the field, it is only necessary to find the adequate offsets and equivalence between sensor pixels for the different conventional cameras and the plenoptic cameras to properly extend the epipolar images of the plenoptic cameras with new conventional camera views that offer larger baselines. Epipolar images of plenoptic cameras can be extended in the vertical dimension with as many lines as conventional cameras are in such direction. For example, if a plenoptic camera is placed on the left of four conventional cameras horizontally aligned, the epipolar image of the plenoptic camera will be extended with four additional lines, each one corresponding to the four conventional cameras and separated from each other a distance that depends on the physical separation between them. By using such configurations, the redundancy of depth estimations is increased as well as the baseline, reducing the uncertainty of depth measurements for large distances.

Figure 21:
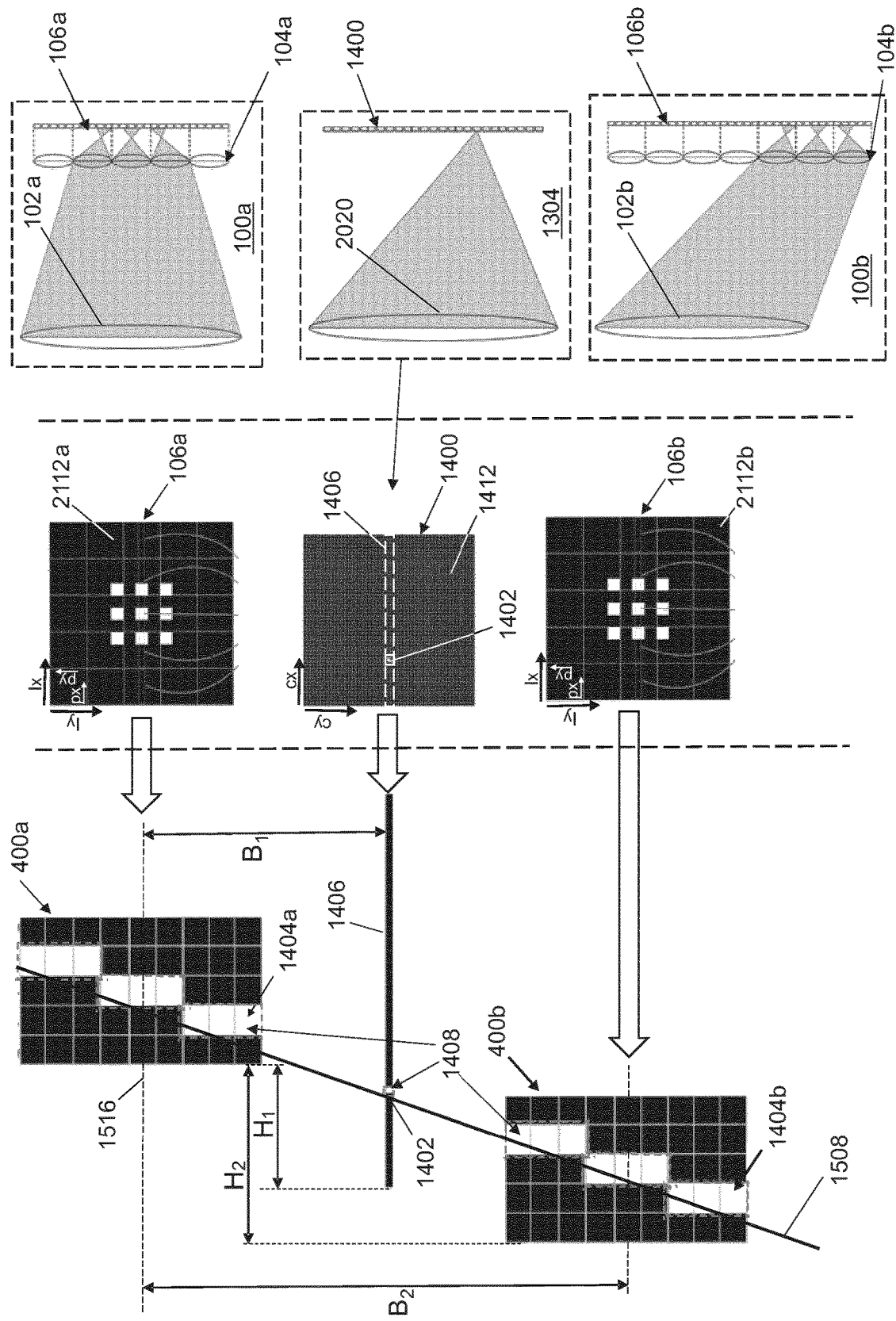
FIG. 21 illustrates the extended epipolar line obtained for a multiview system formed by two plenoptic cameras and one conventional camera.

In addition to this, it is also possible to extend an epipolar image of a plenoptic camera with several plenoptic cameras and/or several conventional cameras. In these cases, the epipolar images are extended not only with single lines of conventional cameras but with epipolar images of different plenoptic cameras, as shown in the example of FIG. 21, wherein the extended epipolar line 1408 is formed by a horizontal epipolar image 400a obtained from the image 2112a captured by an image sensor 106a from a first plenoptic camera 100a, an edge pixel 1402 obtained from the image 1412 captured by an image sensor 1400 from a conventional camera 1304 and a horizontal epipolar image 400b obtained from the image 2112b captured by an image sensor 106b from a second plenoptic camera 100b, wherein the extension line 1406 has an horizontal offset $H_1$ and a vertical separation $B_1$ with respect to the first epipolar image 400a and the second epipolar image 400b has an horizontal offset $H_2$ and a vertical separation $B_2$ with respect to the first epipolar image 400a. A linear regression 1508 of the extended epipolar line 1408, and its corresponding slope, is then calculated to estimate a highly-accurate distance. This can be used to further increase the accuracy of the measurements by having several first slope estimations (those calculated with the epipolar images of one of the plenoptic cameras) to identify the regions or windows 1512 of the rest of camera images 1412, 2112b where the search for the corresponding edge pixels of both the conventional camera 1402 and the central pixel of the epipolar line 1404b of the additional plenoptic camera is performed. In embodiments of multiview systems that include more than one plenoptic cameras, the epipolar images are extended with the information of the rest of plenoptic camera images (like the image 2112b shown in FIG. 21), and the second stage 1610 to identify that a certain epipolar line 1404a corresponds to the same edge of the object world than the epipolar line 1404b of the rest of plenoptic cameras 100b must be performed. In an embodiment, this stage is equivalent to the previously explained when epipolar images are extended with the information of a conventional camera but considering the central plenoptic view of the additional plenoptic cameras 100b.

In configurations where the plenoptic cameras are not aligned with the conventional cameras neither in the horizontal nor in the vertical axis, it is still possible to extend the epipolar images of the plenoptic cameras. Simply, vertical and horizontal offsets must be applied to correct these misalignments and properly match the different images. This is a well-known procedure in the multiview literature when several non-aligned views must be rectified.

In at least one embodiment, the multiview system consists of a M N matrix of cameras equidistantly distributed such that the cameras at the diagonal positions are all of them plenoptic cameras as shown in FIG. 18. This embodiment has the advantage of enabling the possibility of extending the vertical and horizontal epipolar images of every plenoptic camera with the same number of extension lines of the conventional cameras. This ensures the same accuracy in the horizontal and the vertical axis extending every epipolar image of all the plenoptic cameras.

In at least one embodiment, cameras can be distributed irregularly in the matrix. In at least one embodiment, cameras can be distributed forming any kind of figure (e.g. a circle) or any other distribution if the dimensions of the matrix are high enough.

The epipolar image extension procedure proposed in this invention is applied to enhance the depth estimation process of a plenoptic camera with the assistance of additional conventional cameras and eventually generate a more accurate depth map. Therefore, the methodology of the present invention can be applied to any depth map generation technique existing for plenoptic cameras based on the analysis of epipolar images and estimations of slopes of the epipolar lines assisted with conventional cameras.

In still other embodiment, which cannot be taken as a limitation, an exemplary depth map generation procedure is explained. The configuration of the example consists of a plenoptic camera at the centre, a conventional camera at its right side and another conventional camera above the plenoptic camera. Once the plenoptic camera has captured the light field and the conventional cameras the corresponding images 1412, the epipolar images of the plenoptic camera light field are analysed. The epipolar image extension procedure is applied to the horizontal and vertical epipolar images, obtaining an accurate slope estimation for every epipolar line.

It is important to note that in a plenoptic camera several epipolar lines can contain information of the same point in the object world. Thus, all the slopes that correspond to the same spatial positions must be combined to take advantage of the redundant information and further reduce the uncertainty, obtaining a final unique slope per spatial position (dx,dy). This slope map is obtained by calculating all the slope values depending on their position in the sensor (px,py,lx,ly), more specifically calculating the points dx and dy in the object world that belong to one or several epipolar lines by projecting the points of those epipolar lines (produced by the same point in the object world) into the same plane in the object world and assigning a slope value for every dx, dy pair.

Depending on the configuration of the multiview system, it is possible that not all the epipolar lines of the plenoptic cameras can be enhanced with the images 1412 of the conventional cameras (for example, in a scenario where the system contains a plenoptic camera horizontally aligned with two conventional cameras, only the horizontal epipolar images can take advantage of using the image 1412 of the conventional camera as additional views). Therefore, in at least one embodiment, during the combination process the slopes calculated in epipolar images that have been extended can have more weight than those slopes obtained exclusively from the plenoptic camera epipolar images. That is to say, when a slope obtained exclusively from a plenoptic camera, the epipolar line is projected to a certain slope map position (dx,dy) and a slope whose accuracy has been enhanced by using at least one image 1412 from a conventional camera is also projected to the same (dx,dy) position, the final slope value for such position can be calculated with any arithmetic mean value weighted or not. In the case that a weighted average is applied, in at least one embodiment, the enhanced slopes have more weight since they are more accurate.

Once the slope map is obtained a relation between slope and depth is applied (which depends on the physical parameters and configuration of the plenoptic camera) to obtain the depth map. Since the epipolar lines are only found at the edges of the objects world, this depth map is not complete, containing positions (dx,dy) with no depth values (sparse depth map). In order to obtain a dense depth map, filling methods can be applied. Different filling strategies can be found in literature such as those based on image segmentation (region growing, split and merge, and/or clustering techniques), interpolation/approximation of surfaces from three-dimensional scattered points or three-dimensional reconstruction by multiview stereo techniques, to name a few. In an embodiment, the corresponding depth values for all these empty positions can be obtained by considering the depth values of the neighbouring positions.

In an embodiment, the resolution of the depth map can be higher than the total number of microlenses in order to take advantage of the subpixel-accuracy obtained in the edge detection stage. As said, the slope values can only be obtained at the identified epipolar image edges (at the epipolar lines) and the sparse depth map obtained in the previous stage contains a lot of empty positions (dx, dy), not only for a large number of pixels, but also for a large number of microlenses in which the homogeneity of the real world does not produce edges on the epipolar images. Thus, in this depth map of higher resolution, the previous filling techniques would be equally applied in order to obtain a dense depth map.

Figure 22A:
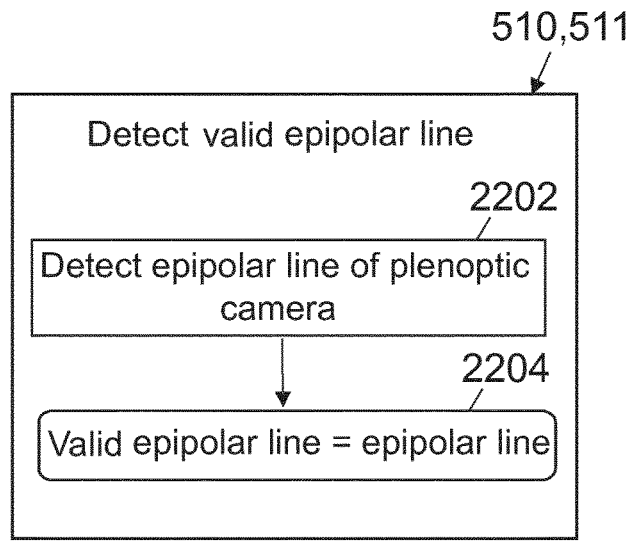
FIG. 22A depicts a flow diagram for the detection of valid epipolar lines in an embodiment using a single plenoptic camera.

FIG. 5 above illustrates a flow diagram for determining the depth map, in which valid epipolar lines are detected (steps 510 and 511). When considering only one plenoptic camera 100, the valid epipolar lines are epipolar lines 610 (FIG. 6A) obtained from epipolar images (400, 402) of said plenoptic camera 100, as illustrated in FIG. 22A. In this case, the step of detecting valid epipolar lines (510, 511) comprises detection 2202 of epipolar lines from plenoptic camera 100 and considering or assigning 2204 the detected epipolar lines as the valid epipolar lines (assuming they are deemed to be valid).

Figure 22B:
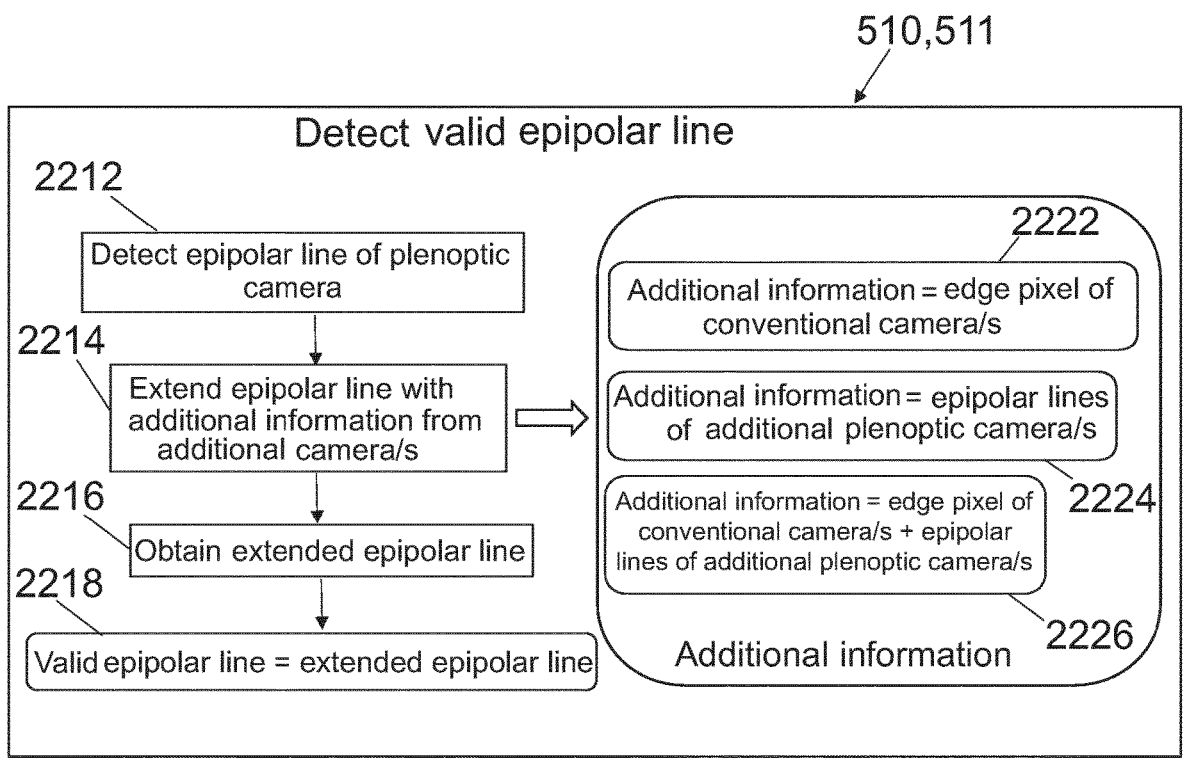
FIG. 22B illustrates a flow diagram for the detection of valid epipolar lines in an embodiment using a plenoptic camera and the additional information captured by at least one additional camera.

Alternatively, as shown in the diagram flow of FIG. 22B, the step of detecting (510, 511) valid epipolar lines of FIG. 5 may include detecting 2212 epipolar lines 1404 of the epipolar images (400, 402) from the plenoptic camera 100 and extending 2214 these epipolar lines 1404 with additional information included in images captured by one or more additional image acquisition devices, to obtain 2216 extended epipolar lines 1408 and assign 2218 these extended epipolar lines 1408 as the valid epipolar lines. This way, the extended epipolar line 1408 of FIG. 14 would be considered the valid epipolar line in steps 510 and 511 of FIG. 5, and the step in FIG. 5 of determining (512, 513) the slope of the valid epipolar line would include the calculation of the slope of the extended epipolar line 1408.

As previously explained (for instance, in the example of FIG. 21), and depicted in FIG. 22B, the additional information 2222 used to extend the epipolar lines of the plenoptic camera 100 may include edge pixels 1402 contained in images 1412 captured by one or more conventional cameras 1304. Alternatively, the additional information 2224 may include epipolar lines 1404b of images 2112b captured by one or more additional plenoptic cameras 100b. The additional information 2226 may also be a combination of edge pixels 1402 from one or more conventional cameras 1304 and epipolar lines 1404b from one or more additional plenoptic cameras 100b.

Figure 23A:
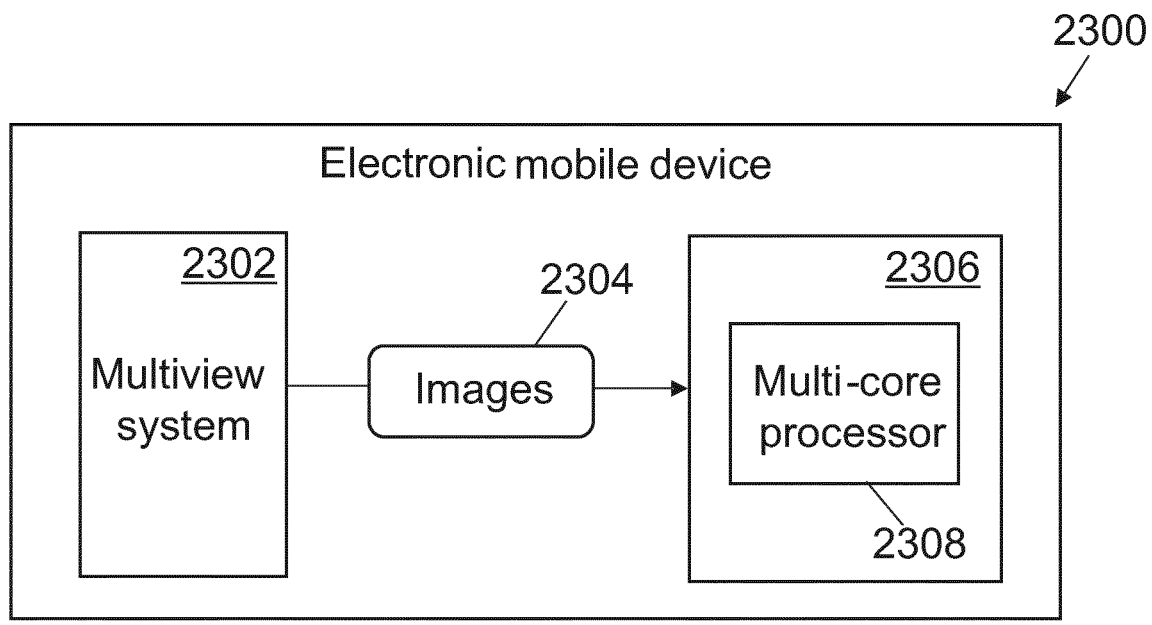
FIGS. 23A-23C show different embodiments of electronic mobile devices executing the method for the multiview system.
Figure 23B:
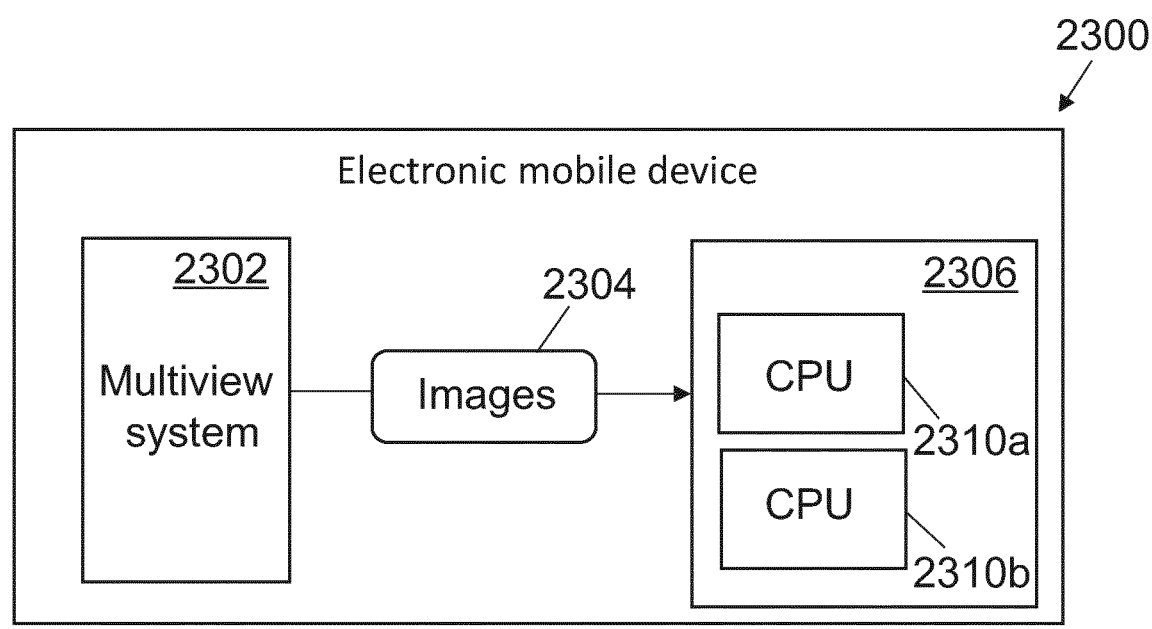
Figure 23C:
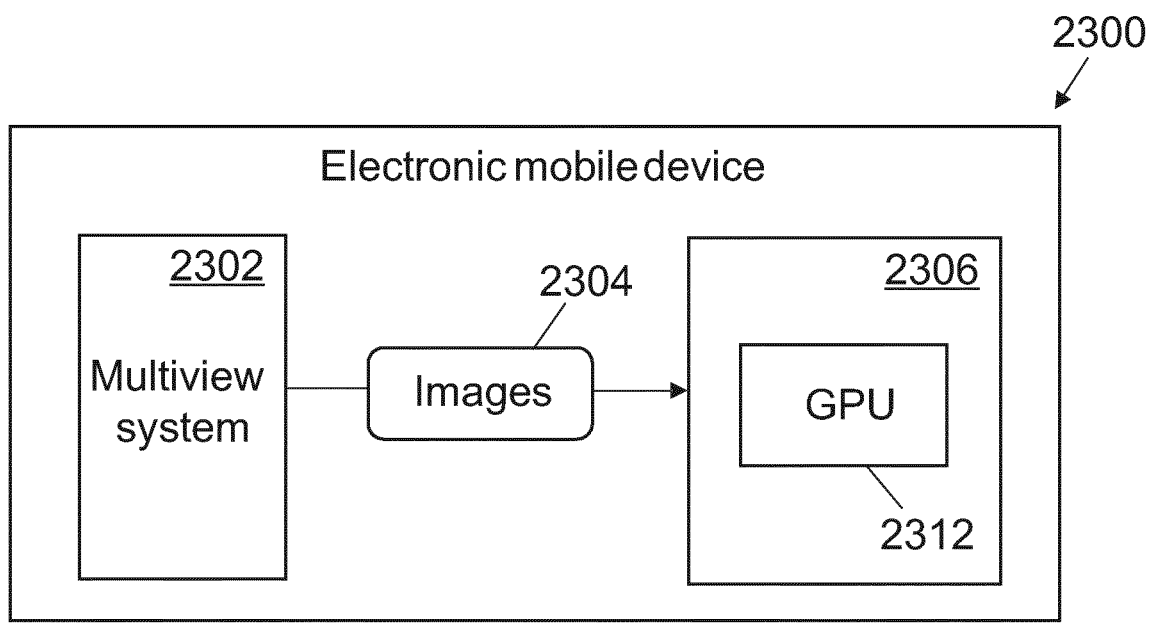

According to a preferred embodiment, the method of the multiview system is executed in an electronic mobile device, such as a smartphone, a tablet or a laptop. FIGS. 23A, 23B and 23C illustrate different embodiments of electronic mobile devices 2300 with a processing unit or processing means 2306 configured to execute the method in order to obtain slope and/or depth maps from images 2304 captured by the invented multiview system 2302.

In order to obtain depth maps in real-time in mobile devices, it is highly recommended to implement the present method in an extremely efficient way. To achieve this, it is possible to take advantage of the multiple cores included in current multi-core processors 2308 (FIG. 23A), even in processors from mobile devices, creating several algorithm execution threads in such a way that each of them is in charge of performing different operations. In an embodiment, two CPU execution threads are created so that a first CPU 2310 (in FIG. 23B) executes the described steps for the horizontal epipolar images whereas a second CPU 2310b is in charge of performing the same operations on the vertical epipolar images. More advanced computational techniques can be used in order to increase the computational efficiency. For example, a graphics processing unit (GPU 2312 in FIG. 23C), even those included in mobile devices, can be used since a GPU includes several hundreds or thousands of cores capable of executing operations simultaneously. Accordingly, in an embodiment, each epipolar image (vertical and horizontal) is extended (if it is possible depending on the multiview system) and processed simultaneously in a different core of a GPU 2312 to further accelerate the execution of the algorithm.

The invention claimed is:

1. A method for obtaining depth information from a light field, comprising:
    generating a plurality of epipolar images from a light field captured by a light field acquisition device;
    an edge detection step for detecting, in the epipolar images, edges of objects in the scene captured by the light field acquisition device;
    for each epipolar image, detecting valid epipolar lines formed by a set of edges;
    determining the slopes of the valid epipolar lines;
    wherein the detection of valid epipolar lines comprises extending the epipolar lines of the epipolar images from the light field acquisition device with additional information of images captured by at least one additional image acquisition device to obtain an extended epipolar line.

2. The method of claim 1, wherein the epipolar images are extended adding, above and/or below, the additional information depending on the relative positions of the at least one additional image acquisition device to the light field acquisition device.

3. The method of claim 2, wherein the additional information is added at a certain distance above and/or below the epipolar images according to horizontal ($H_1$, $H_2$) and vertical ($B_1$, $B_2$) offsets previously computed in a calibration process.

4. The method of claim 2, wherein the horizontal epipolar images are extended adding the additional information of the at least one additional image acquisition device that is horizontally aligned with light field acquisition device.

5. The method of claim 2, wherein the vertical epipolar images are extended adding the additional information of at least one additional image acquisition device that is vertically aligned with light field acquisition device.

6. The method of 1, wherein the additional information comprises edge pixels contained in images captured by at least one conventional camera, wherein said edge pixels correspond to the object edge represented by the epipolar line.

7. The method of claim 6, comprising determining a search region in the images captured by the conventional cameras where the edge pixels corresponding to the epipolar line are searched for.

8. The method of claim 1, wherein the additional information comprises epipolar lines contained in images captured by at least one additional light field acquisition device, wherein said epipolar lines correspond to the object edge represented by the epipolar line.

9. The method of claim 8, comprising determining a search region in the images captured by the additional light field acquisition devices where the central edge pixel of the epipolar lines of the additional light field acquisition devices corresponding to the object edge represented by the epipolar line are searched for.

10. The method of claim 1, comprising:
calculating a linear regression of the epipolar line from the light field acquisition device;
obtaining an extension line from the image captured by a conventional camera;
extending the epipolar image of the light field acquisition device with the extension line of the conventional camera;
calculating the intersection point of the epipolar line and the extension line; and
defining a search region around the intersection point.

11. The method of claim 10, further comprising applying a correspondence process to find the edge pixel in the conventional camera image that matches the object edge represented by the epipolar line.

12. The method of 1, further comprising obtaining all-in-focus images from a multi-view system comprising the light field acquisition device and at least one conventional camera; wherein the step of obtaining all-in-focus images comprises:
for objects located at a distance beyond a threshold T from the multiview system, obtaining focused images from the at least one conventional camera;
for objects located at a distance below a threshold T from the multiview system, obtaining refocused images from the light field acquisition device; and
composing a final all-in-focus image by taking, for distances below the threshold T, the sharpest objects from the refocused images of the light field acquisition device and, for distances beyond the threshold T, taking the focused images from the at least one conventional camera.

13. The method of claim 1, further comprising a step of refocusing images from a multiview system comprising the light field acquisition device and at least one conventional camera; wherein the step of refocusing images comprises:
calculating a depth map;
for objects located at a distance below a threshold T from the multiview system, using refocused images from the light field acquisition device;
for objects located at a distance beyond a threshold T from the multiview system:
selecting a focused range of distances from the at least one conventional camera, and
blurring objects in the image placed at a distance beyond the selected focused range.

14. A device for generating a depth map from a light field, comprising processing means configured to carry out the steps of the method of claim 1.

15. A computer program product for generating a depth map from an image captured by a plenoptic camera, comprising computer code instructions that, when executed by a processor, causes the processor to perform the method of claim 1.

* * * * *